US006909556B2

(12) United States Patent
Berman et al.

(10) Patent No.: US 6,909,556 B2
(45) Date of Patent: Jun. 21, 2005

(54) DESIGN OF PRISM ASSEMBLIES AND KERNEL CONFIGURATIONS FOR USE IN PROJECTION SYSTEMS

(75) Inventors: Arthur Berman, San Jose, CA (US); Michael Detro, Los Gatos, CA (US)

(73) Assignee: LightMaster Systems, Inc., Santa Clara, CA (US)

(*) Notice: Subject to any disclaimer, the term of this patent is extended or adjusted under 35 U.S.C. 154(b) by 34 days.

(21) Appl. No.: 10/342,219

(22) Filed: Jan. 13, 2003

(65) Prior Publication Data

US 2003/0151833 A1 Aug. 14, 2003

Related U.S. Application Data

(60) Provisional application No. 60/349,271, filed on Jan. 14, 2002, and provisional application No. 60/418,600, filed on Oct. 15, 2002.

(51) Int. Cl.[7] .............................................. G02B 27/14
(52) U.S. Cl. ..................... 359/634; 353/14; 353/100; 348/337; 348/338
(58) Field of Search ........................... 359/634; 353/34, 353/37, 100; 349/9; 348/335–339

(56) References Cited

U.S. PATENT DOCUMENTS

| 1,277,040 A | 8/1918 | Brewster |
| 4,151,554 A | 4/1979 | Tucker |
| 4,544,237 A | 10/1985 | Gagnon |
| 4,913,528 A | 4/1990 | Hasegawa |
| 5,168,351 A | 12/1992 | Bradley |
| 5,177,629 A | 1/1993 | Bohannon |
| 5,497,268 A | 3/1996 | Tang |
| 5,552,922 A | 9/1996 | Magarill |
| 5,786,937 A | 7/1998 | Chu et al. |
| 5,838,397 A | 11/1998 | Stephens |
| 5,865,520 A | 2/1999 | Kavanagh et al. |
| 5,986,814 A | 11/1999 | Reinsch |
| 6,046,858 A | 4/2000 | Scott et al. |
| 6,056,407 A | 5/2000 | Iinuma et al. |
| 6,089,719 A | 7/2000 | Lin |
| 6,113,239 A * | 9/2000 | Sampsell et al. ............. 353/31 |
| 6,115,484 A | 9/2000 | Bowker et al. |
| 6,139,154 A | 10/2000 | Haba |
| 6,176,586 B1 | 1/2001 | Hirose et al. |
| 6,183,090 B1 | 2/2001 | Nakanishi et al. |

(Continued)

FOREIGN PATENT DOCUMENTS

| JP | 54-155153 | 6/1981 | |
| JP | 04-005428 | 7/1993 | |
| JP | 04-031676 | 9/1993 | |
| JP | 04-151008 | 12/1993 | |
| JP | 07-041358 | 8/1996 | |
| WO | WO 200204994 A2 * | 1/2002 | ............. G02B/5/00 |

OTHER PUBLICATIONS

Robinson et al., (2000) "High Contrast Color Splitting Architecture Using Polarization Filters," *SID '00 Digest*, vol. 31.

*Primary Examiner*—Ricky Mack
(74) *Attorney, Agent, or Firm*—Reed Smith LLP; John W. Carpenter

(57) ABSTRACT

Kernels are designed in different configurations based on design properties of an enclosure or other requirements. A prism assembly having various types of filters, waveplates, beam splitters (e.g., path length matched beam splitters) and/or other optical components are provided to selectively direct light beams to each of red, green, and blue microdisplays that manipulate the light and then combine the manipulated lights into an output image. The prism assembly includes an input face, an output face, and other faces on which the microdisplays are attached in a number of different configurations. Requirements and exact placement of optical components varies depending on which microdisplay is attached to which face. The components of the prism assembly may be arranged in path length matched positions.

56 Claims, 69 Drawing Sheets

U.S. PATENT DOCUMENTS

| | | |
|---|---|---|
| 6,183,091 B1 | 2/2001 | Johnson et al. |
| 6,247,814 B1 | 6/2001 | Lin |
| 6,262,851 B1 | 7/2001 | Marshall |
| 6,280,037 B1 | 8/2001 | Smith |
| 6,288,844 B1 | 9/2001 | Edlinger et al. |
| 6,304,302 B1 | 10/2001 | Huang et al. |
| 6,309,071 B1 | 10/2001 | Huang et al. |
| 6,364,488 B1 | 4/2002 | Lin |
| 6,366,335 B1 | 4/2002 | Hikmet et al. |
| 6,375,330 B1 | 4/2002 | Mihalakis |
| 6,377,318 B1 | 4/2002 | Menard |
| 6,384,972 B1 * | 5/2002 | Chuang ............... 359/495 |
| 6,406,151 B1 | 6/2002 | Fujimori |
| 6,407,868 B1 | 6/2002 | Ishibashi et al. |
| 6,415,093 B1 | 7/2002 | Nakamura et al. |
| 6,419,362 B1 | 7/2002 | Ikeda et al. |
| 6,454,416 B2 | 9/2002 | Aoto et al. |
| 6,476,972 B2 | 11/2002 | Edlinger et al. |
| 6,490,087 B1 | 12/2002 | Fulkerson et al. |
| 6,509,938 B2 | 1/2003 | Okada et al. |
| 6,522,470 B2 | 2/2003 | De Vaan et al. |
| 6,530,663 B2 | 3/2003 | Lin |
| 6,648,474 B2 * | 11/2003 | Katsumata et al. ............ 353/20 |
| 6,698,896 B2 * | 3/2004 | Suzuki et al. ................. 353/33 |
| 2002/0001135 A1 * | 1/2002 | Berman et al. ............. 359/640 |
| 2002/0109820 A1 | 8/2002 | Pan |
| 2002/0140905 A1 | 10/2002 | Ouchi et al. |
| 2002/0176054 A1 | 11/2002 | Mihalakis |
| 2003/0117593 A1 | 6/2003 | Abe et al. |
| 2003/0147051 A1 | 8/2003 | Fujita et al. |
| 2003/0193652 A1 * | 10/2003 | Pentico et al. ................ 353/31 |

* cited by examiner

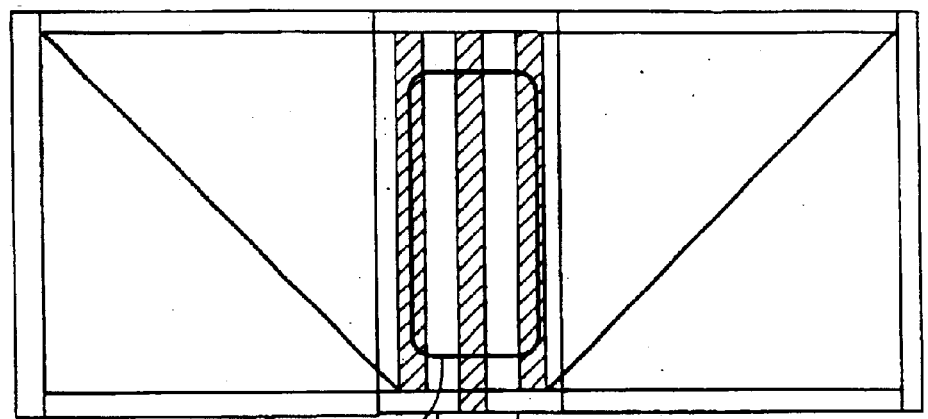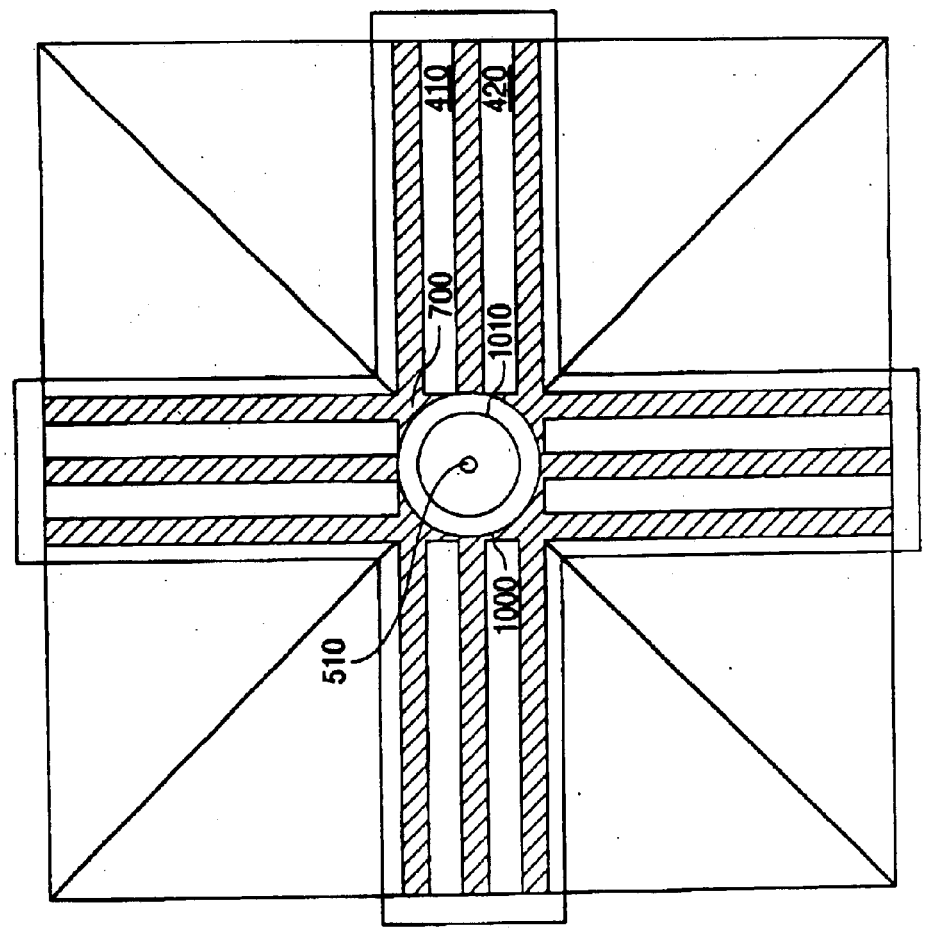
FIG. 10

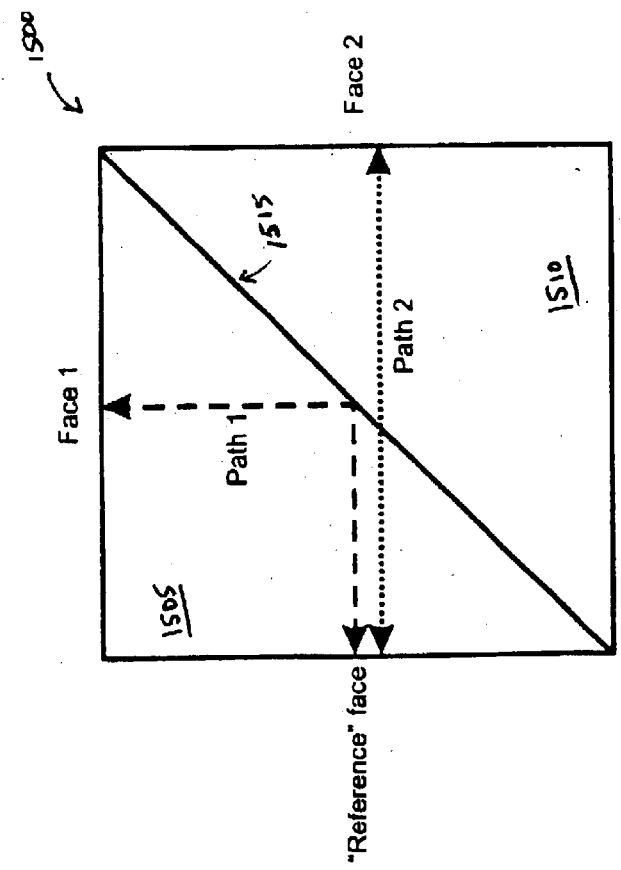
FIGURE 15: THE DEFINITION OF A "PATHLENGTH MATCHED" PBS CUBE
Pathlength 1 = Pathlength 2

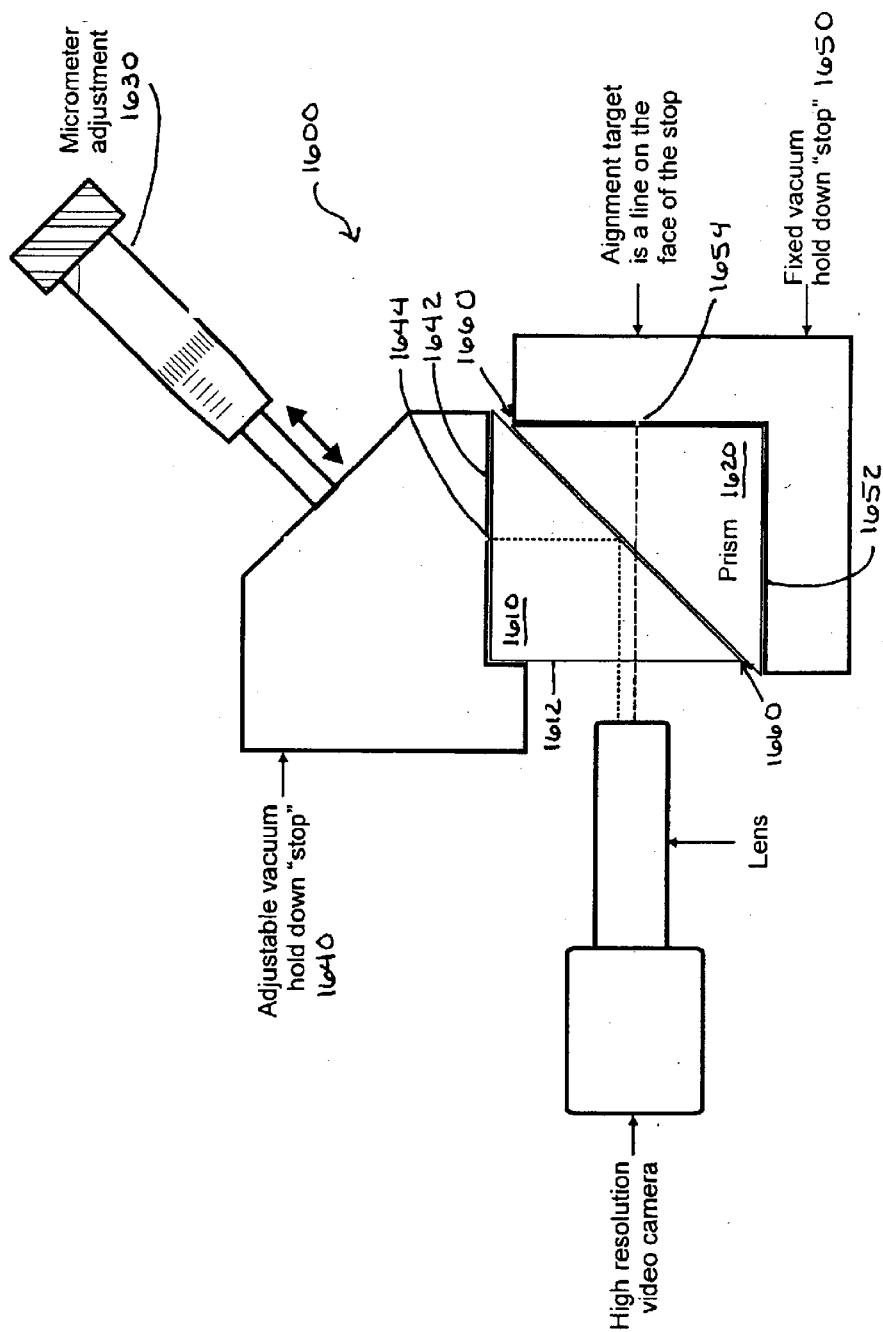
FIGURE 16A: A METHOD TO PRODUCE A "PATHLENGTH MATCHED" PBS CUBE
THE POSITION OF THE STOP IS ADJUSTED UNTIL THE ALIGNMENT TARGETS ARE COINCIDENT

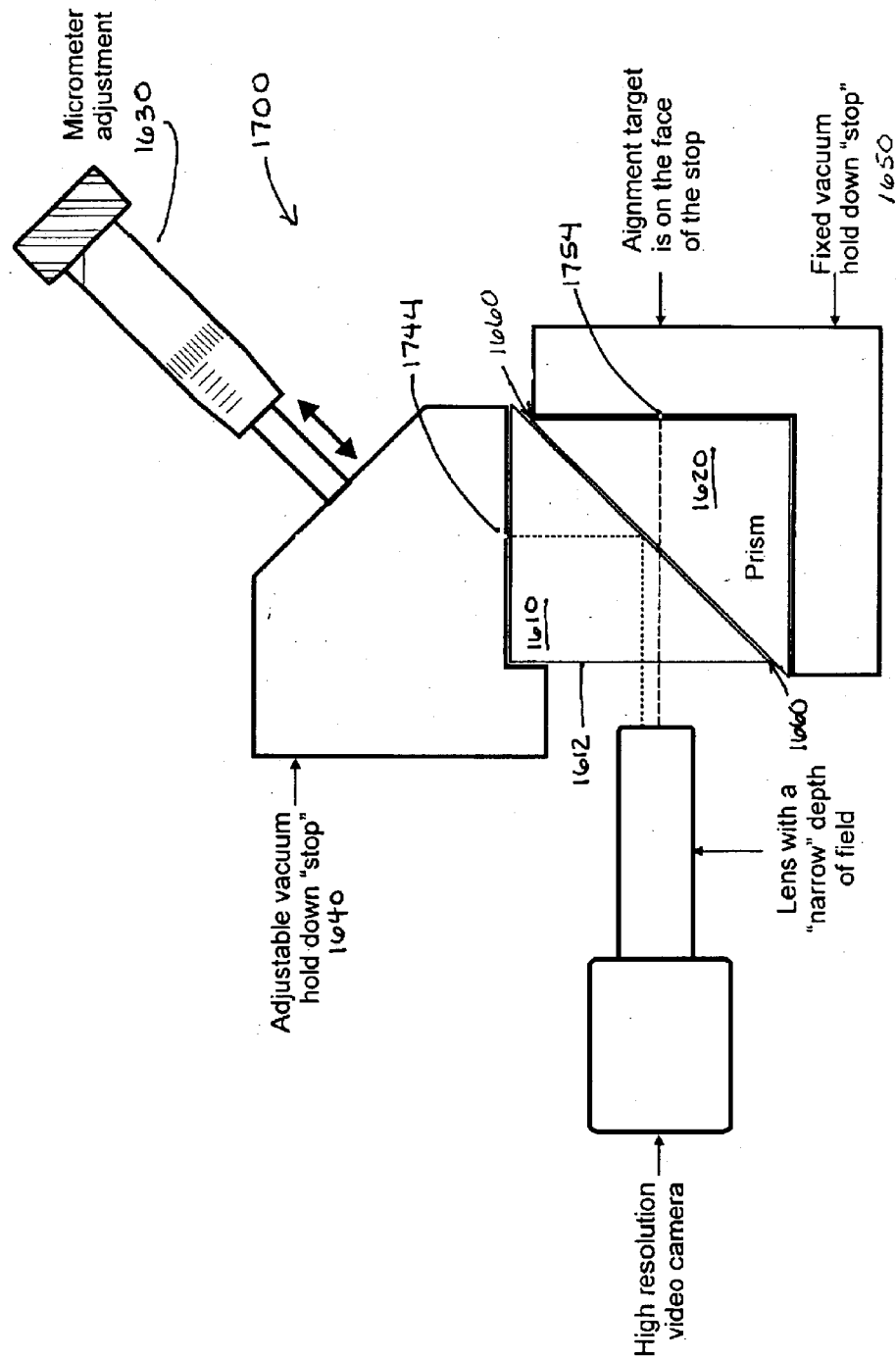
FIGURE 17: A METHOD TO PRODUCE A "PATHLENGTH MATCHED" PBS CUBE
THE POSITION OF THE STOP IS ADJUSTED UNTIL BOTH ALIGNMENT TARGETS ARE IN FOCUS

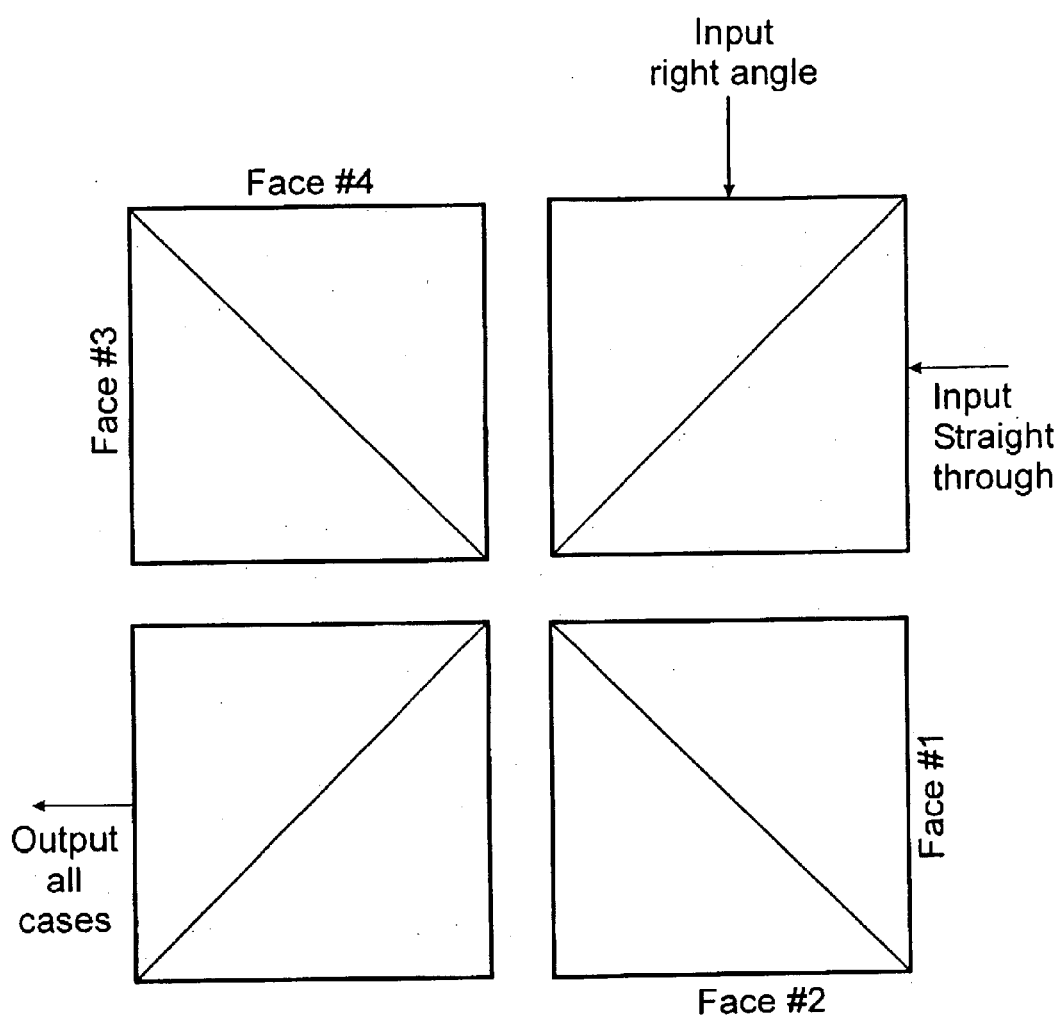
FIG. 18: DEFINITION OF IN-OUT ORIENTATION AND THE PRISM FACES

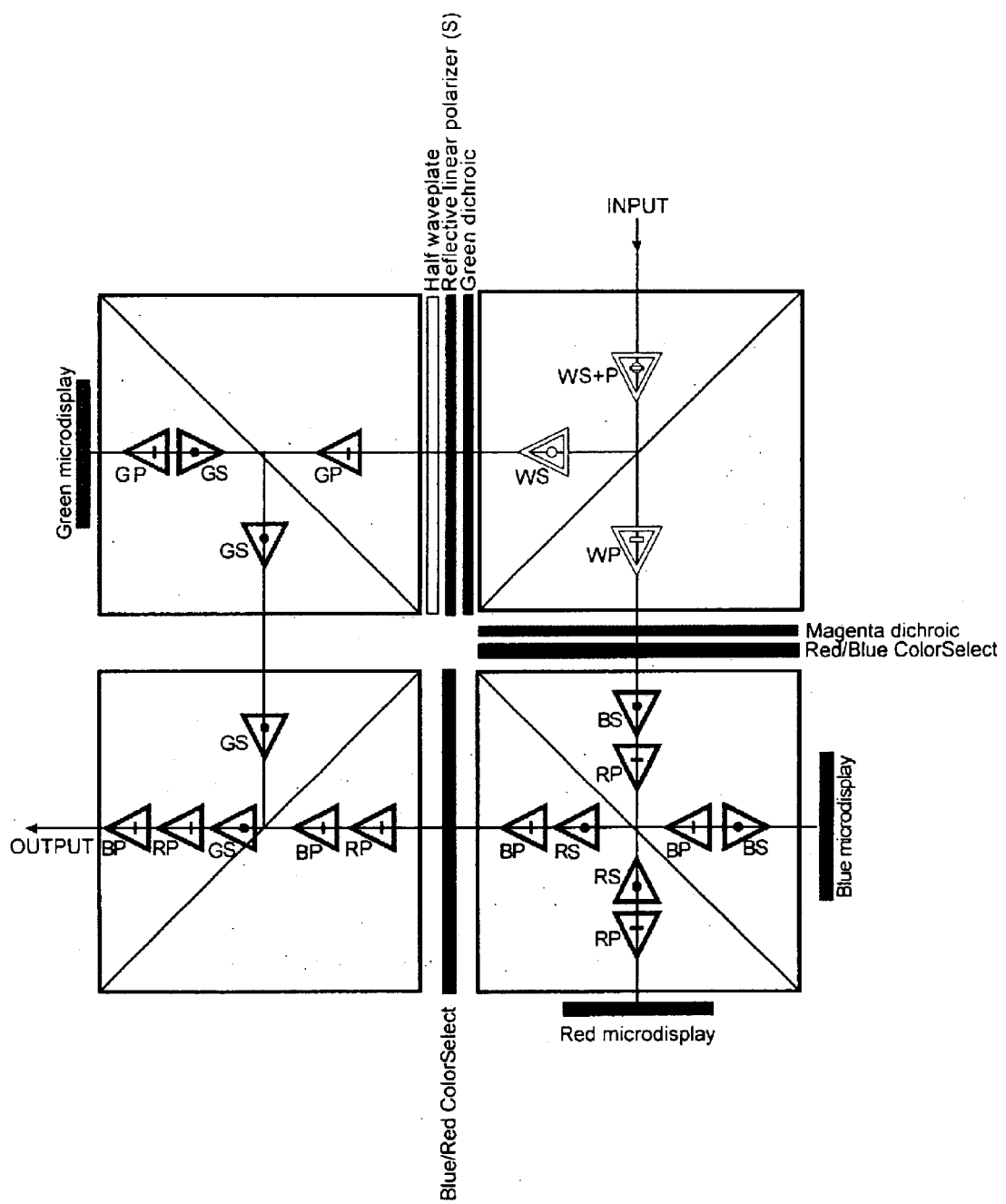
Fig. 19 - KERNEL CONFIGURATION

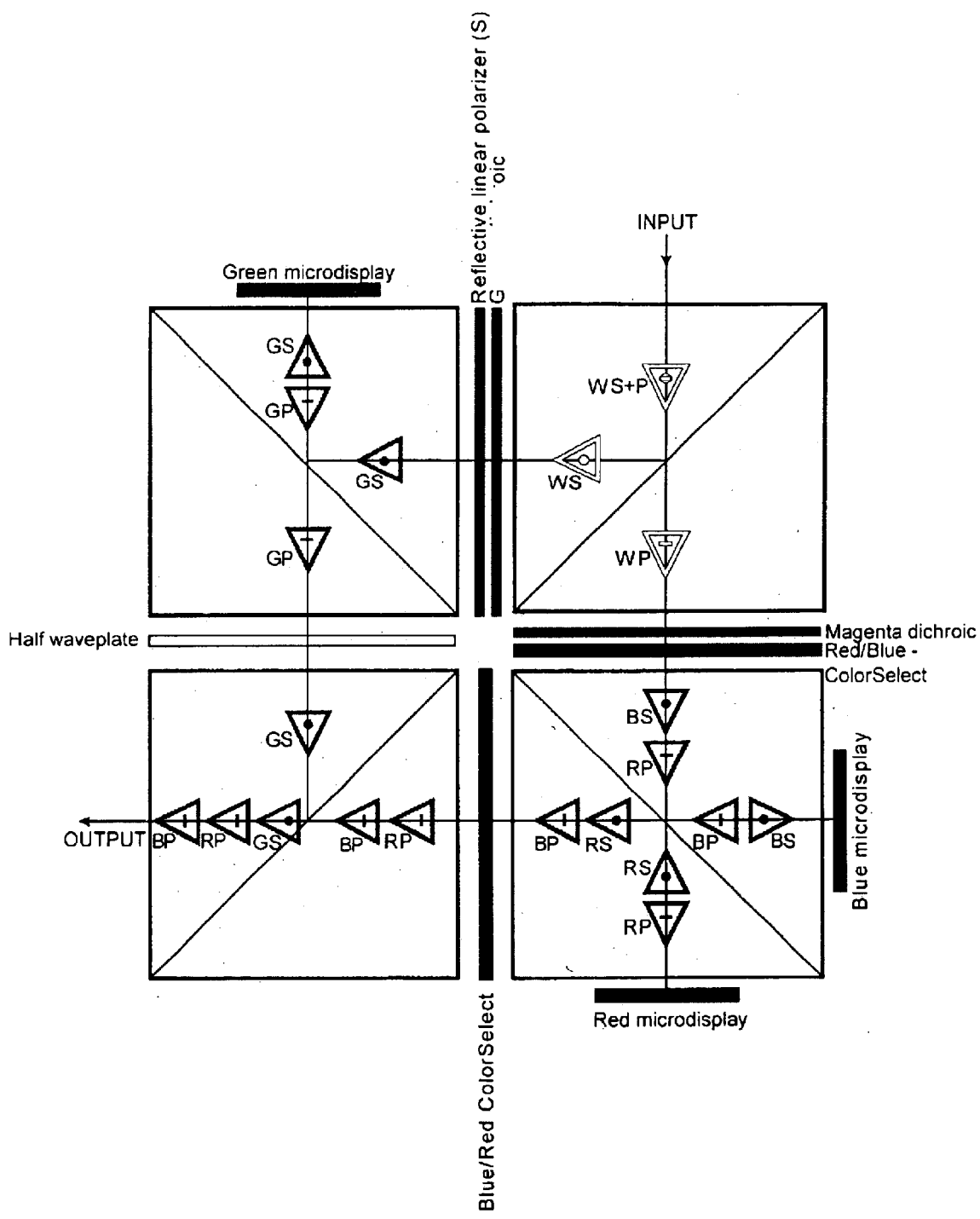
Fig. 20 - KERNEL CONFIGURATION

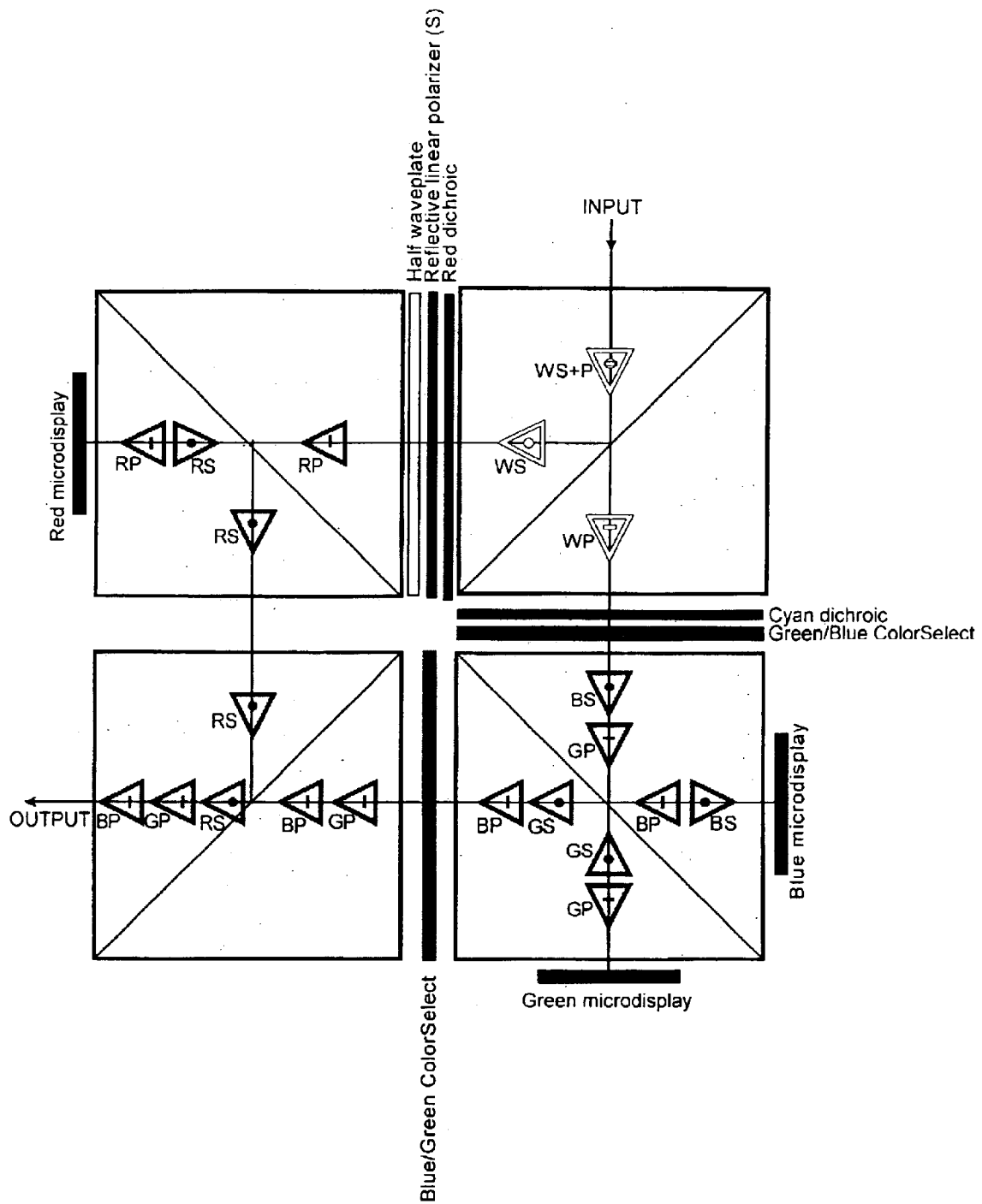
Fig. 21 - KERNEL CONFIGURATION

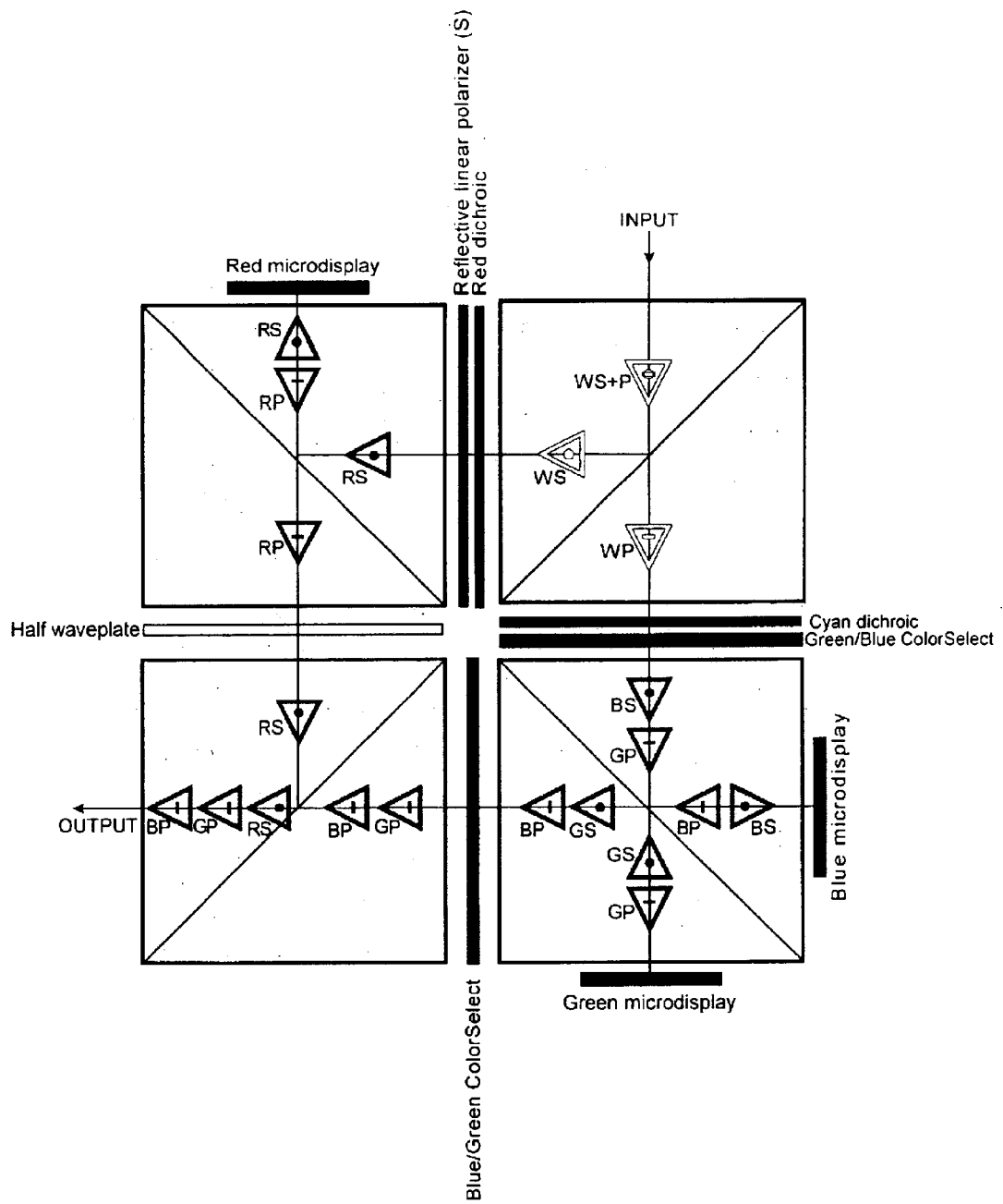
Fig. 22 KERNEL CONFIGURATION

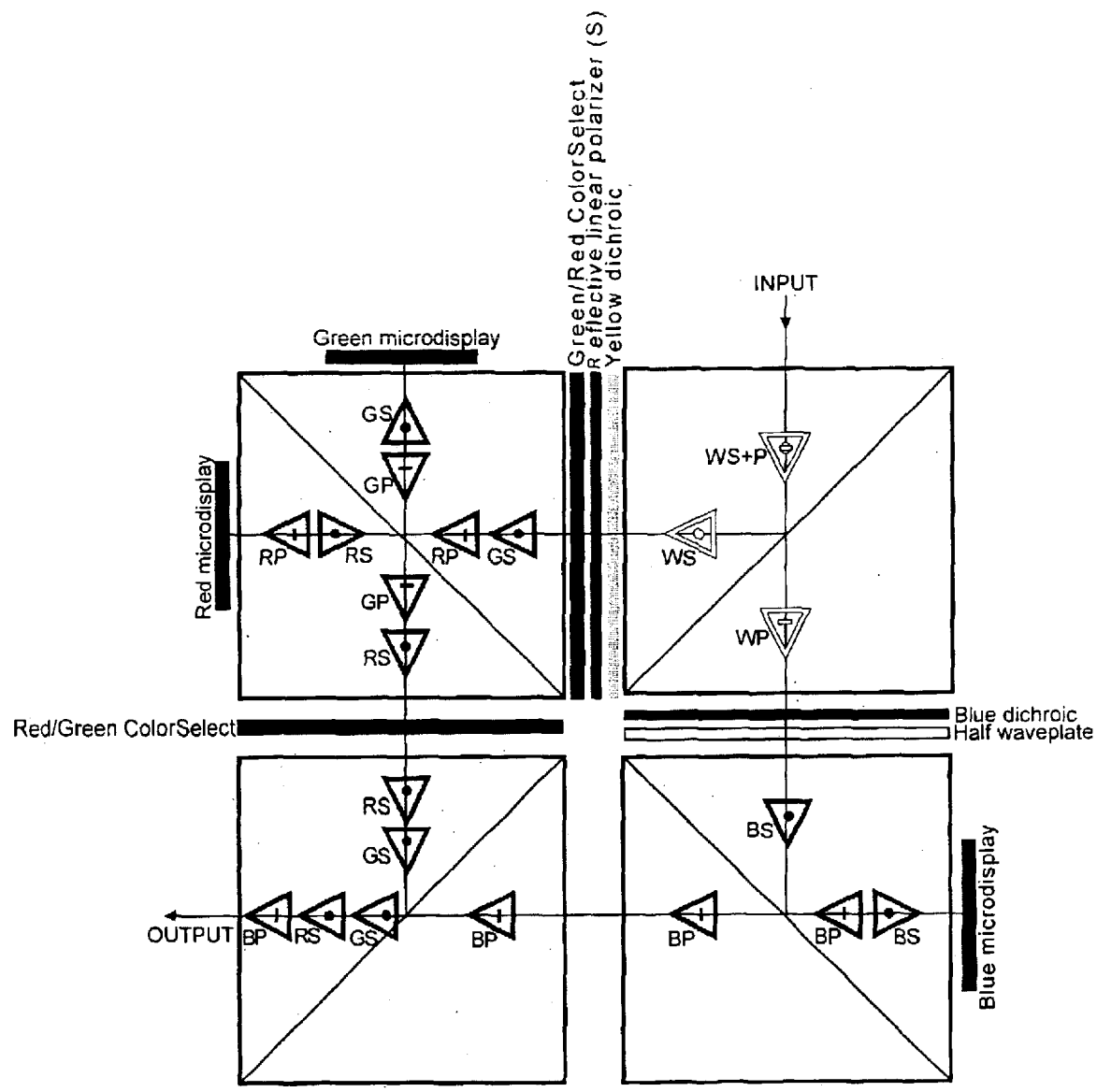
Fig. 23- KERNEL CONFIGURATION

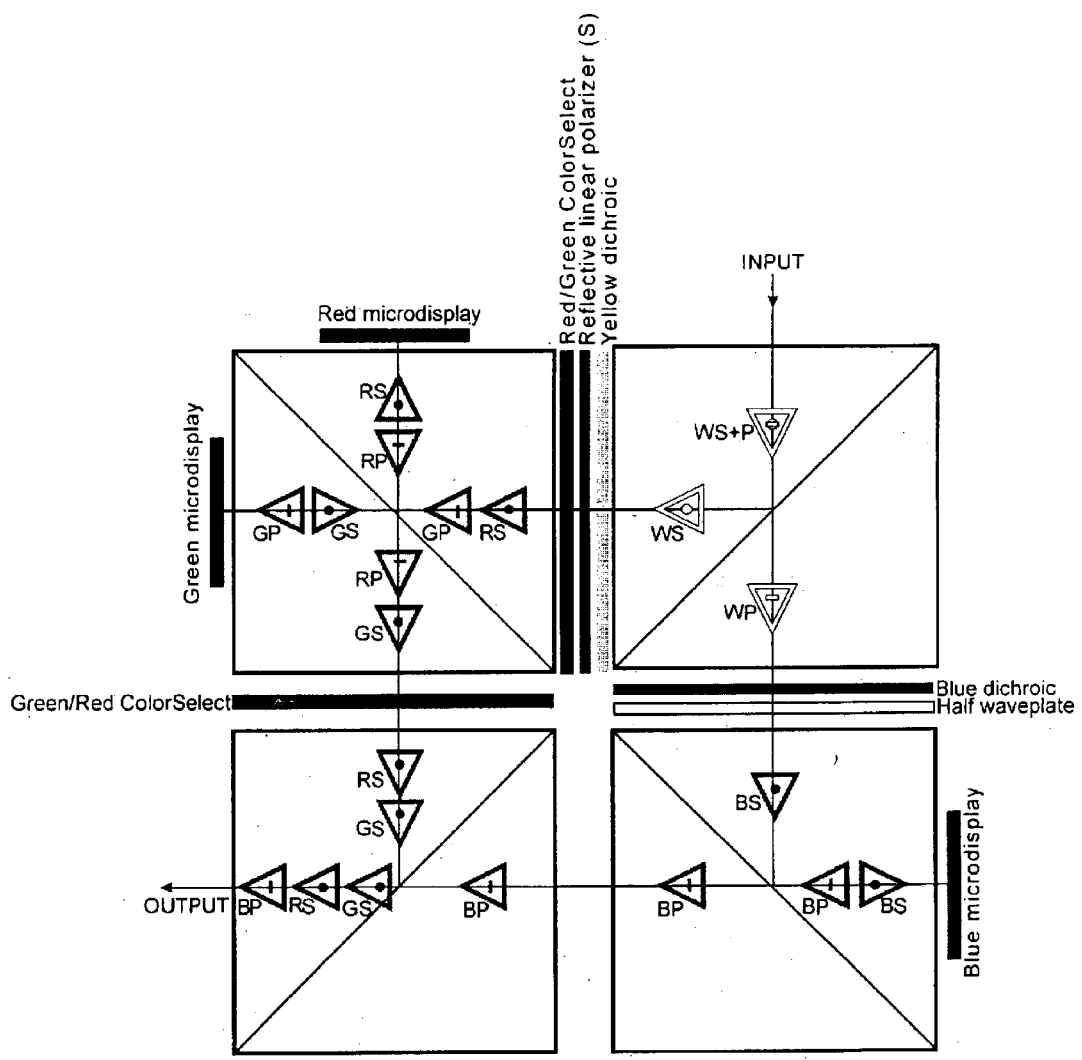
Fig. 24 - KERNEL CONFIGURATION

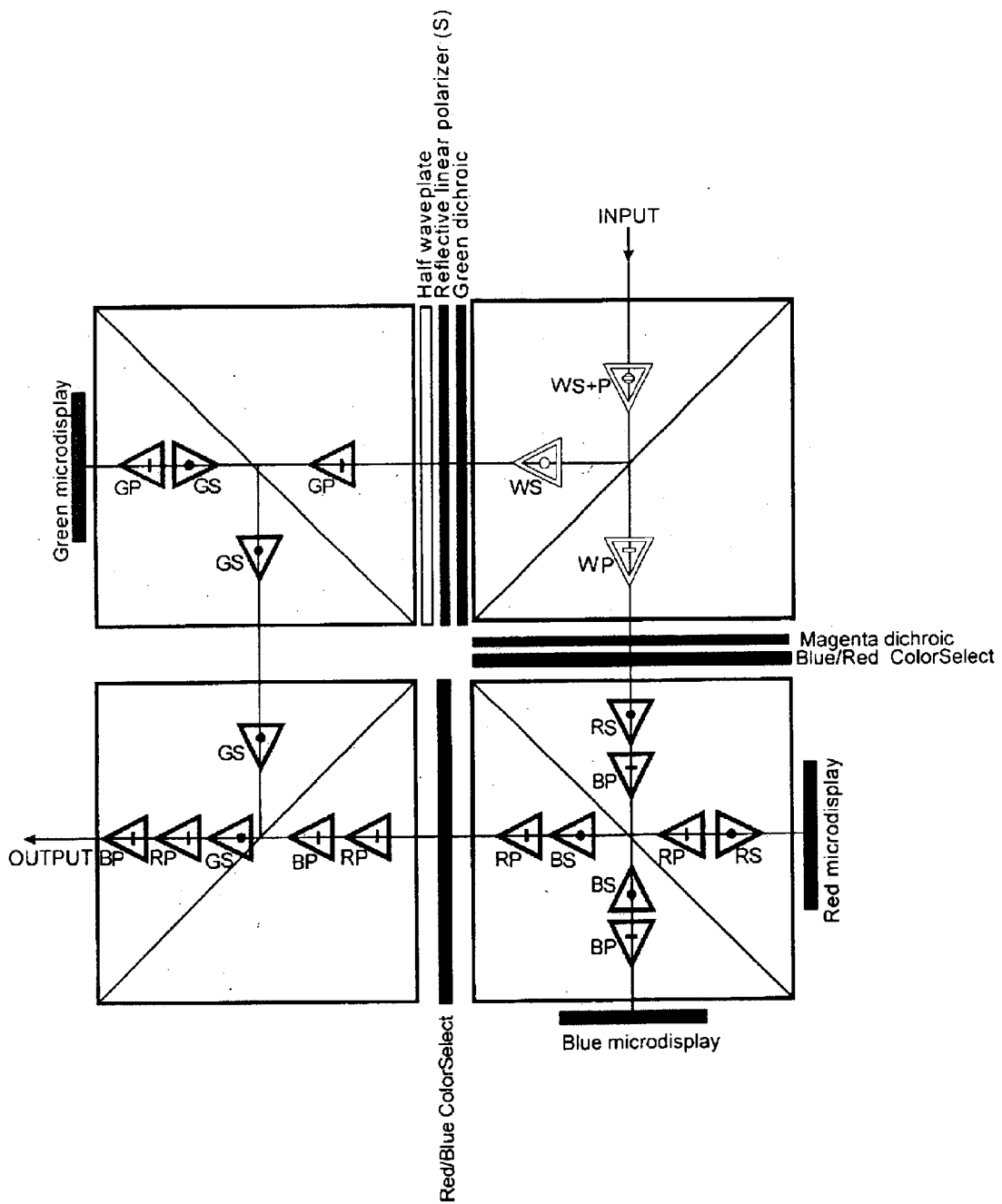
Fig. 25 - KERNEL CONFIGURATION

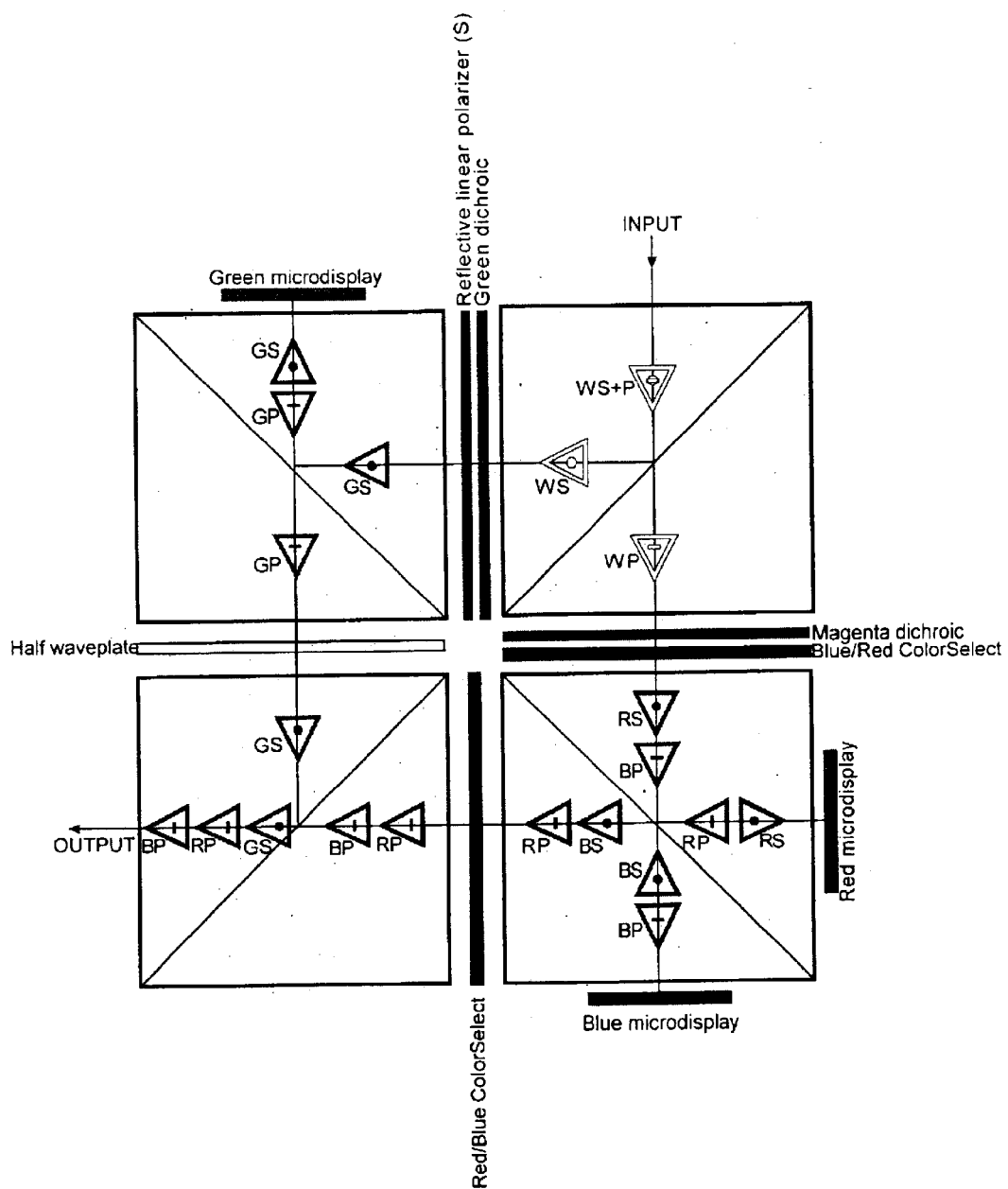
Fig. 26 - KERNEL CONFIGURATION

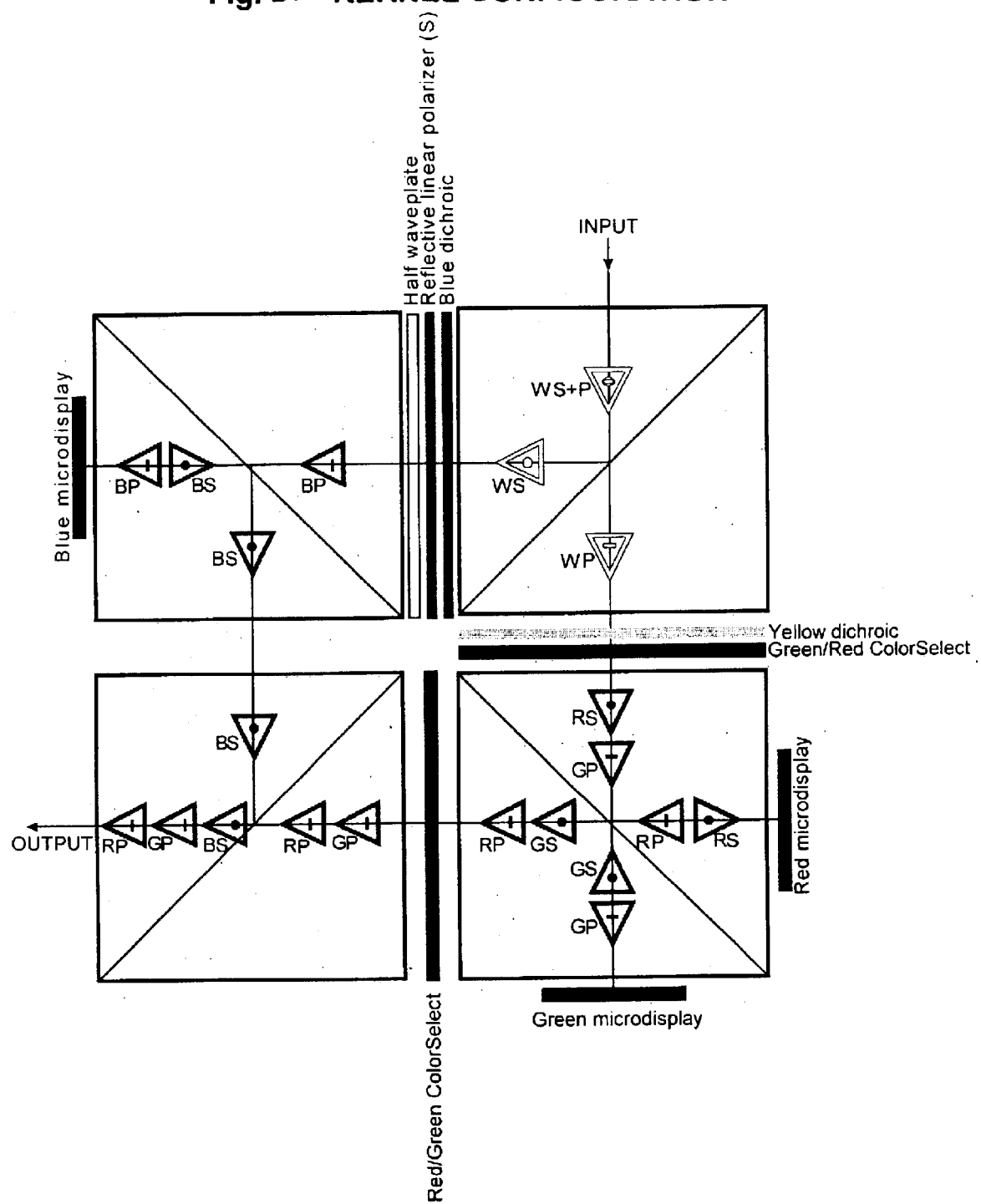
Fig. 27 - KERNEL CONFIGURATION

Fig. 28 - KERNEL CONFIGURATION
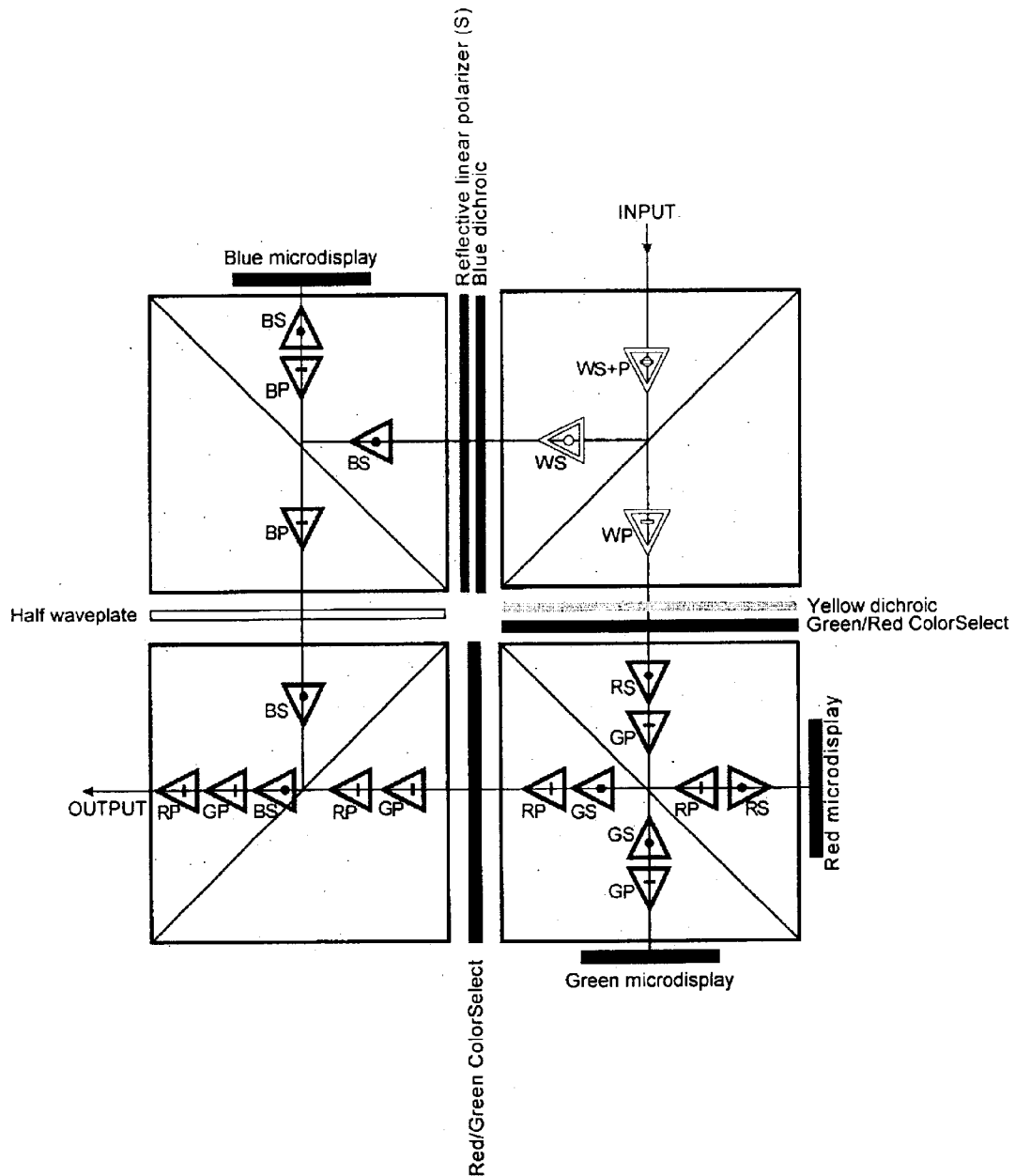

Fig. 29 - KERNEL CONFIGURATION
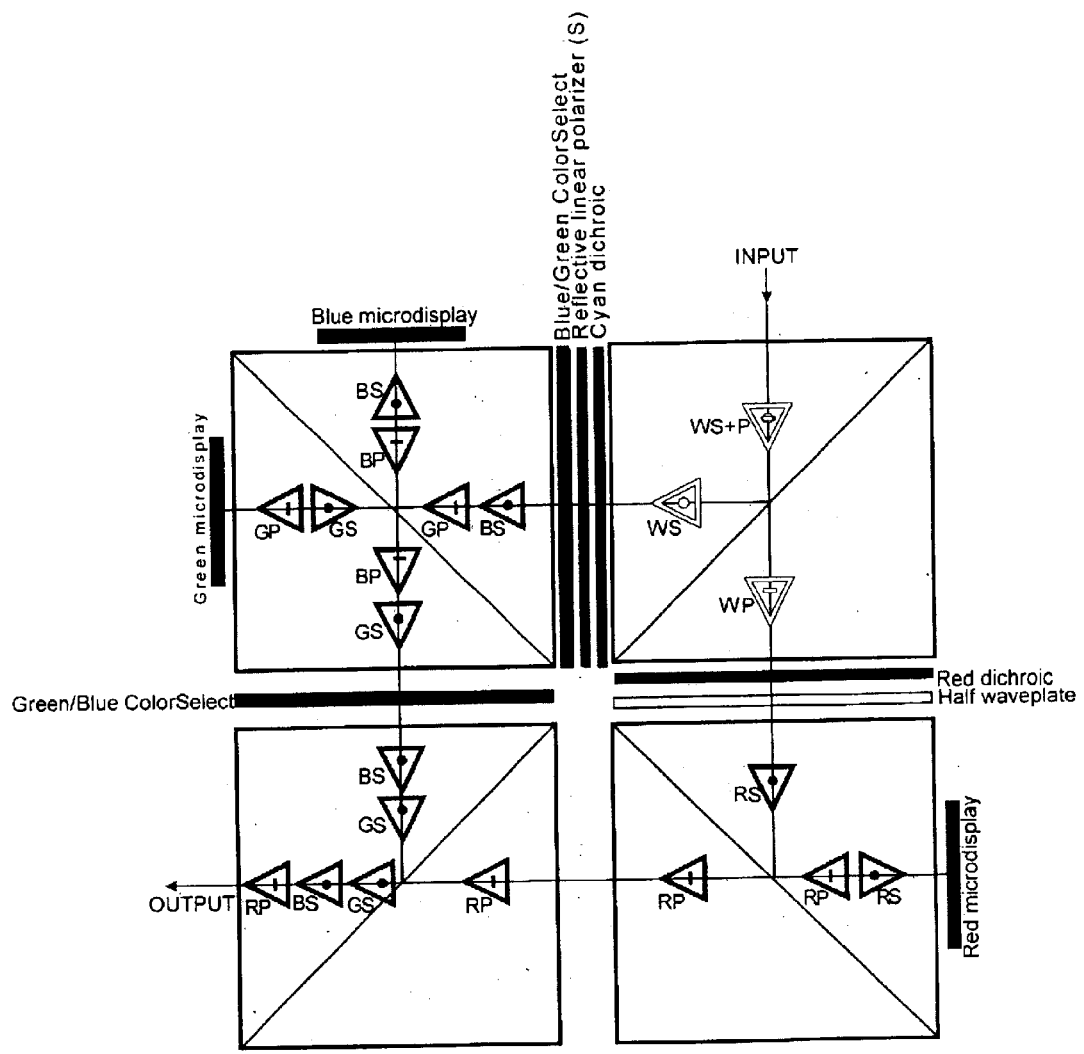

Fig. 30 - KERNEL CONFIGURATION
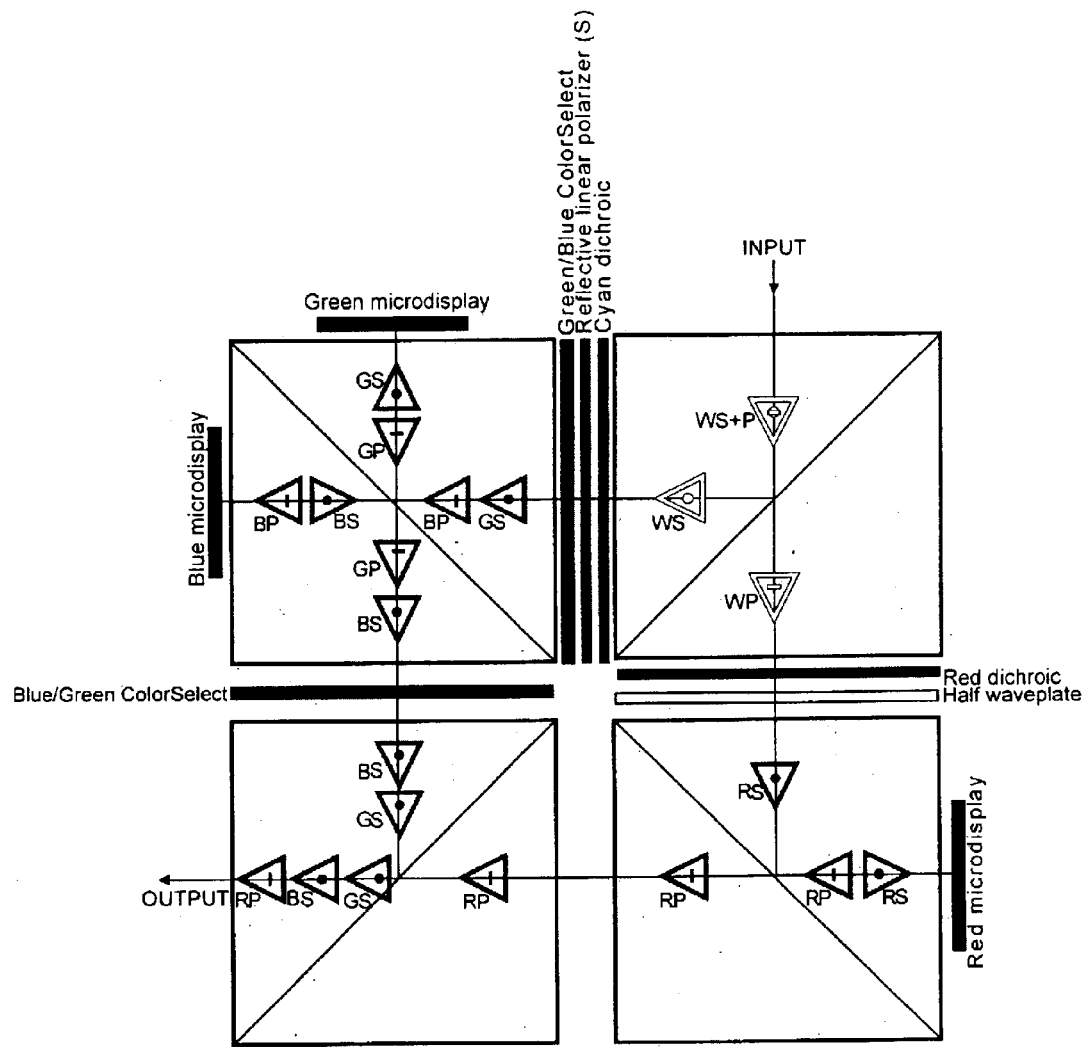

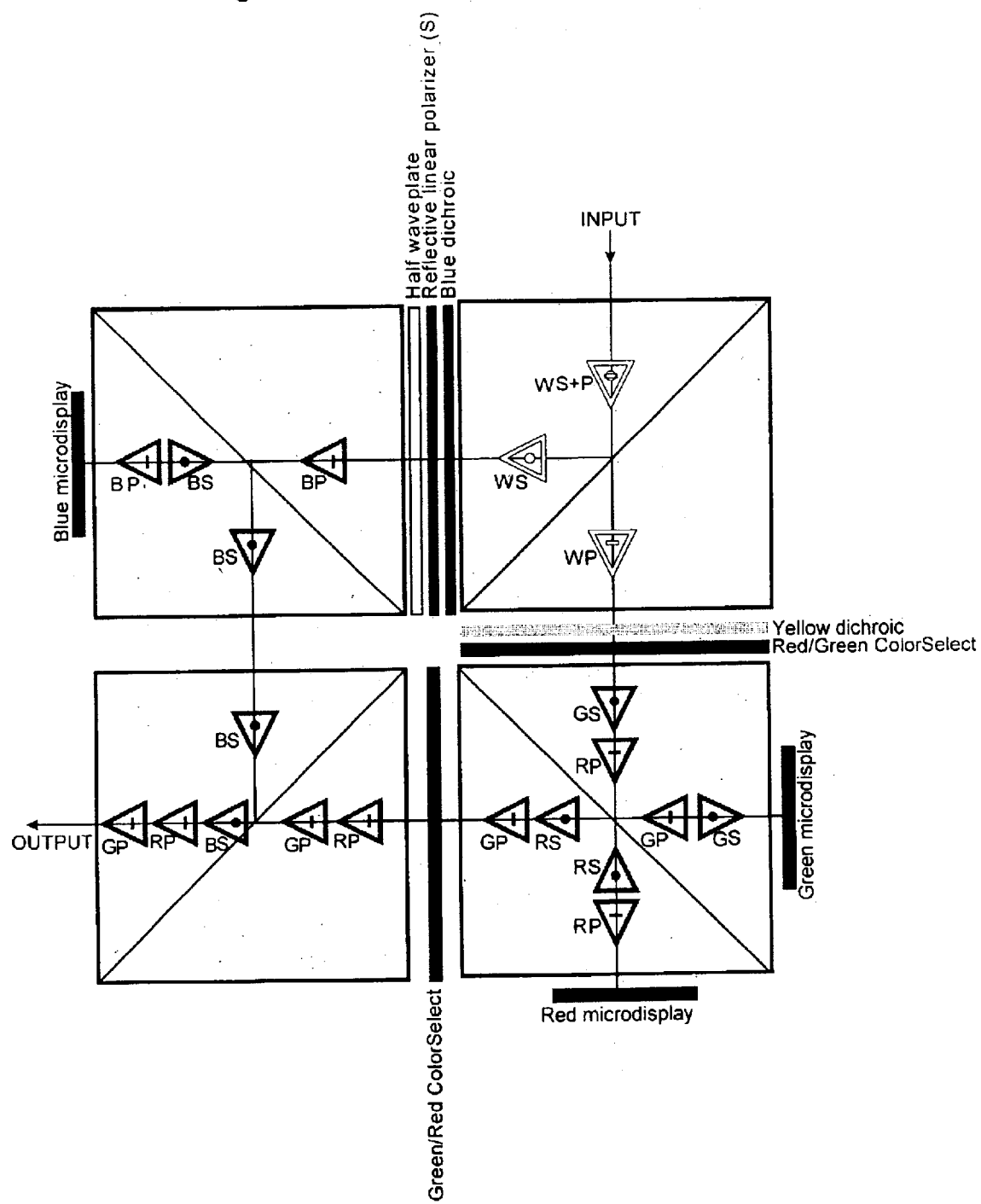
Fig. 31 - KERNEL CONFIGURATION

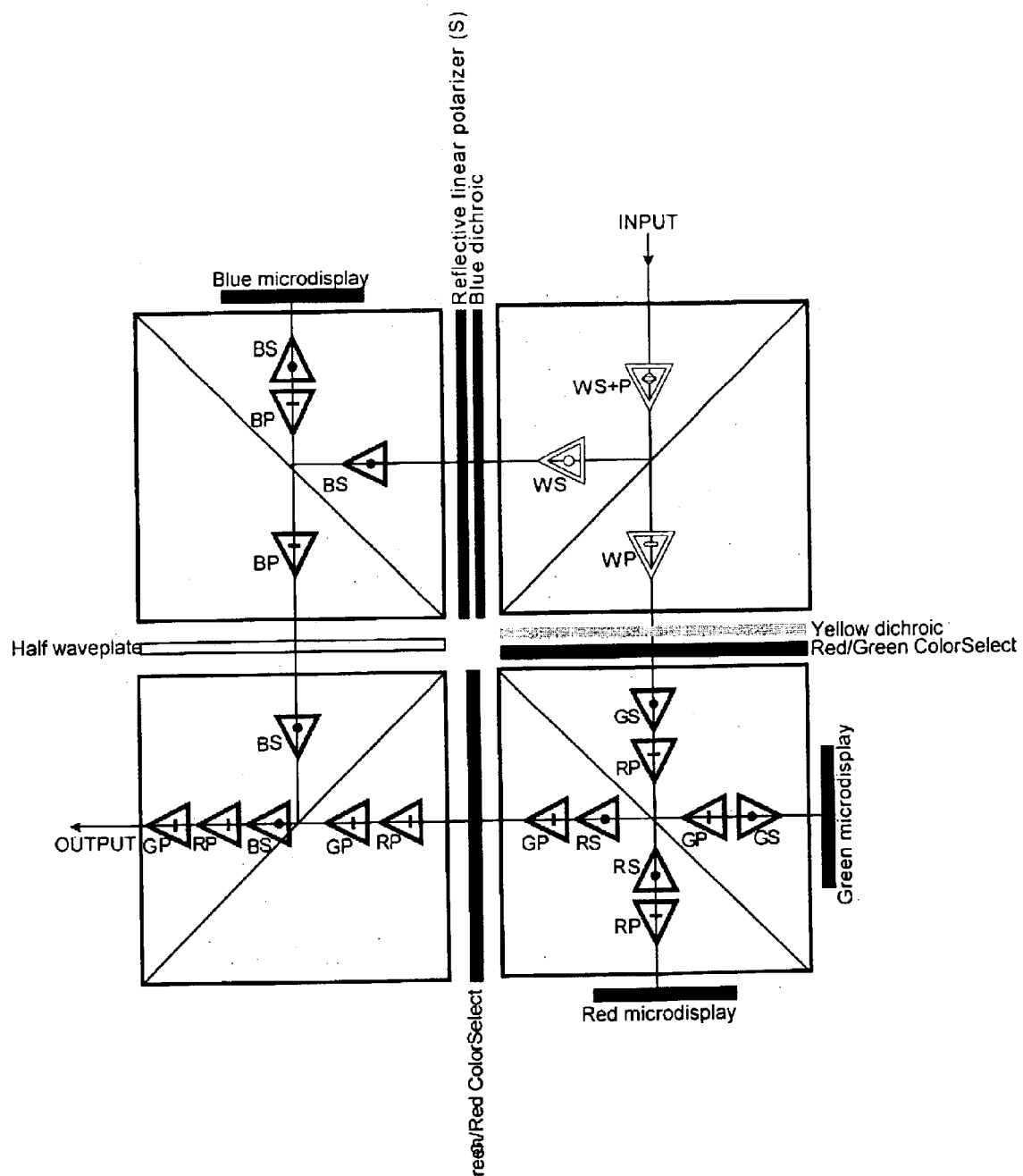
Fig. 32 - KERNEL CONFIGURATION

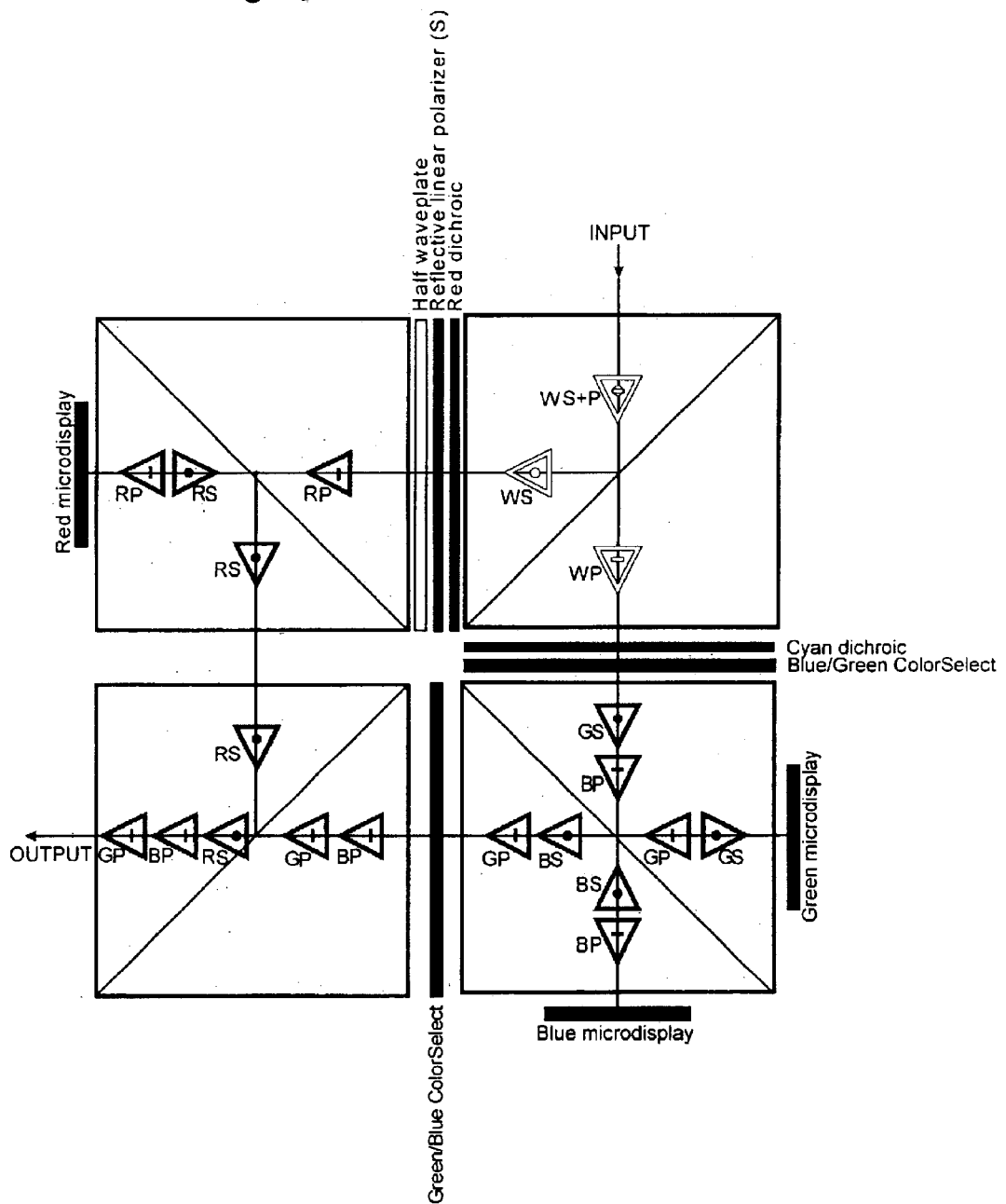
Fig. 33 - KERNEL CONFIGURATION

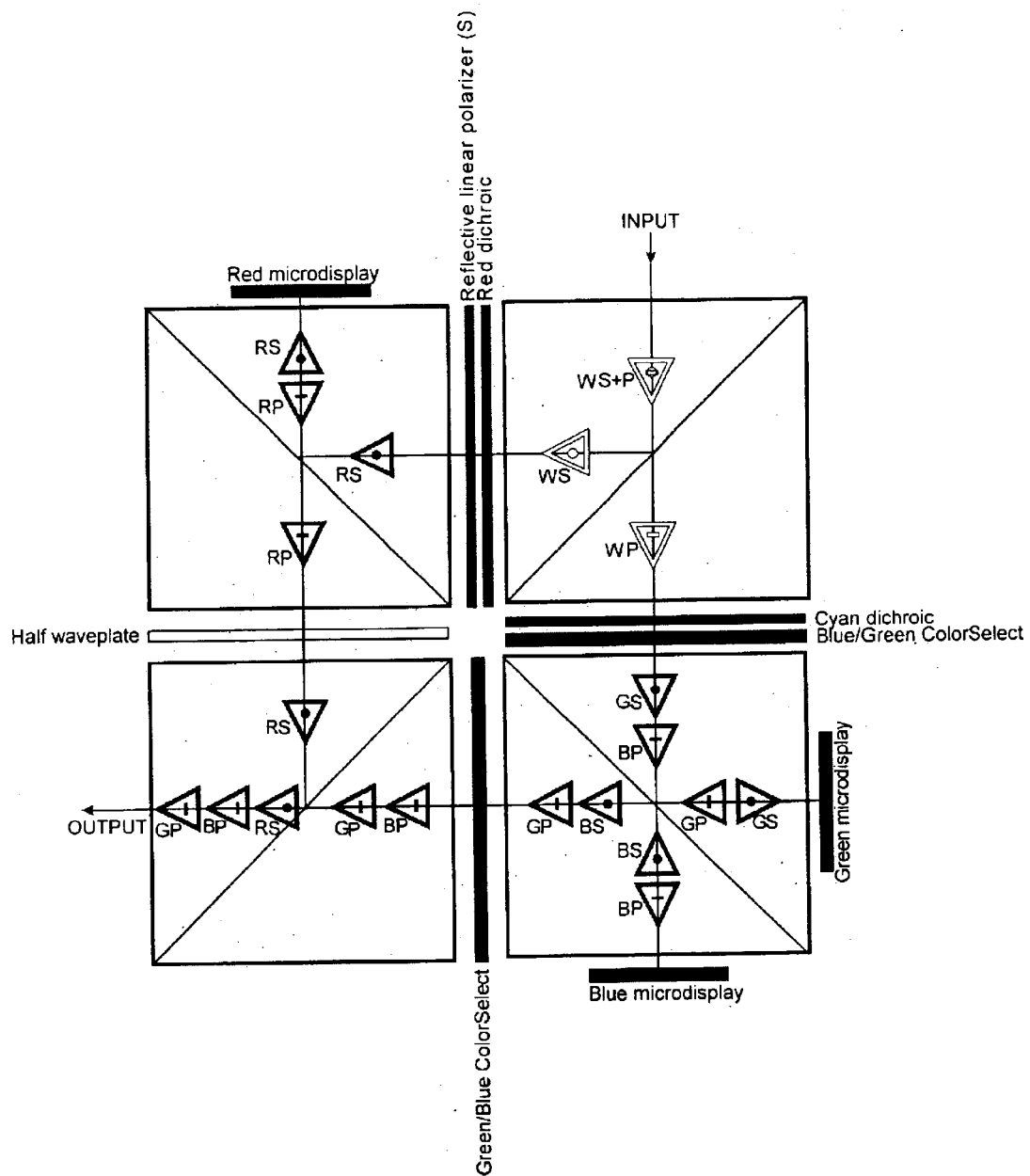
Fig. 34 - KERNEL CONFIGURATION

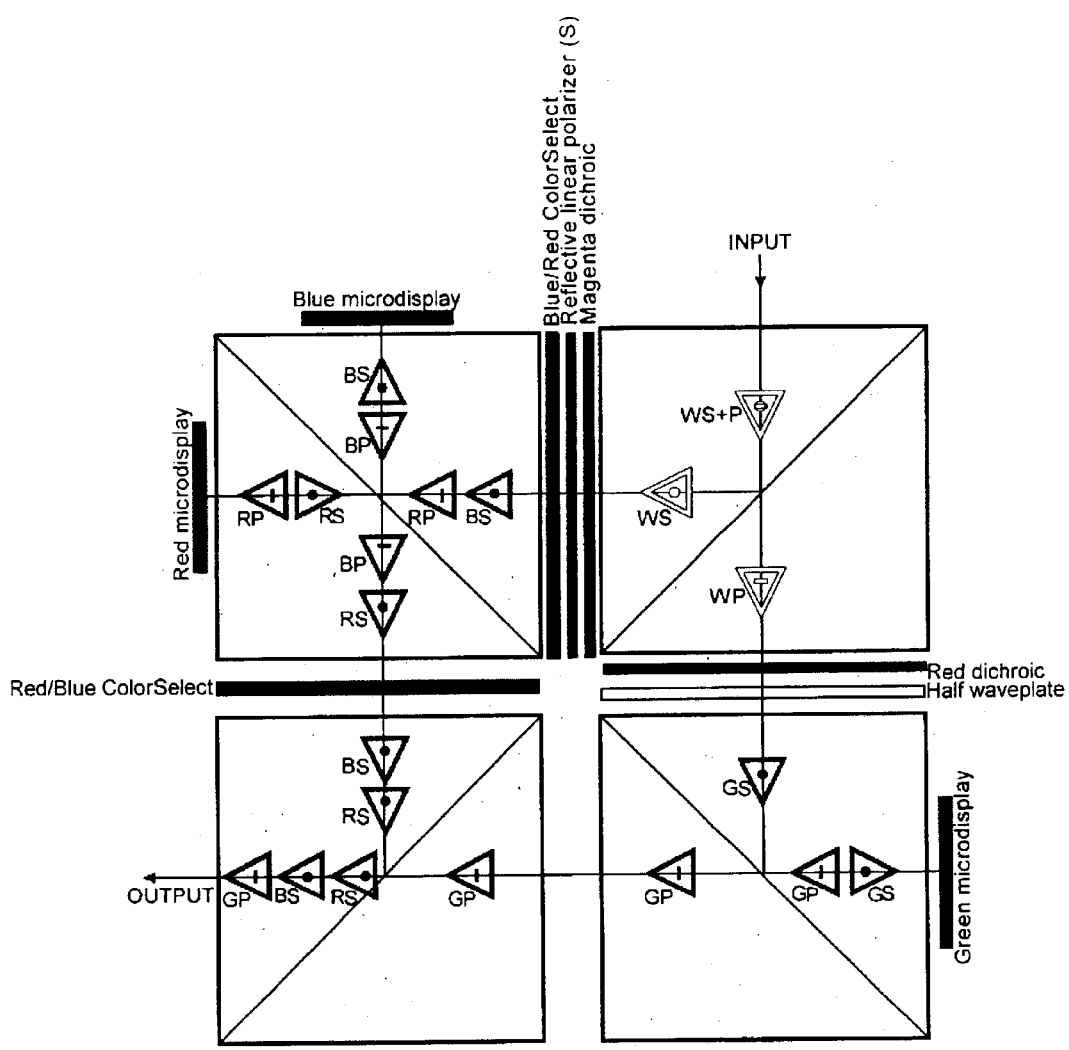
Fig. 35 - KERNEL CONFIGURATION

Fig. 36 - KERNEL CONFIGURATION
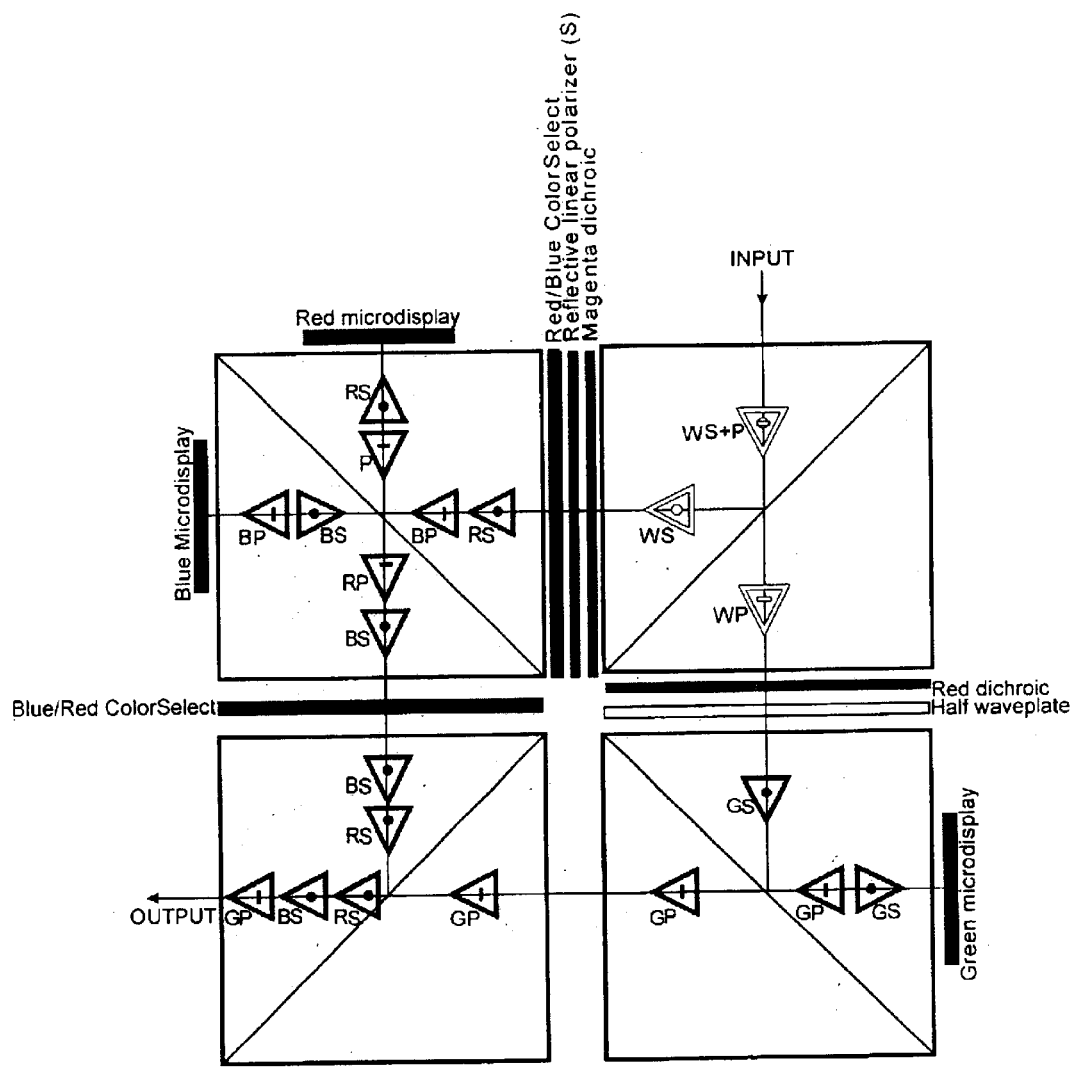

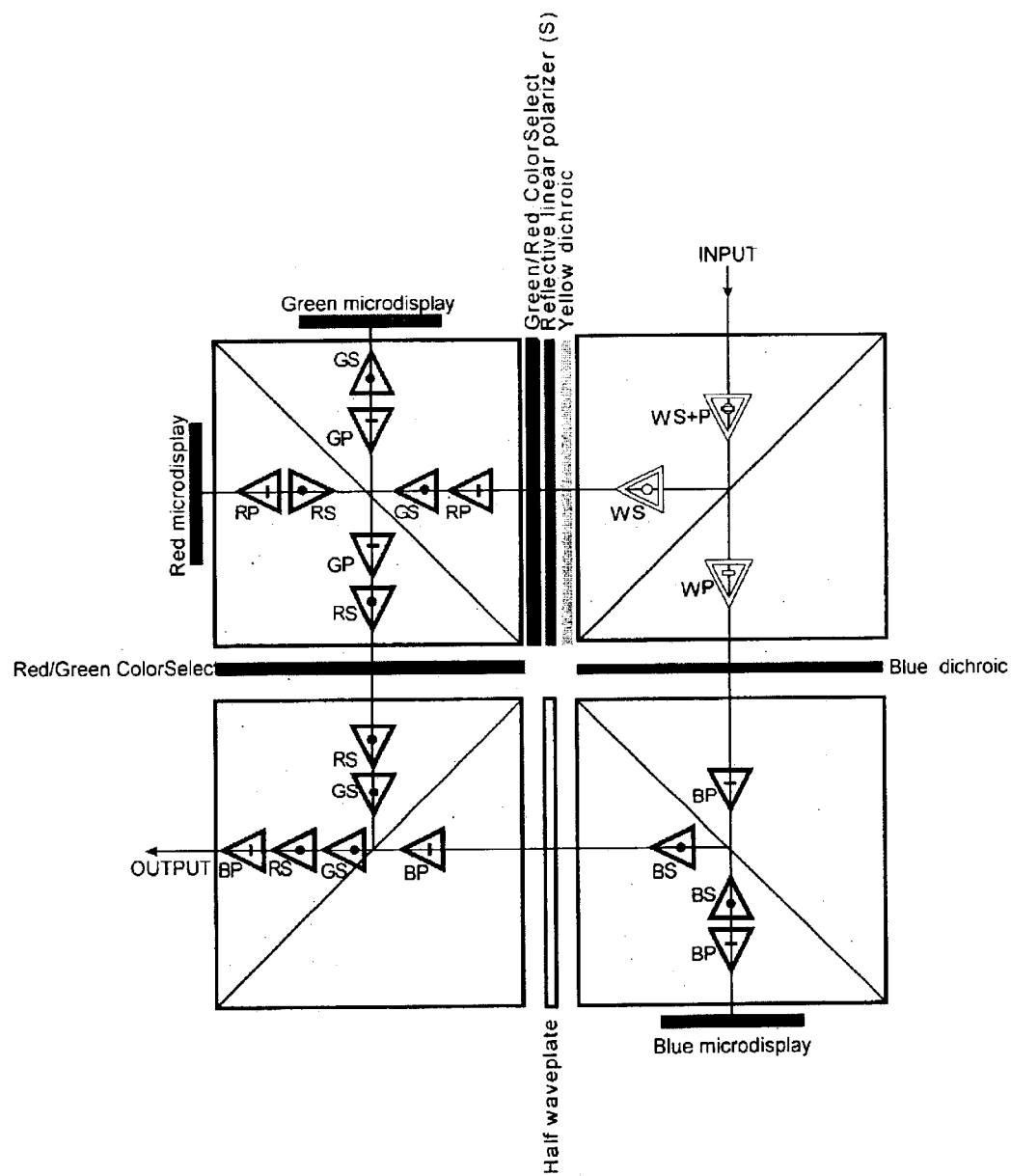

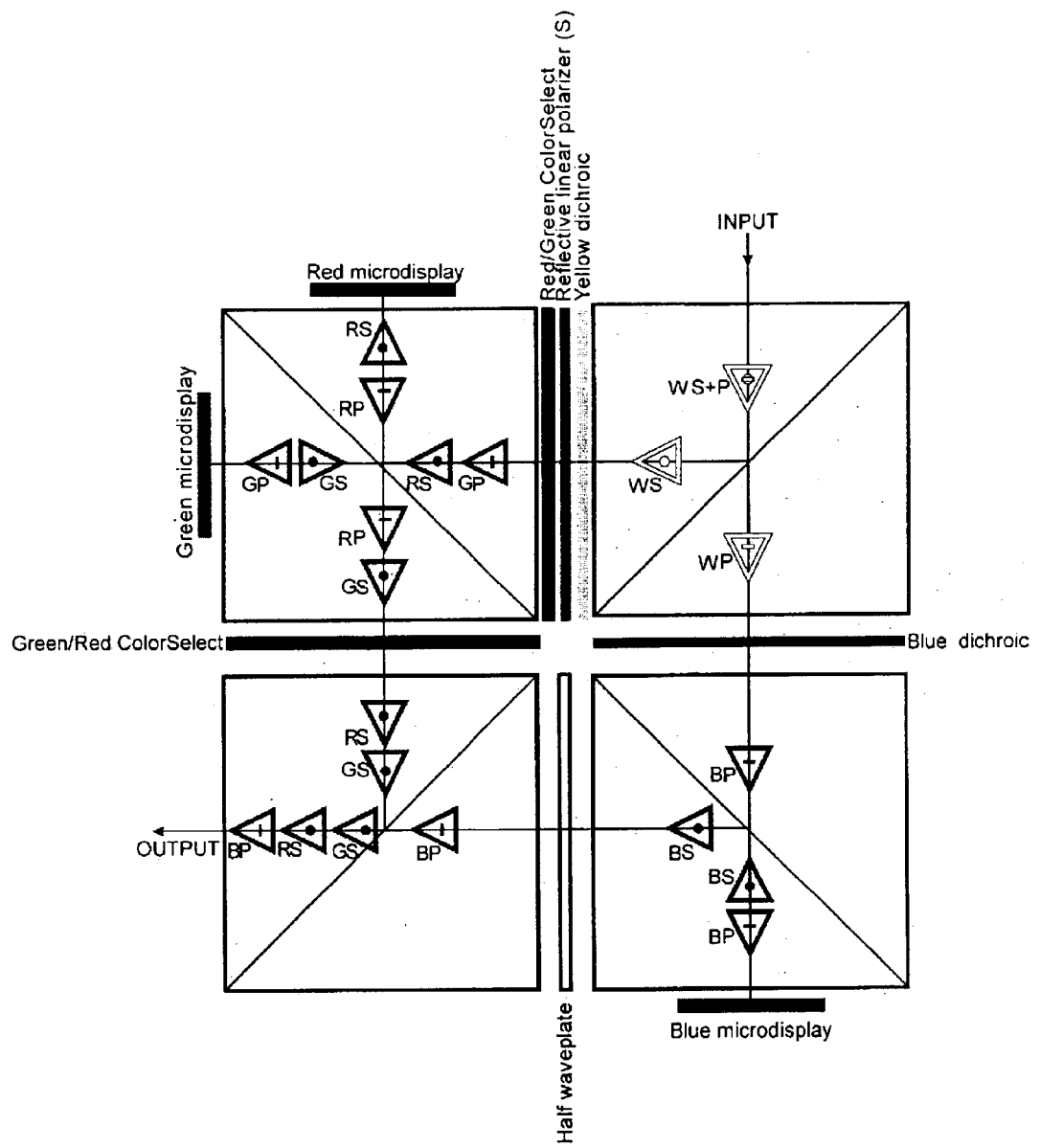
Fig. 38 - KERNEL CONFIGURATION

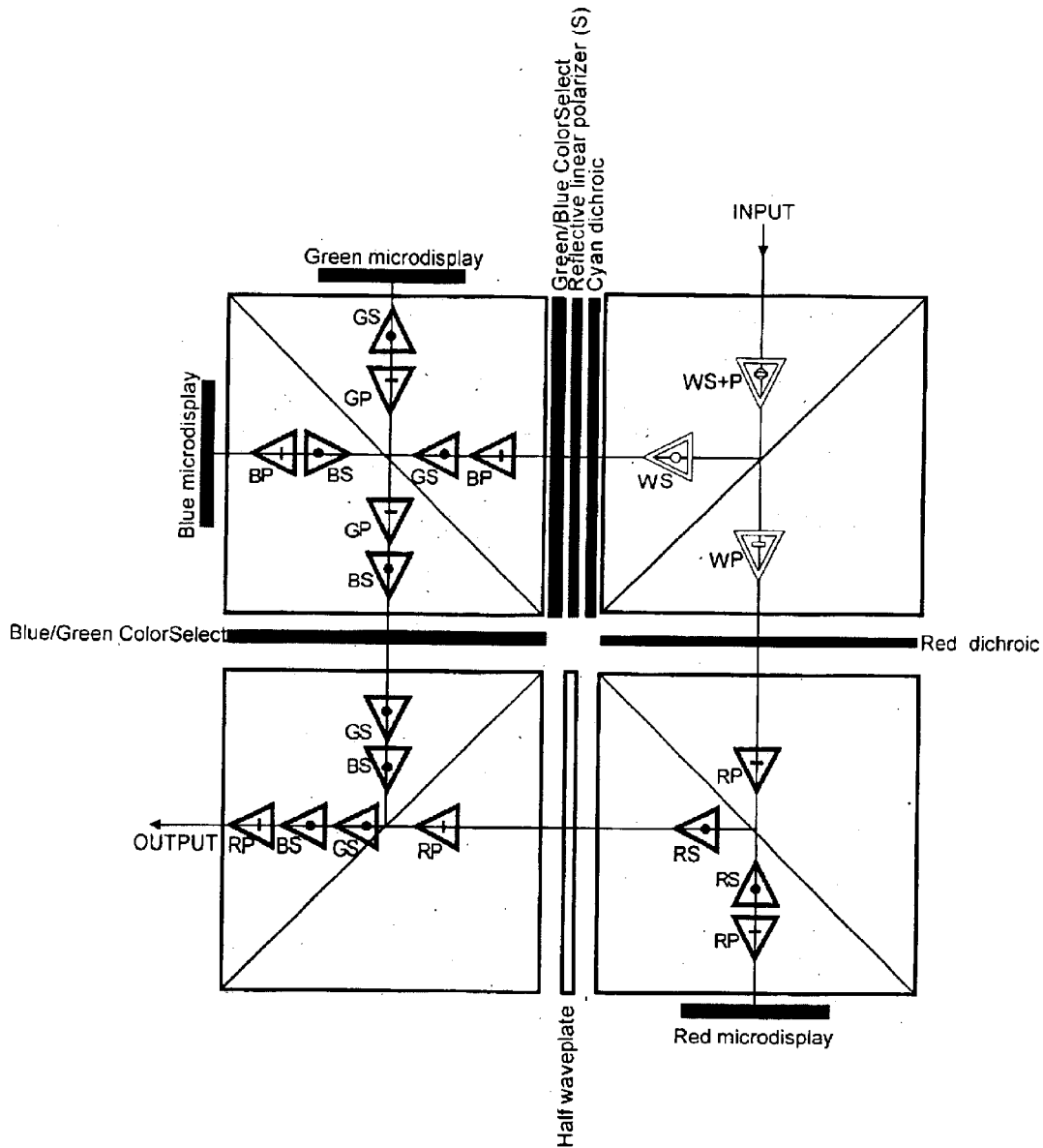
Fig. 39 - KERNEL CONFIGURATION

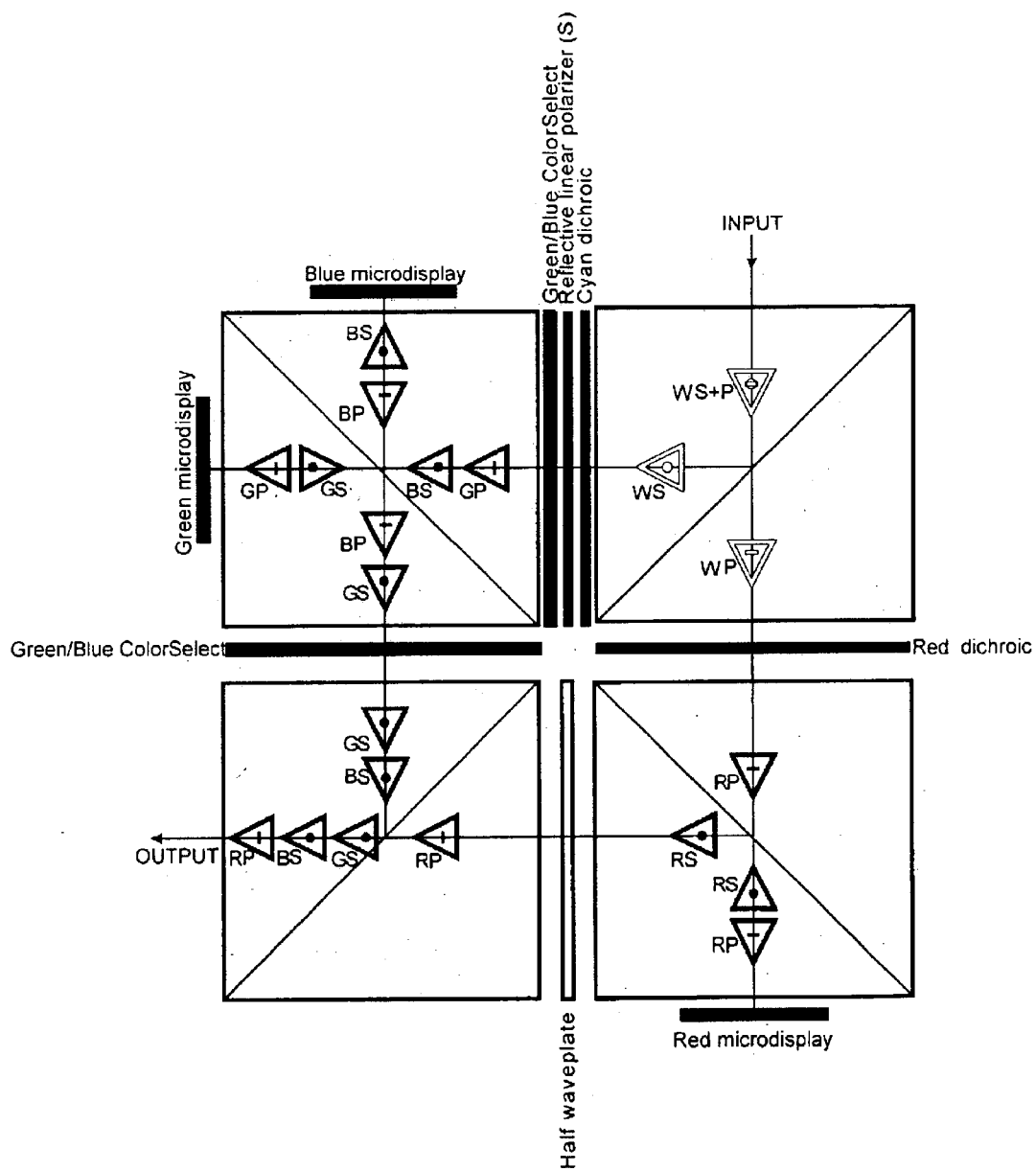
Fig. 4o - KERNEL CONFIGURATION

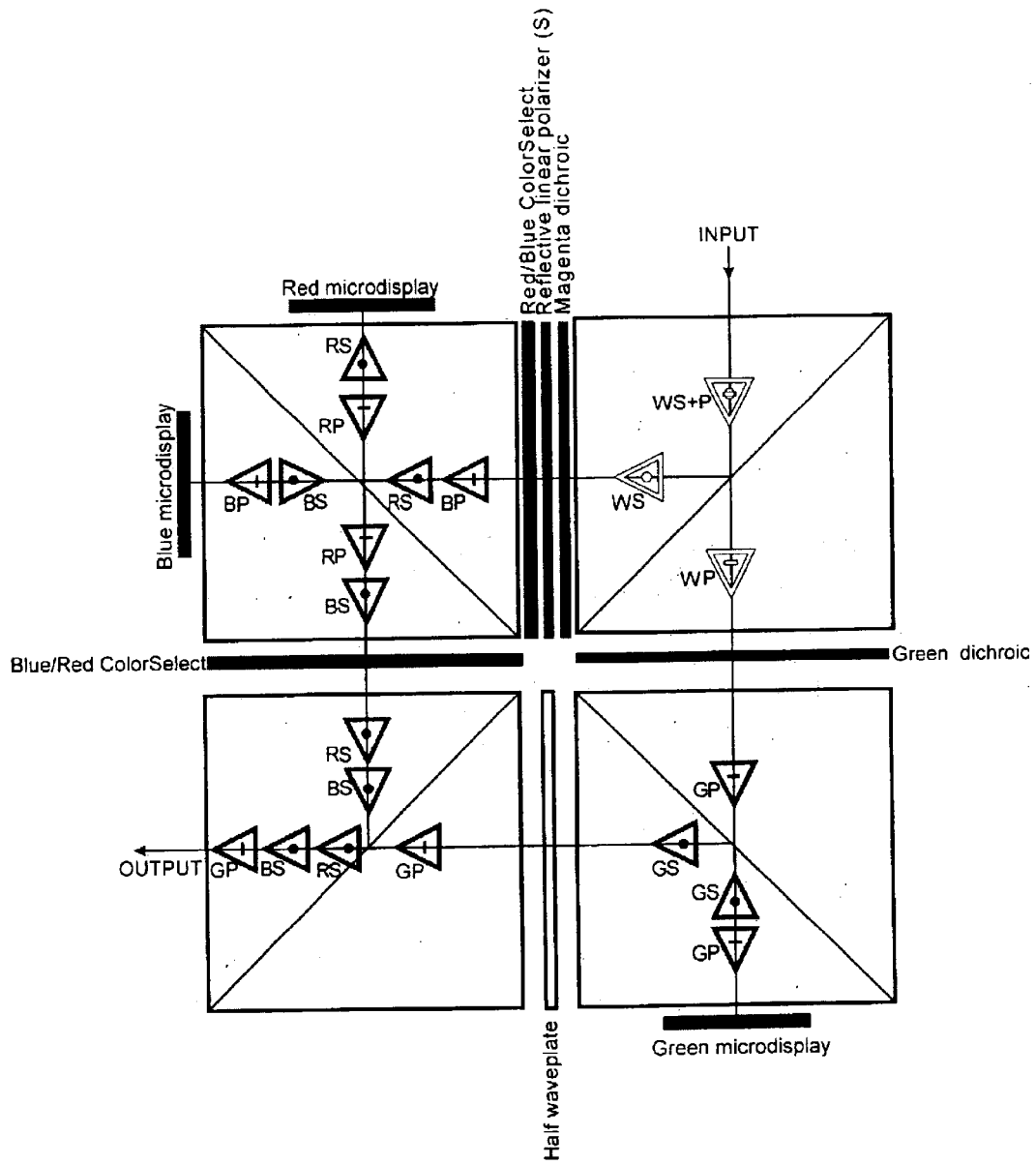
Fig. 41 - KERNEL CONFIGURATION

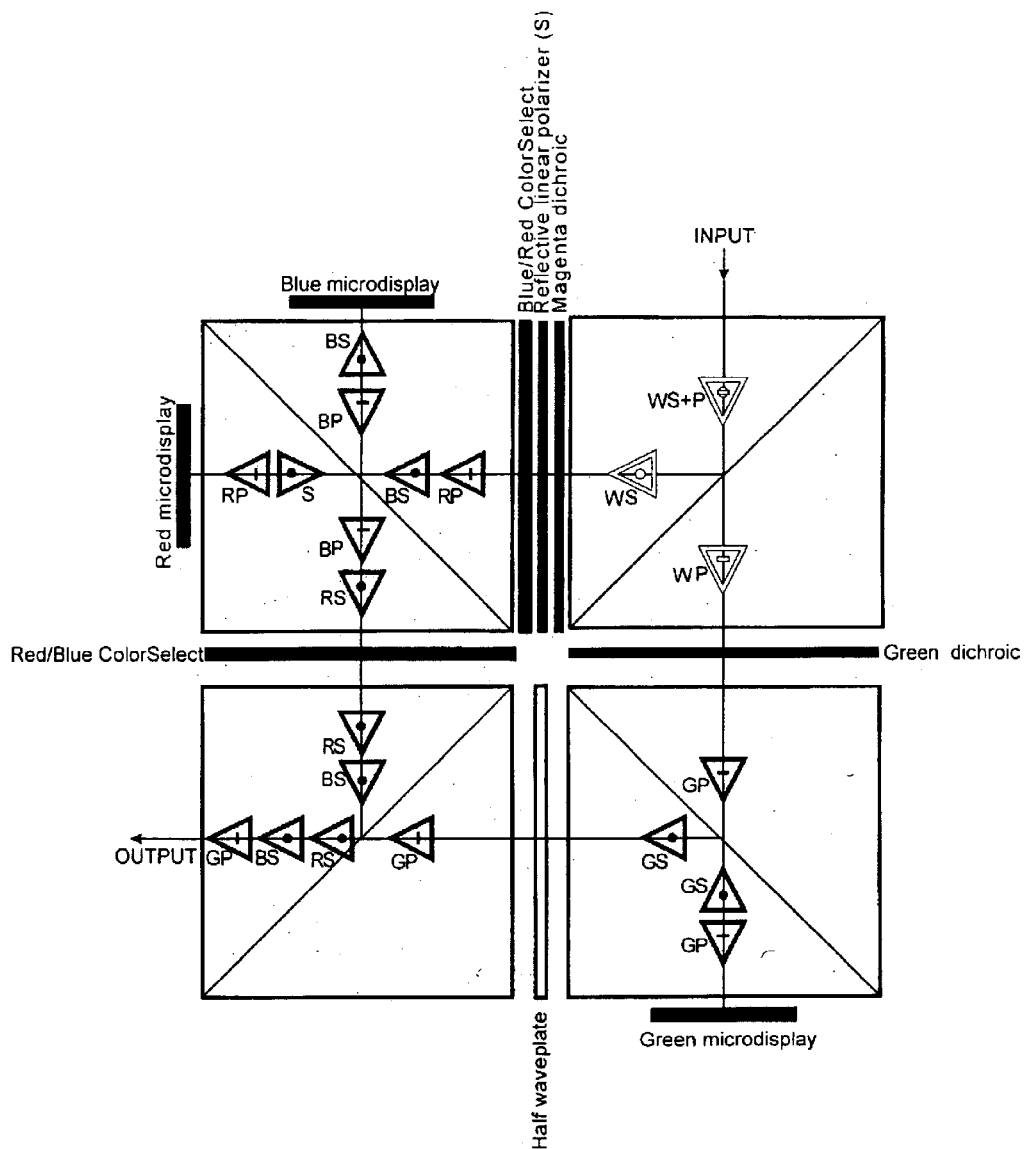
Fig. 42 - KERNEL CONFIGURATION

Fig. 43 - KERNEL CONFIGURATION
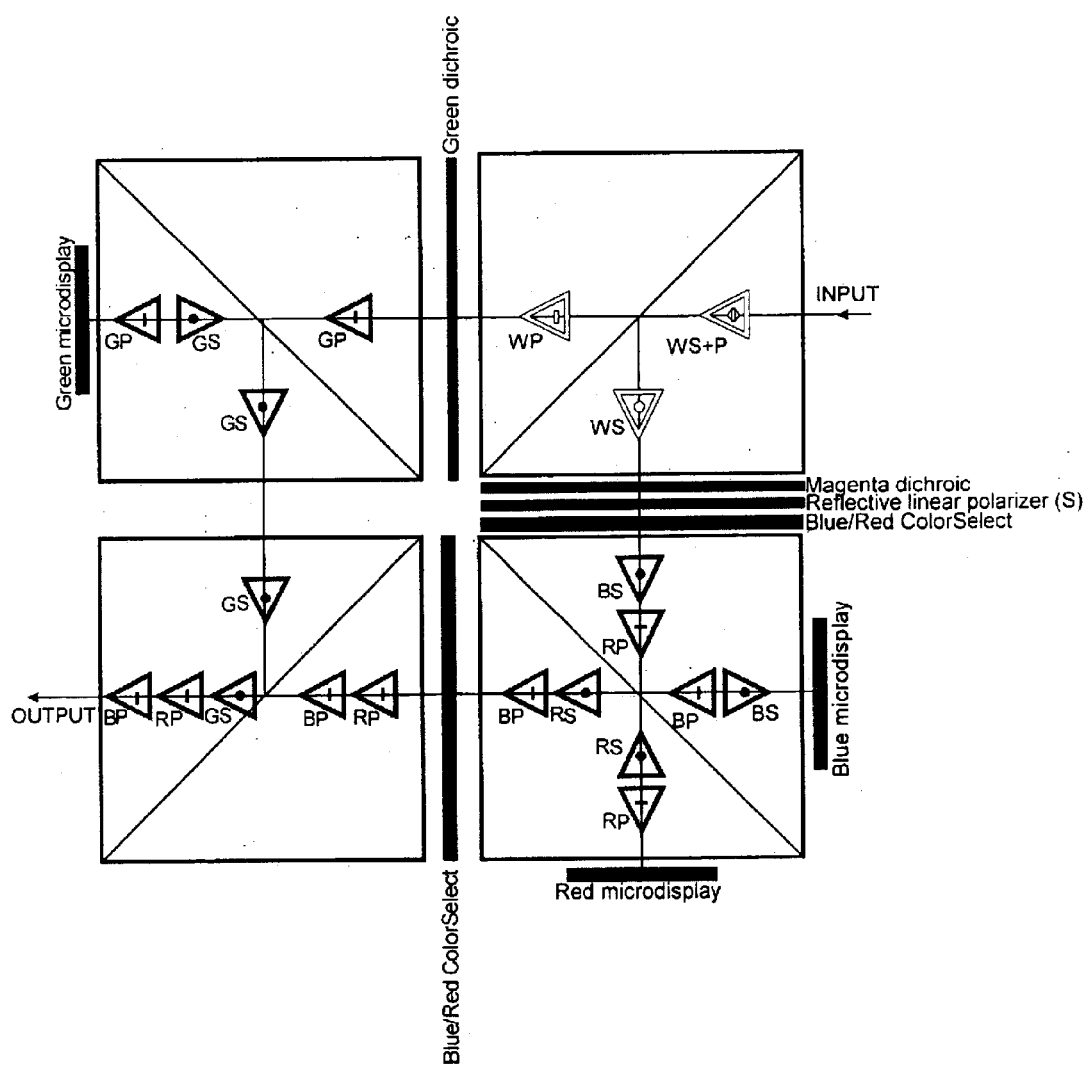

Fig. 44 - KERNEL CONFIGURATION
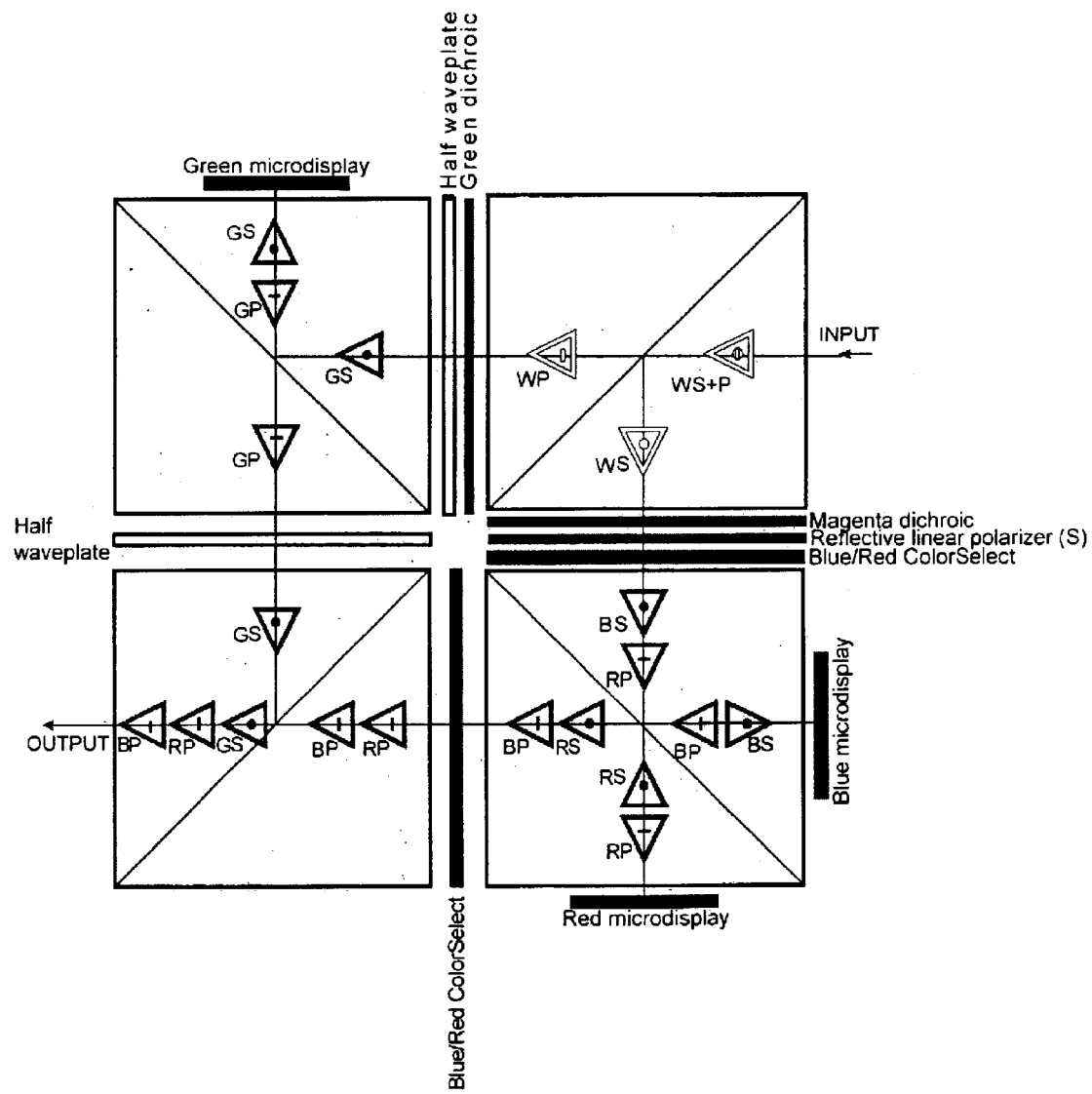

Fig. 45 - KERNEL CONFIGURATION
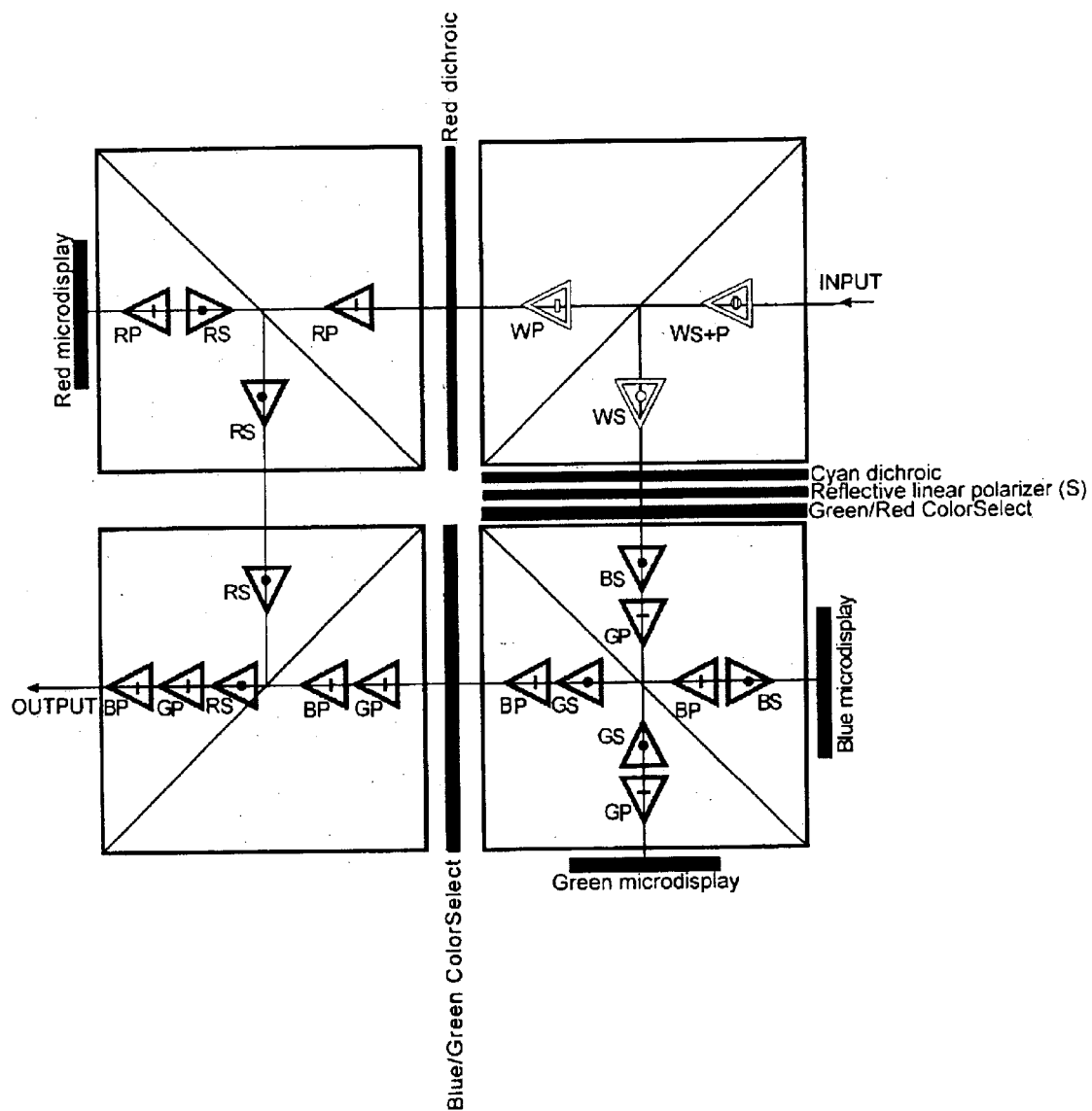

Fig. 4b - KERNEL CONFIGURATION
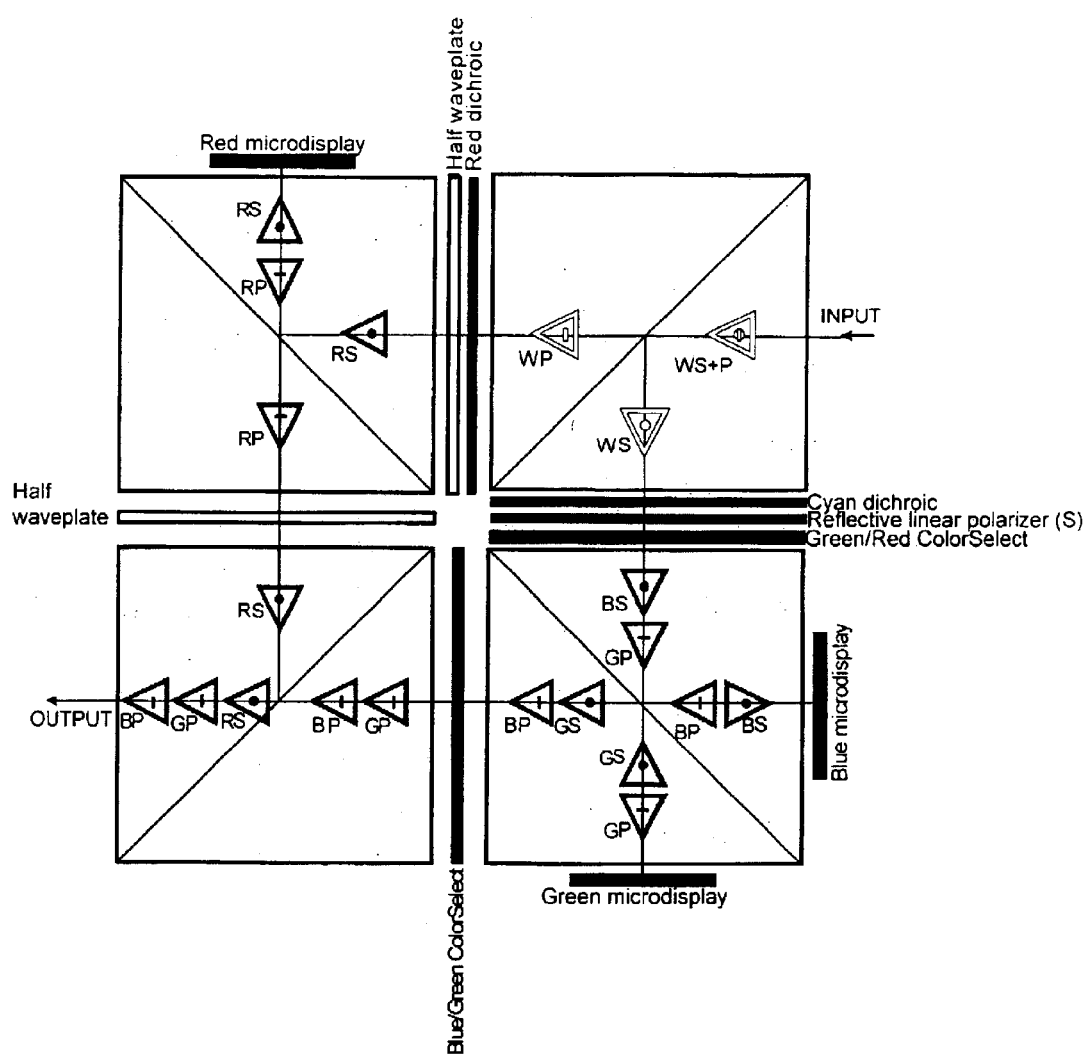

Fig. 47 - KERNEL CONFIGURATION
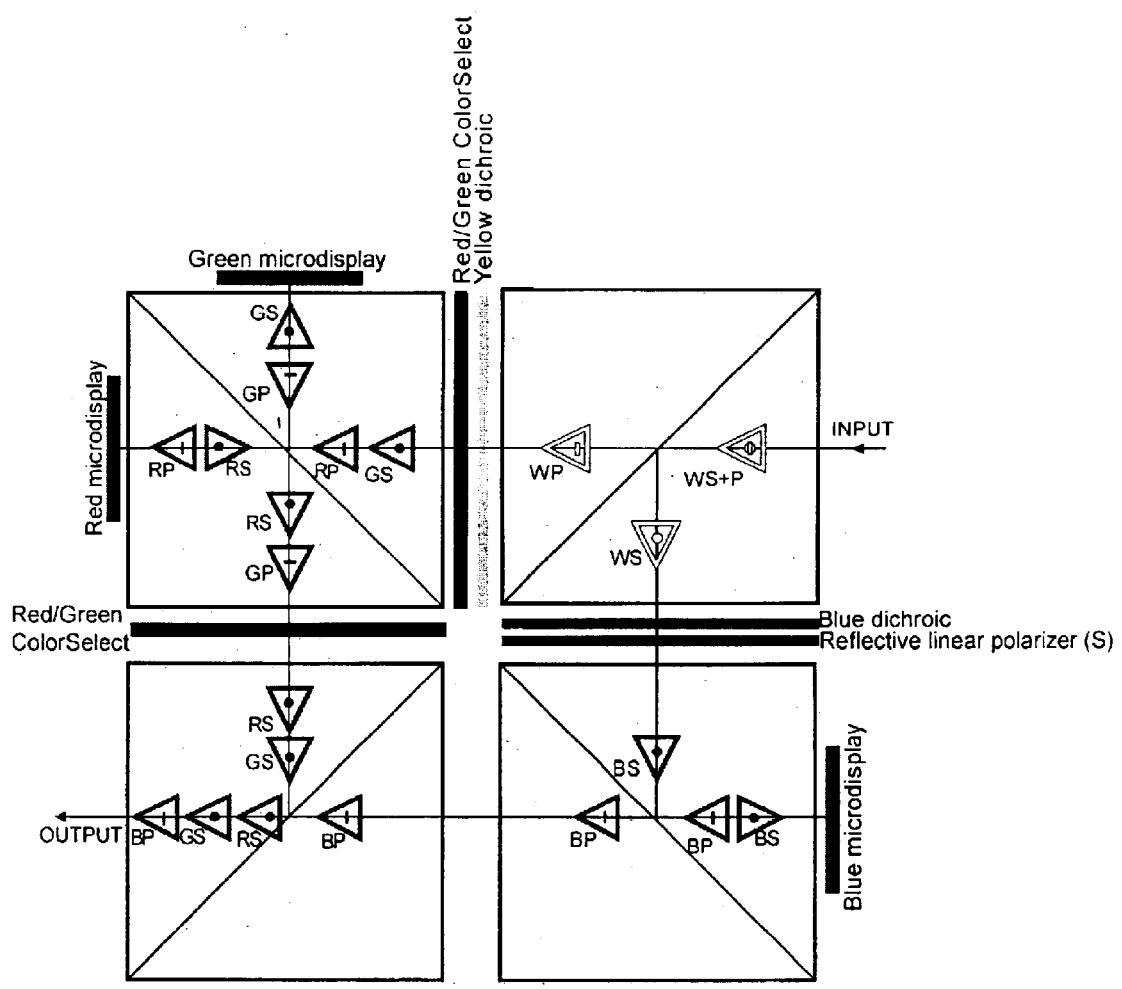

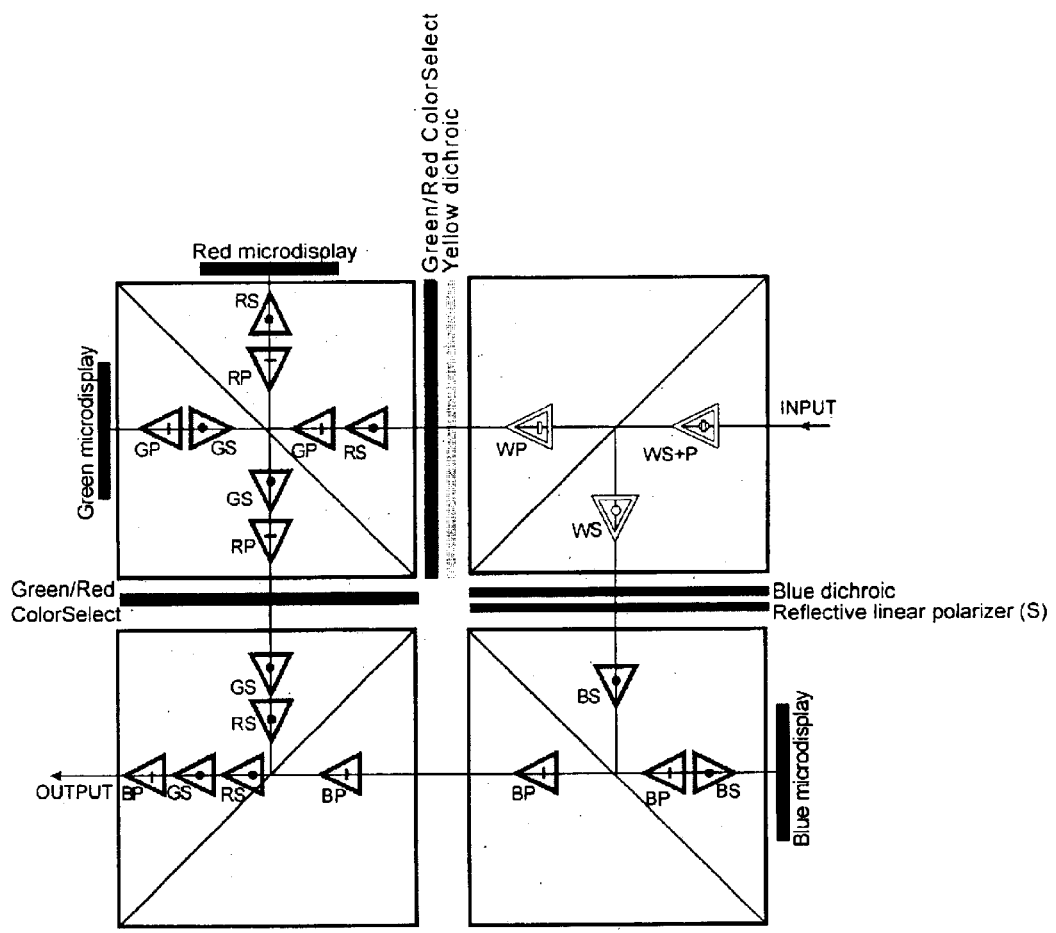
Fig. 48 KERNEL CONFIGURATION

Fig. 49 - KERNEL CONFIGURATION
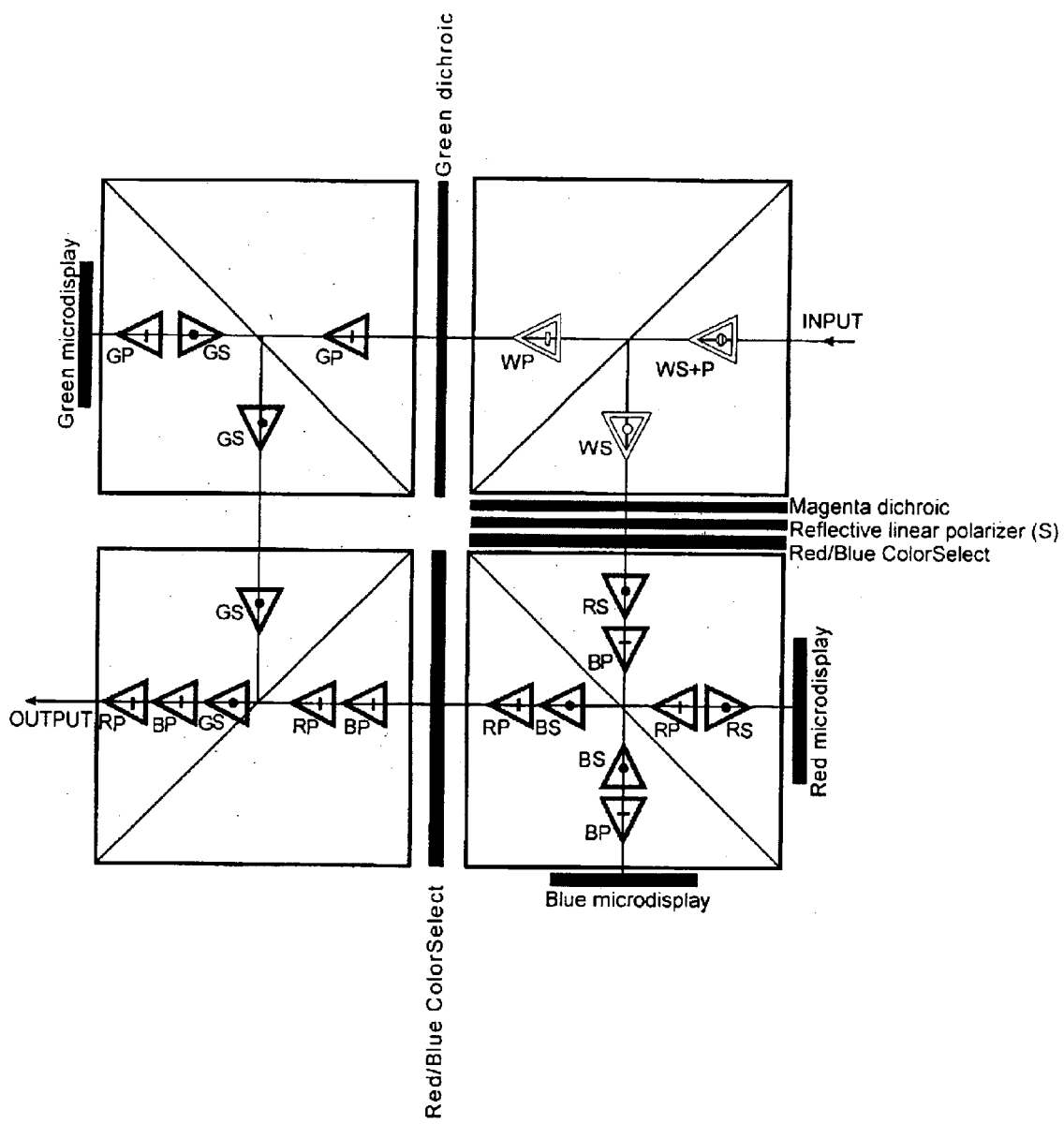

Fig. 50 - KERNEL CONFIGURATION
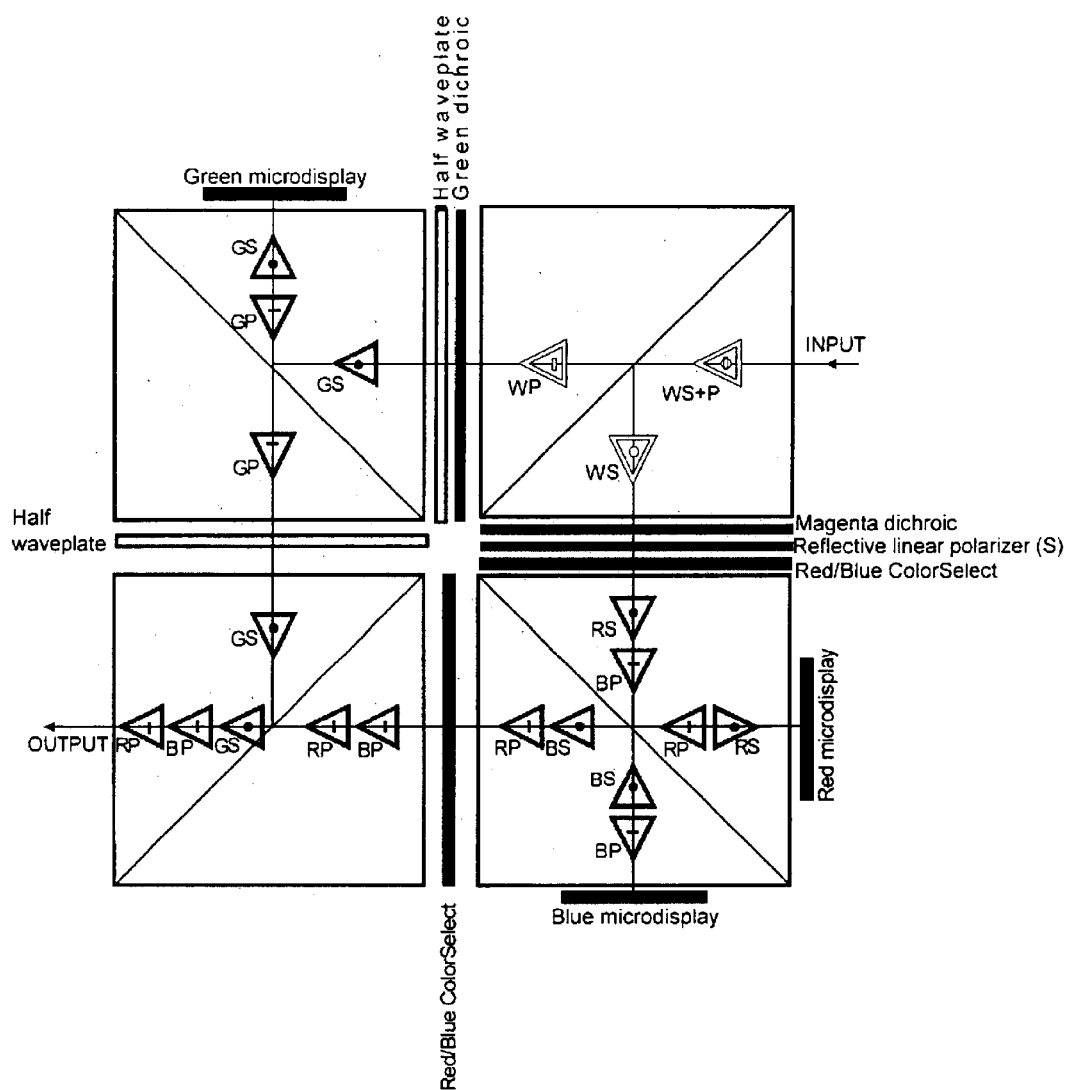

Fig. 51 - KERNEL CONFIGURATION
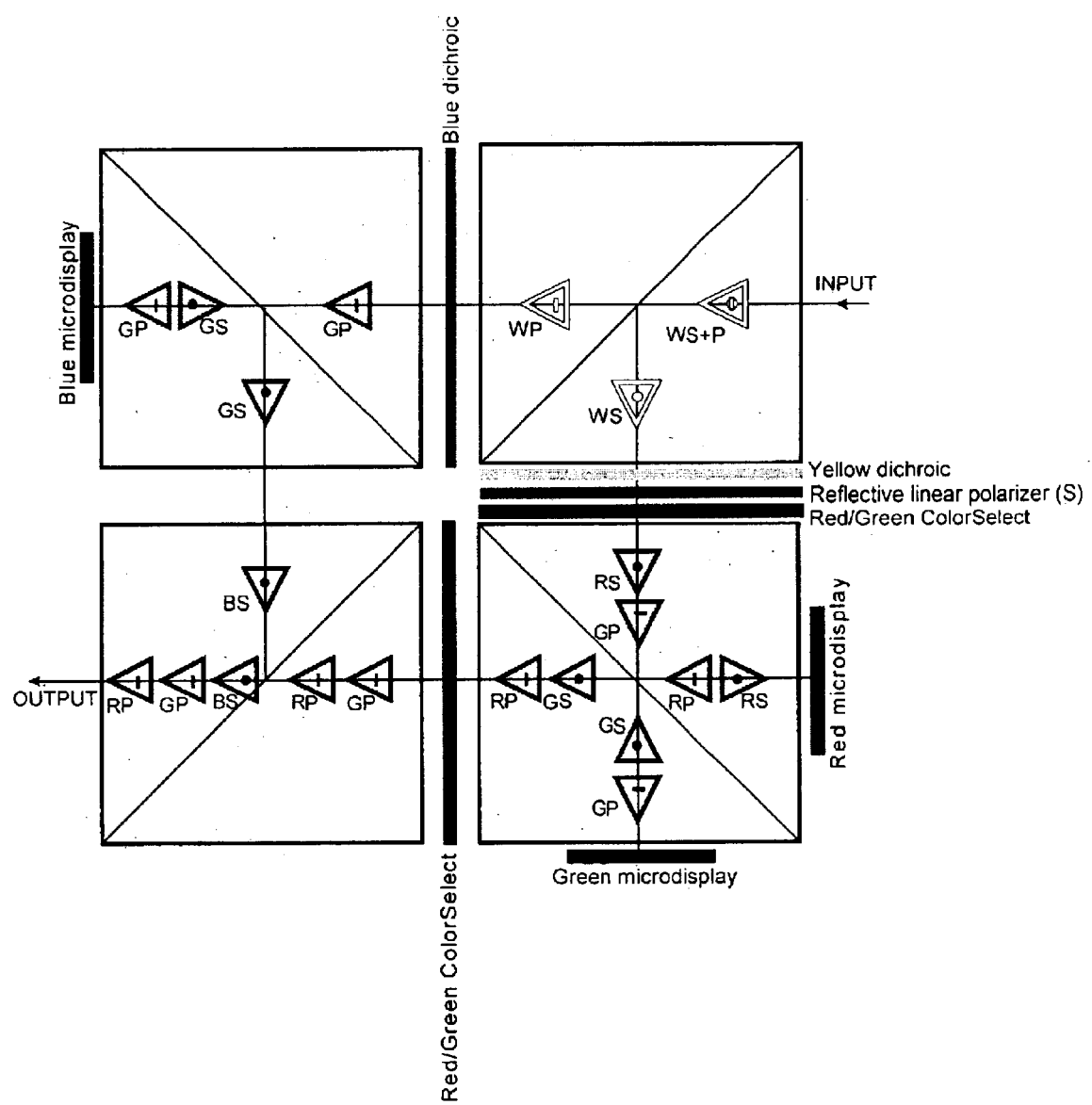

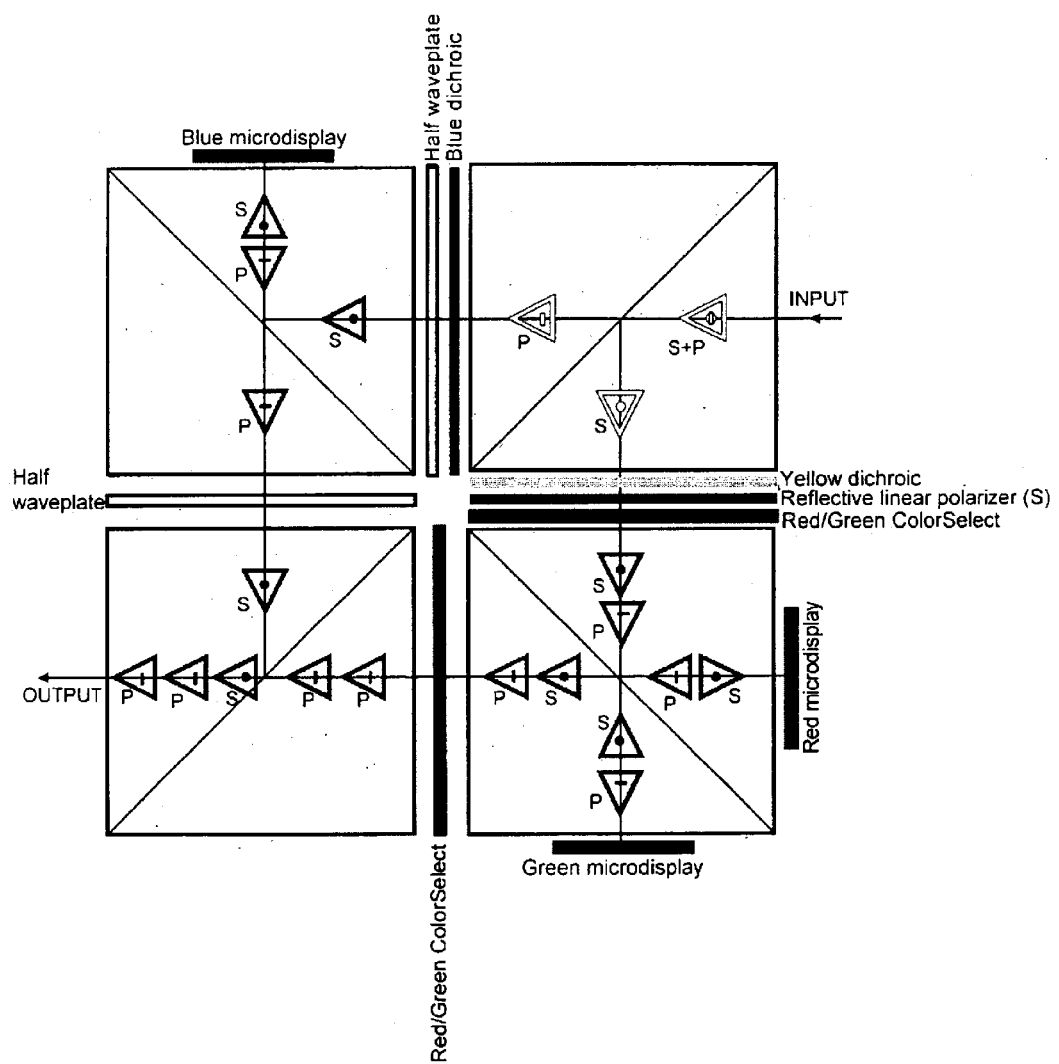
Fig. 52 - KERNEL CONFIGURATION

Fig. 53 - KERNEL CONFIGURATION
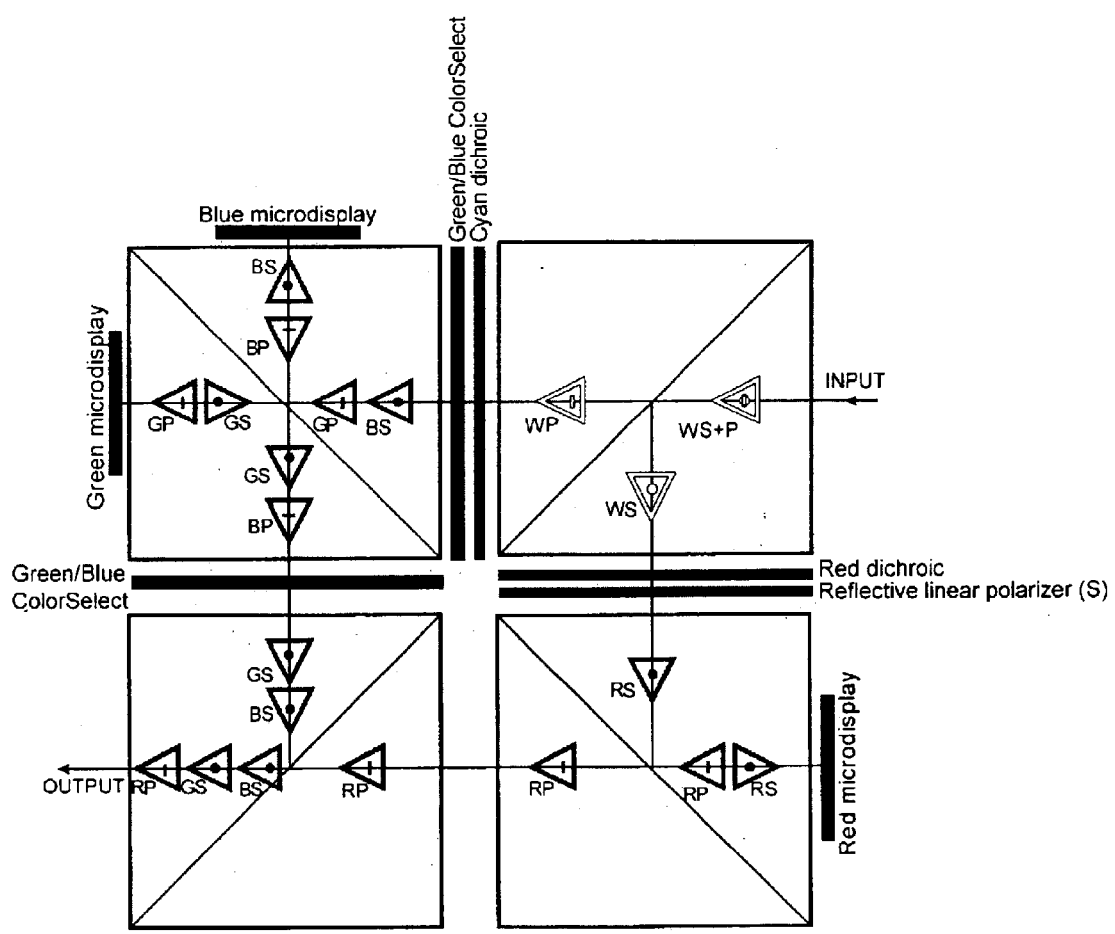

Fig. 54 - KERNEL CONFIGURATION
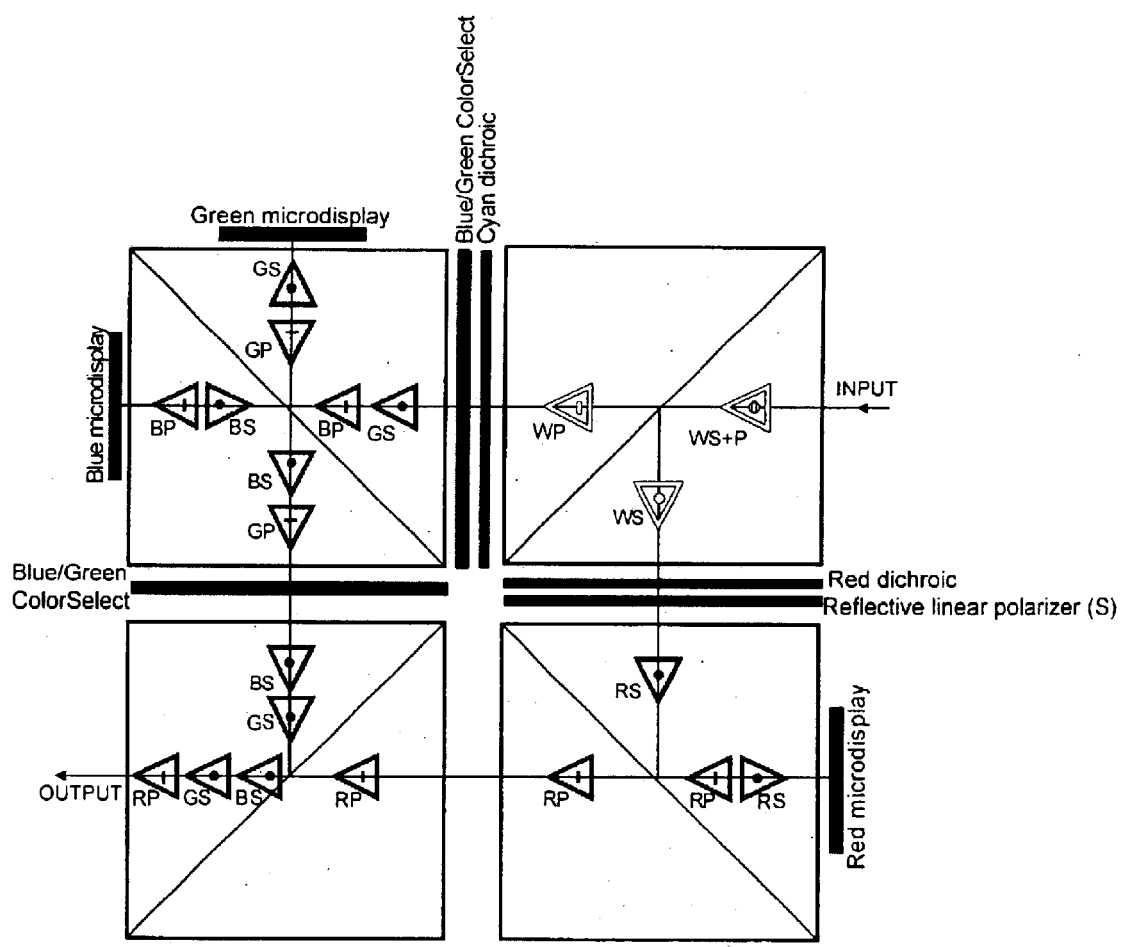

Fig. 55 - KERNEL CONFIGURATION
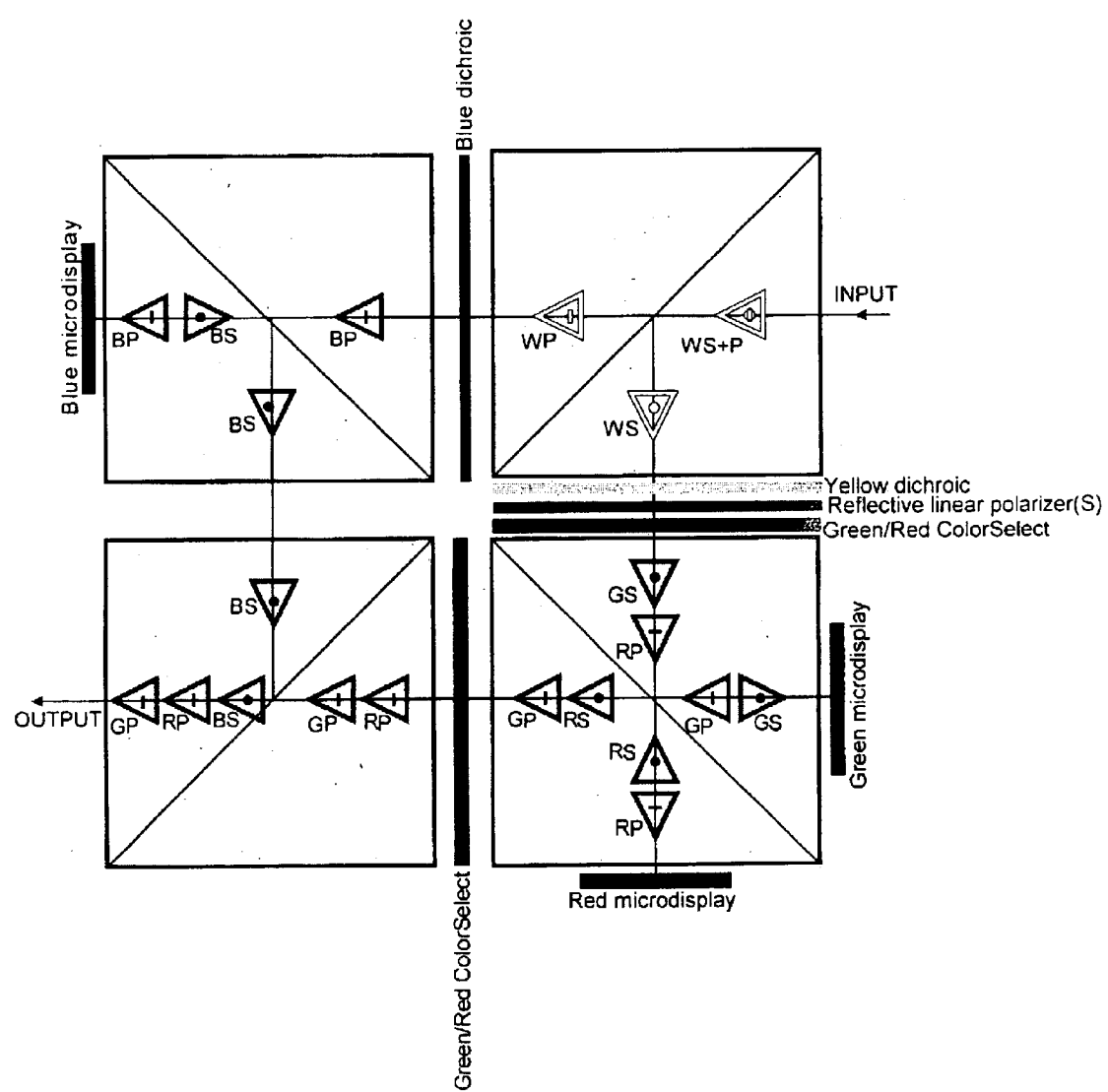

Fig. 5b - KERNEL CONFIGURATION
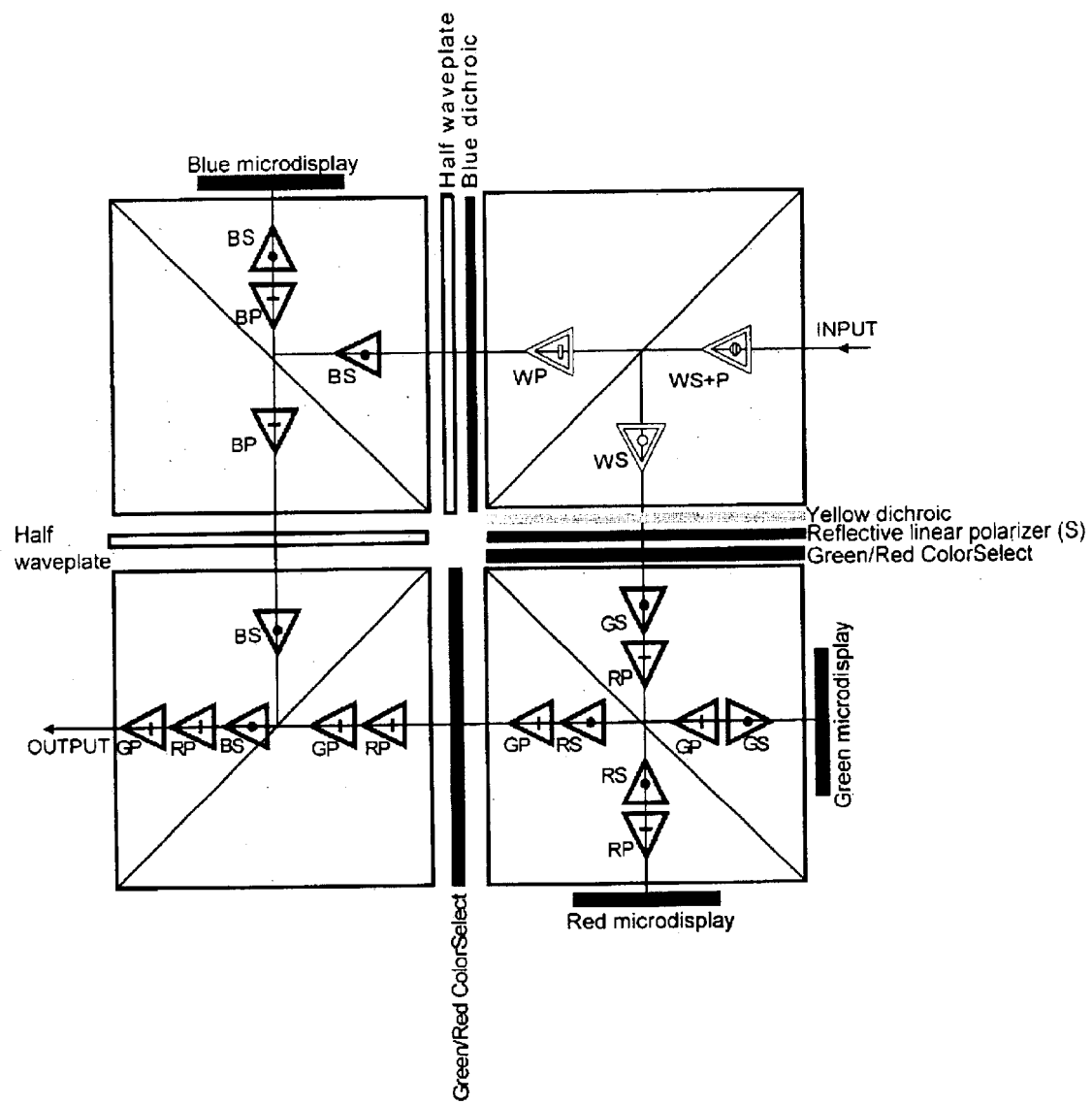

Fig. 57 - KERNEL CONFIGURATION
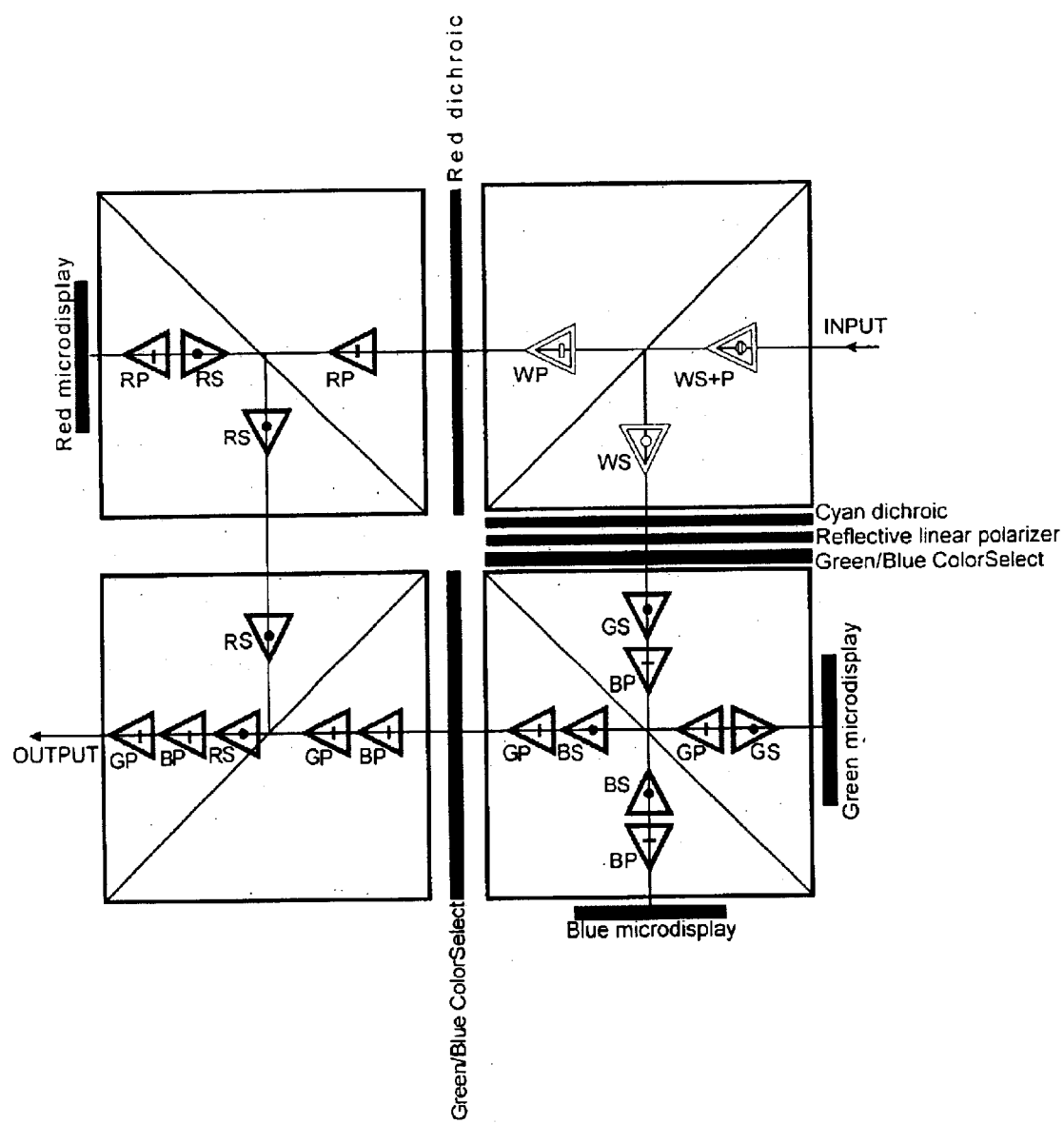

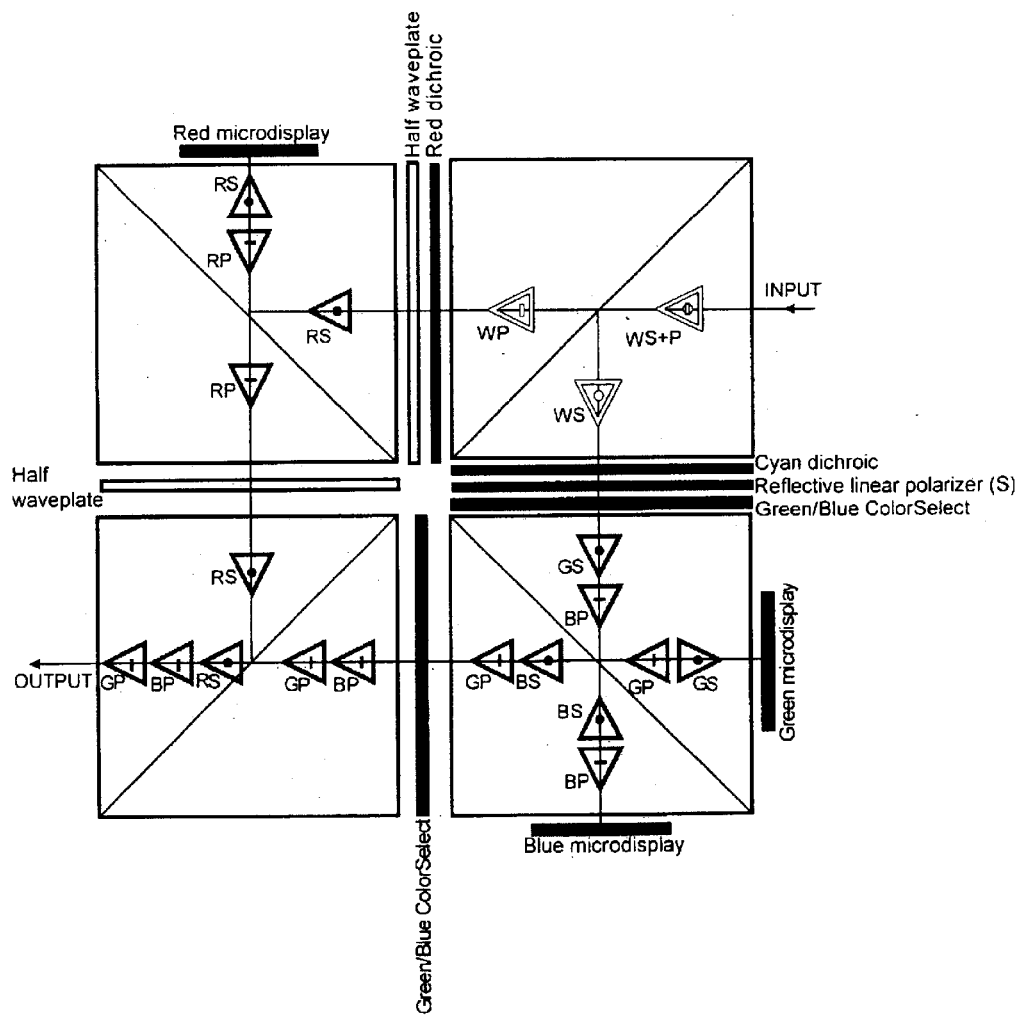
Fig. 58 - KERNEL CONFIGURATION

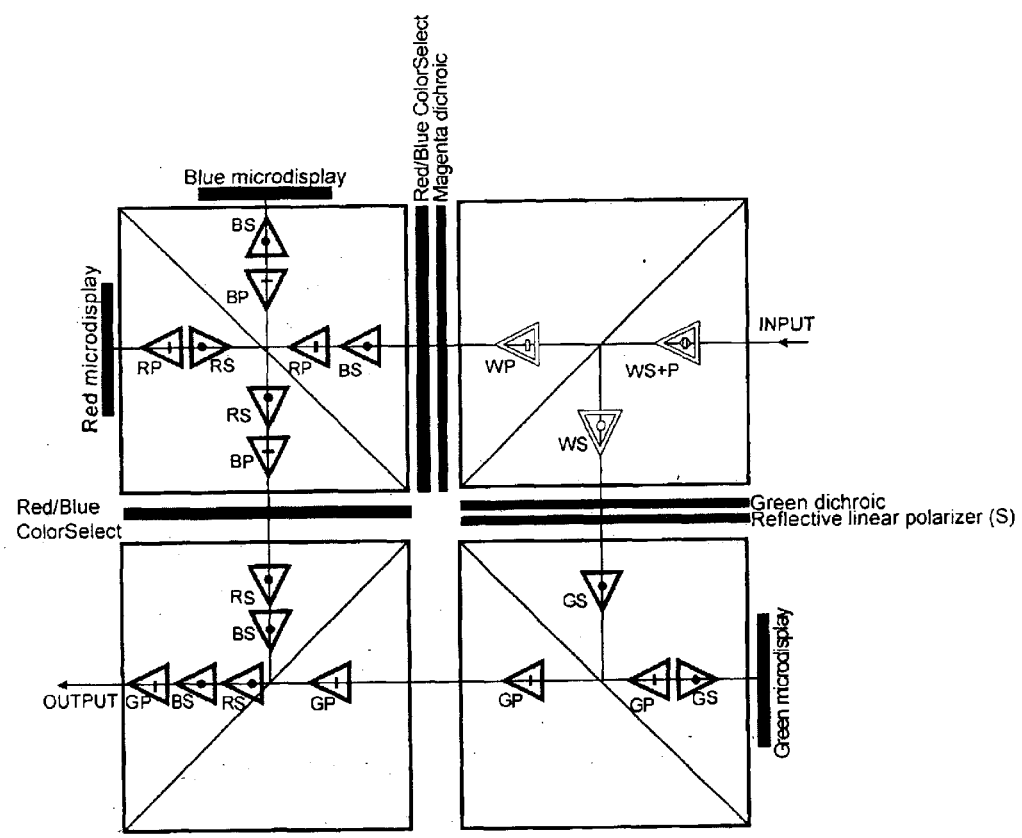
Fig. 59 - KERNEL CONFIGURATION

Fig. 60 - KERNEL CONFIGURATION
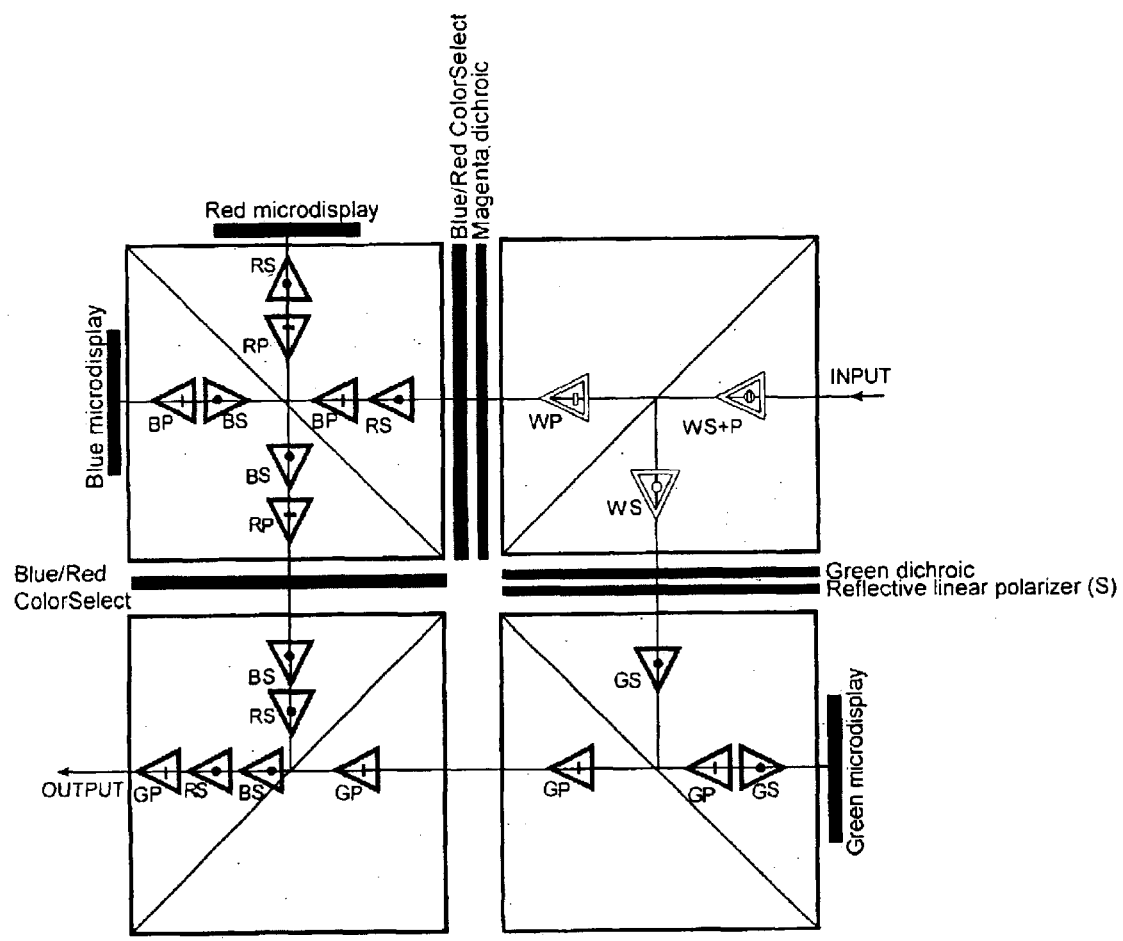

Fig. 61 - PRISM CONFIGURATION
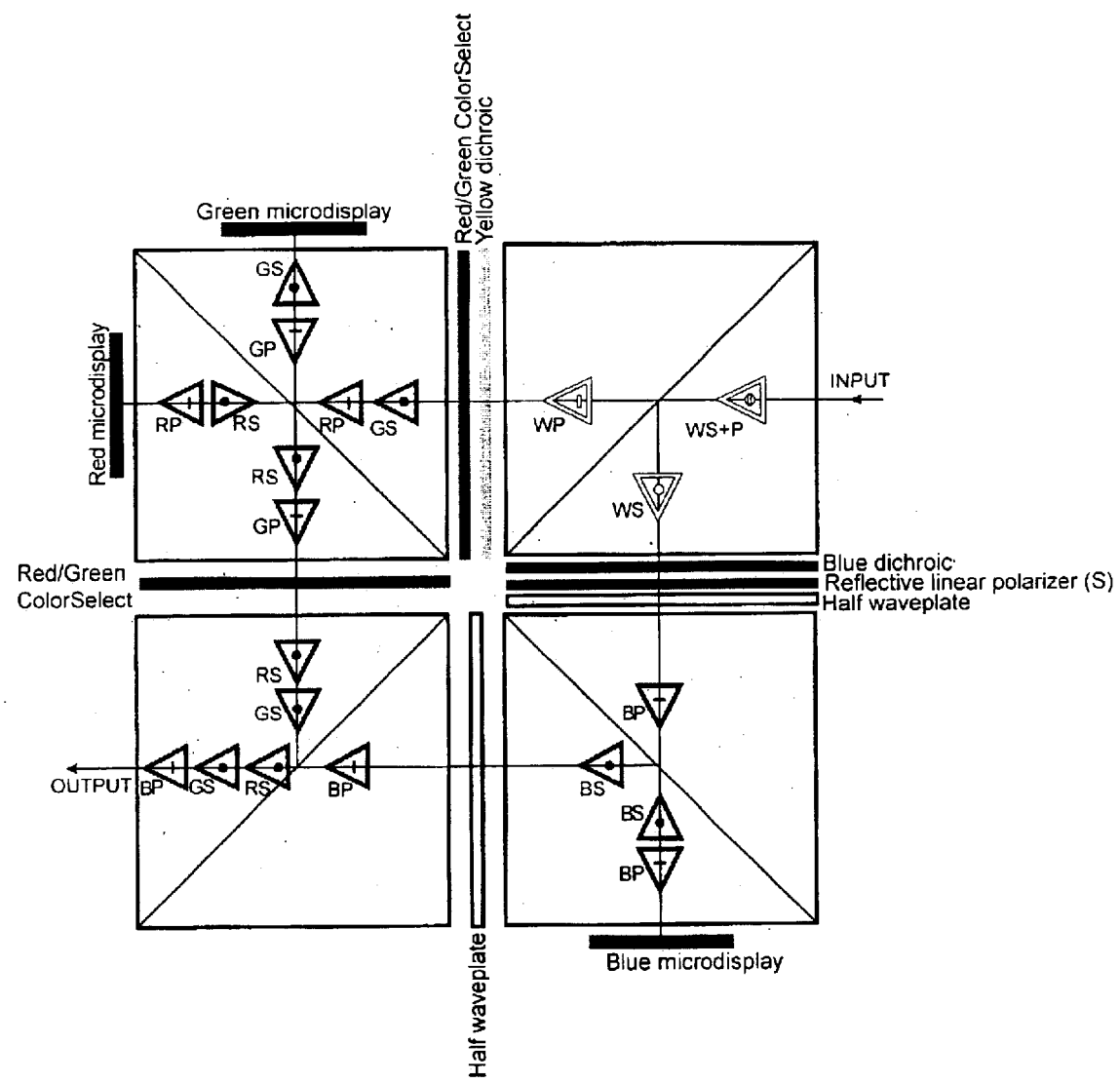

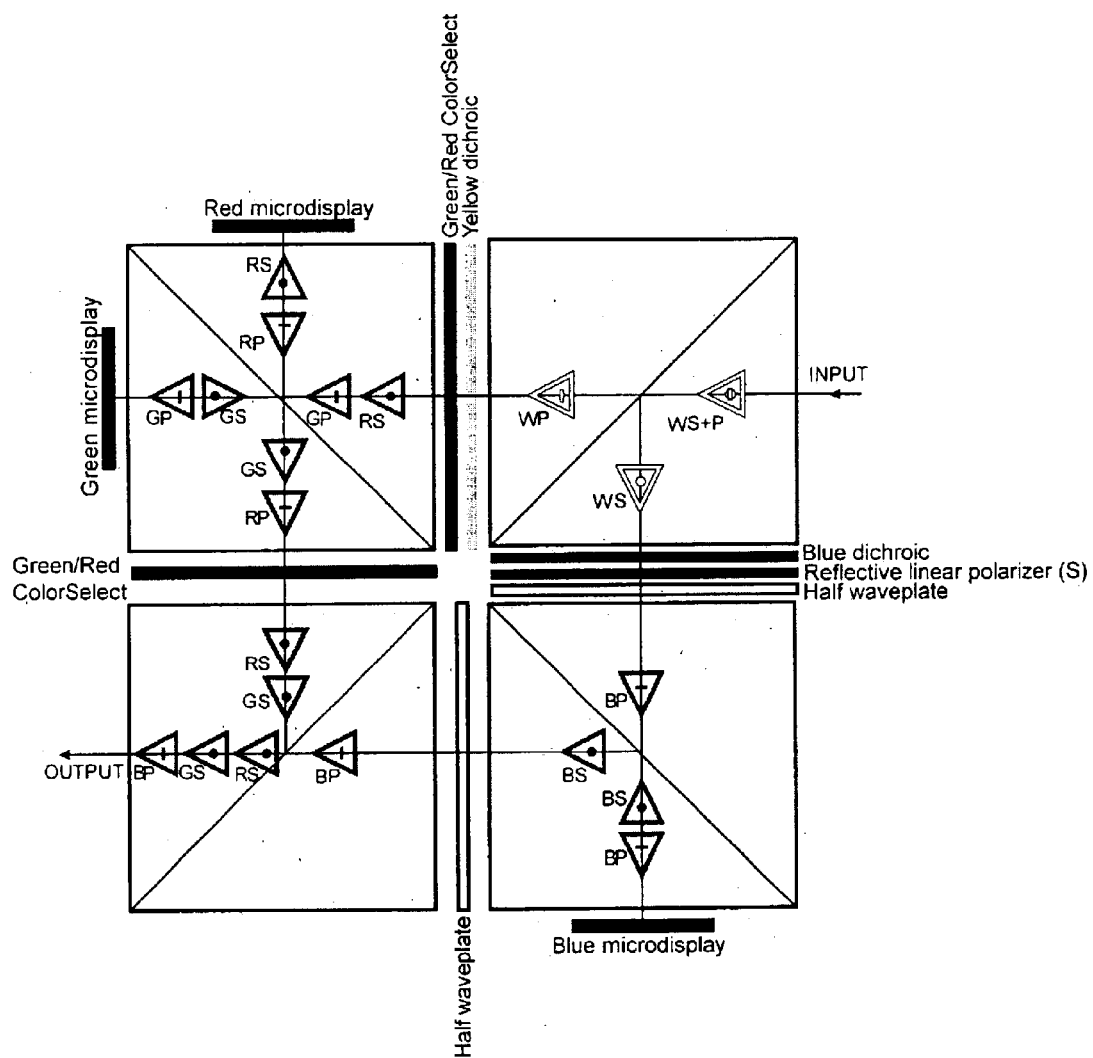
Fig. 62 - KERNEL CONFIGURATION

Fig. 63 - KERNEL CONFIGURATION
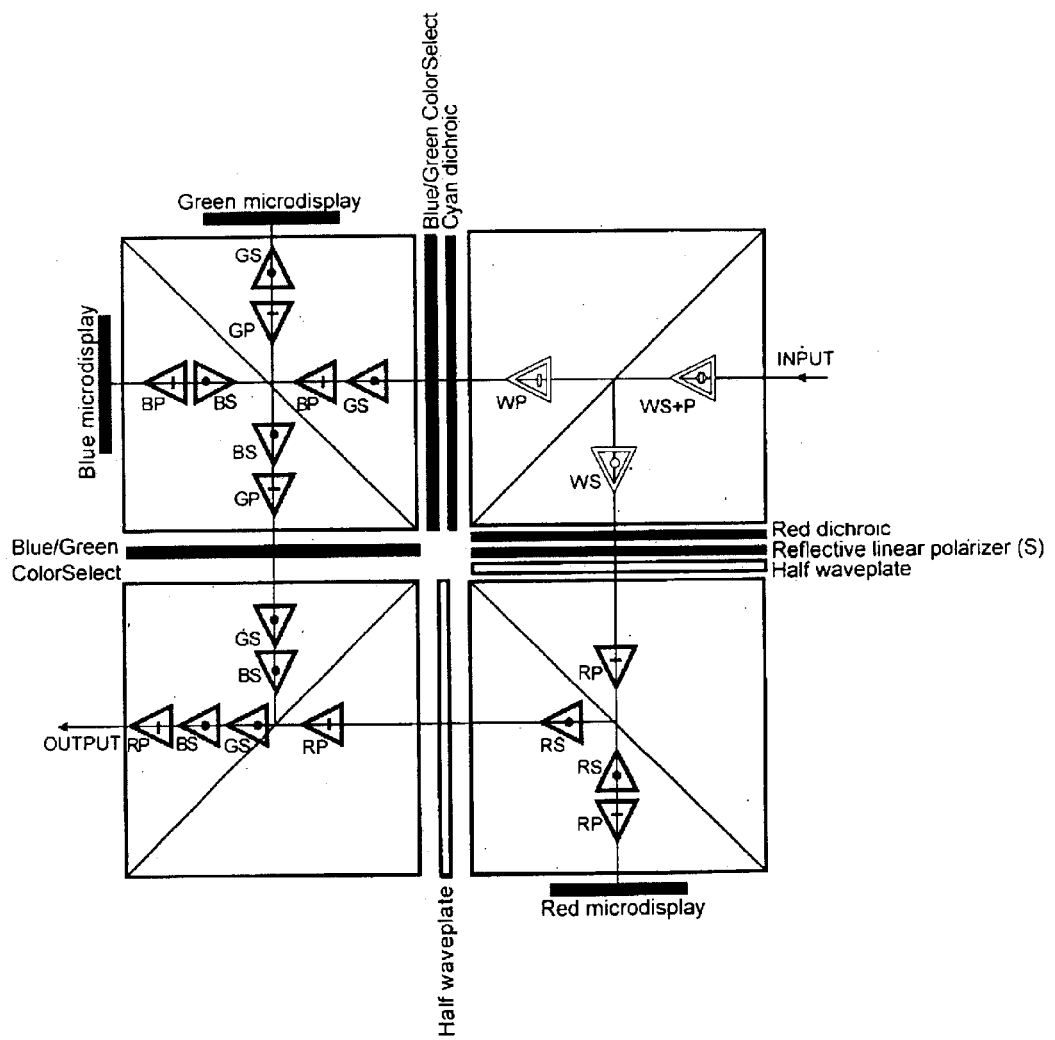

Fig. 64 - KERNEL CONFIGURATION
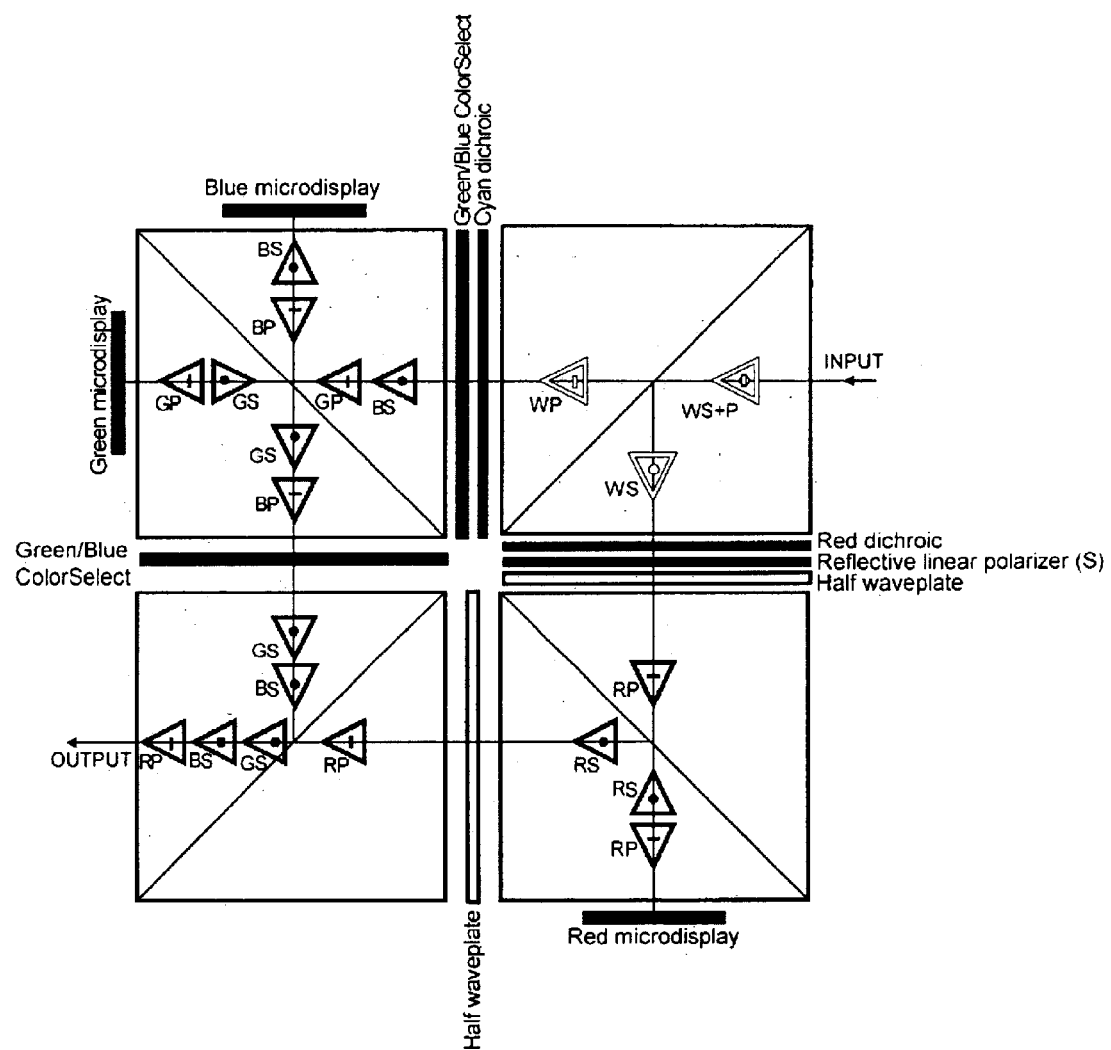

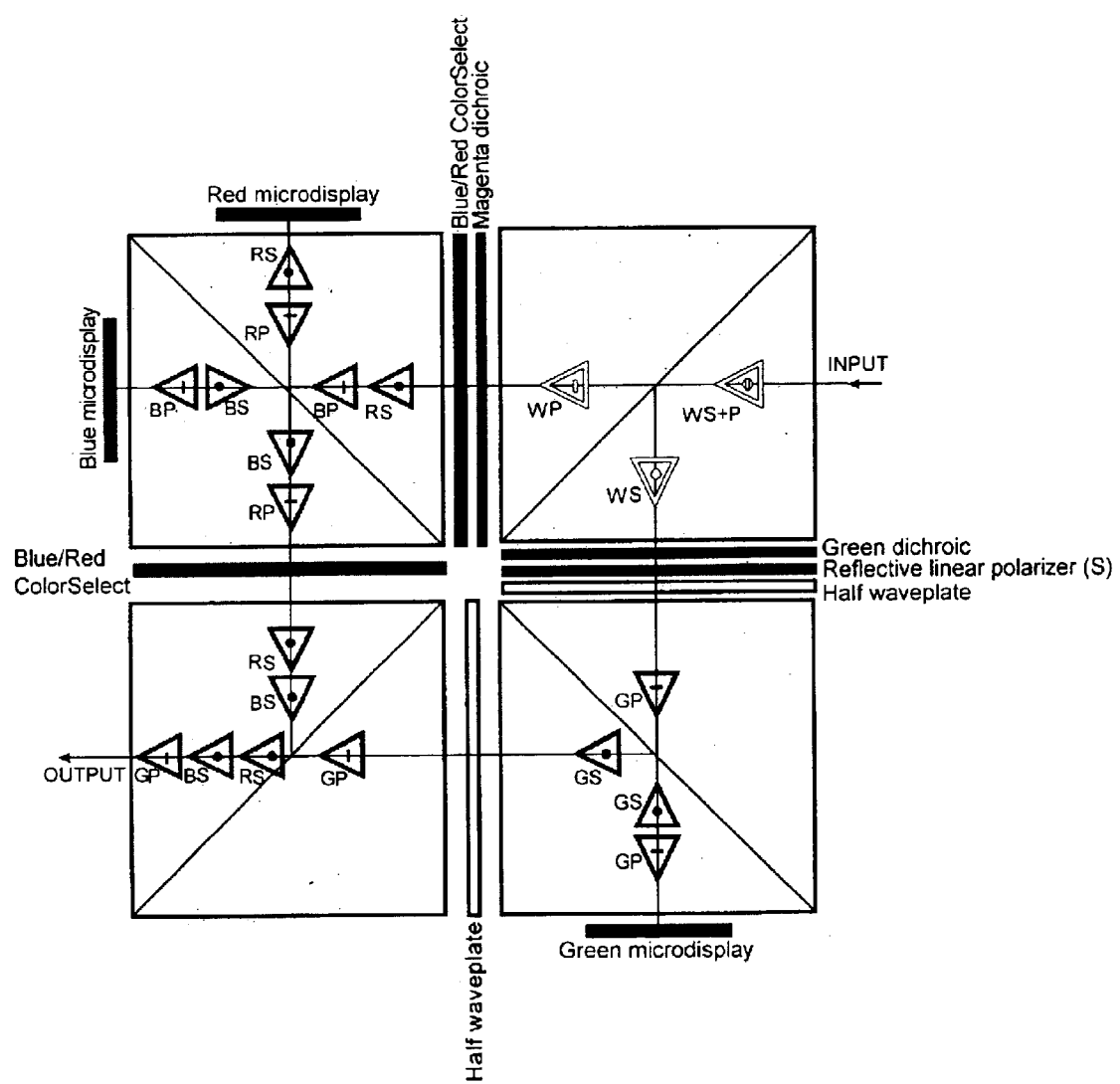
Fig. 65 - KERNEL CONFIGURATION

Fig. 66 - KERNEL CONFIGURATION
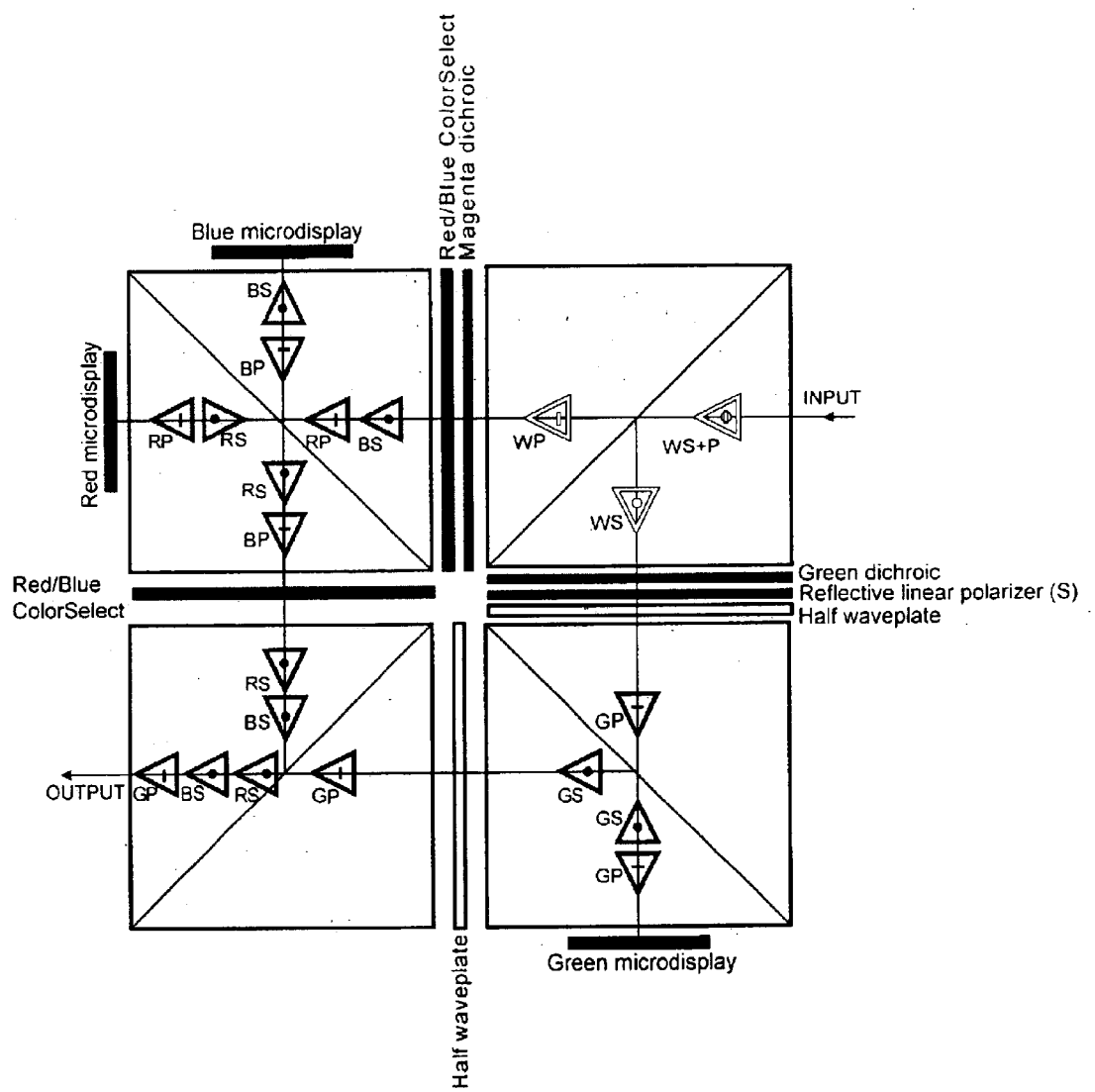

DESIGN OF PRISM ASSEMBLIES AND KERNEL CONFIGURATIONS FOR USE IN PROJECTION SYSTEMS

CLAIM OF PRIORITY

This invention claims priority to the following co-pending patent applications, each of which are incorporated herein by reference, in their entirety:

Detro et al. I, U.S. Provisional Application Ser. No. 60/349,271, entitled "Prism Configurations for use in a Reflective Microdisplay Based Video," filed, Jan. 14, 2002;

Detro et al. II, U.S. Provisional Application Ser. No. 60/418,600, entitled "Kernel Configuration for LCoS Based Video Projection," filed Oct. 15, 2002;

Berman et al., U.S. patent application Ser. No. 10/251,104, entitled "Method and Apparatus for Mounting Liquid Crystal on Silicon (LCoS) and Other Sensitive Devices," filed Sep. 20, 2002;

Detro et al. III, U.S. patent application Ser. No. 10/251,225 entitled "A Pathlength Matched Beam Splitter And Method And Apparatus For Assembly," filed Sep. 20, 2002; and Detro et al. IV, U.S. patent application Ser. No. 10/202,595, entitled "Method and Apparatus for Configuration and Assembly of a Video Projection Light Management System," filed Jul. 24, 2002.

BACKGROUND OF THE INVENTION

1. Field of Invention

The present invention relates to optical devices. The present invention is more particularly related to prism assemblies and kernels used in light projection systems, and yet more particularly related to prism assemblies and kernels used in LCoS based video projection systems.

2. Discussion of Background

Light Management Systems (LMSs) are utilized in optical devices, particularly projection video devices and generally comprises a light source, condenser, kernel, projection lens, and a display screen, and related electronics. The function of the components of a video projector 100 is explained with reference to FIG. 1. As shown, white light 110 is generated by a light source 105. The light is collected, homogenized and formed into the proper shape by a condenser 115. UV and IR components are eliminated by filters (e.g., hot/cold mirrors 116/117). The white light 110 then enters a prism assembly 150 where it is polarized and broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam displays the green content of a full color video image. The reflected green beam then contains the green content of the full color video image. Similarly for the blue and red microdisplays. On a pixel by pixel basis, the microdisplays modulate and then reflect the colored light beams. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

Publicly Disclosed Prism Assemblies Include:
Digital Reflection's Star Prism
Philip's Trichroic Prism
IBM's X Prism with 3 PBS
S-Vision/Aurora System' Off-Axis Prism
Digital Reflection's MG Prism
ColorLink's ColorQuad Prism
Unaxis' ColorCorner Prism

SUMMARY OF THE INVENTION

Despite the existence (if not availability) of the prism configurations listed above, a new video projector design may still require the development of a new prism. The reason being that a properly designed video projector requires the mutual optimization of all components within the system—including the prism. The present inventors have realized a number of unique designs and configurations applicable to prism assemblies and kernels of light engines and other Light Management Systems (LMSs). The present inventors have also realized the need to arrange the components of prism assemblies to facilitate construction of a prism assembly optimized for a particular projection system design, and, provide herein a number of optical designs of prism assemblies that may be applied to any one or more projection system designs (LMSs, video projectors, light engines, etc.). The present inventors have also designed a new video projector, also described in Detro et al. IV noted above. Although the prisms and kernel configurations disclosed herein can be used in other applications, they were developed and are believed to be optimally used in conjunction with the new video projector and as described herein.

In one embodiment, the present invention provides a kernel, comprising, a prism assembly arranged in four quadrants, comprising, an input face on the first quadrant, a first face and a second face on the second quadrant, an output face on the third quadrant, and a third and a fourth face on a fourth of the four quadrants, wherein one of the four faces has an attached red microdisplay, one of the four faces has an attached green microdisplay, one of the four faces has an attached blue microdisplay, and the prism assembly includes optical components that facilitate the division of light entering the prism assembly through the input face into component red, green and blue light beams that are individually directed to a corresponding one of the red, green, and blue microdisplays where the light beams are reflected and then directed to the output face.

In one embodiment, the second quadrant is cater-cornered with respect to the fourth quadrant, the input face is adjacent to the fourth face, and the output face is adjacent to the third face. In another embodiment, the second quadrant is cater-cornered with respect to the fourth quadrant, the input face is adjacent to the first face, and the output face is adjacent to the third face.

Red, green, and blue microdisplays are attached to various of the faces of the prism assembly, and corresponding additional optical components such as waveplates, filters, etc, along with beam splitting devices are placed in the prism assembly at strategic positions to direct corresponding light beams to each of the microdisplays. The figures illustrate the most useful combinations and preferred arrangements of the various optical components, however, other combinations and arrangements will be apparent to the ordinarily skilled artisan after review of the present disclosure.

In one embodiment, the beam splitters include path length matched beam splitters wherein light paths through the beam splitters are equal. And, components of the prism assemblies, including any beam splitters, may be placed in path length matched positions wherein light paths through the entire prism assembly are equal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a drawing of an embodiment of a bladder equipped prism assembly according to an embodiment of the present invention;

FIG. 15 is an illustration of a pathlength matched Polarizing Beam Splitter (PBS) cube;

FIG. 16A is an illustration of a device used to produce a pathlength matched PBS cube according to an embodiment of the present invention;

FIG. 17 is an illustration of a device used to produce a pathlength matched PBS cube according to another embodiment of the present invention;

FIG. 18 is a block diagram of a layout of optical components applicable to a number of different kernel configurations;

FIGS. 19–66 are illustrations of kernel configurations according to various embodiments of the present invention;

DESCRIPTION OF THE PREFERRED EMBODIMENTS

Figure 1:
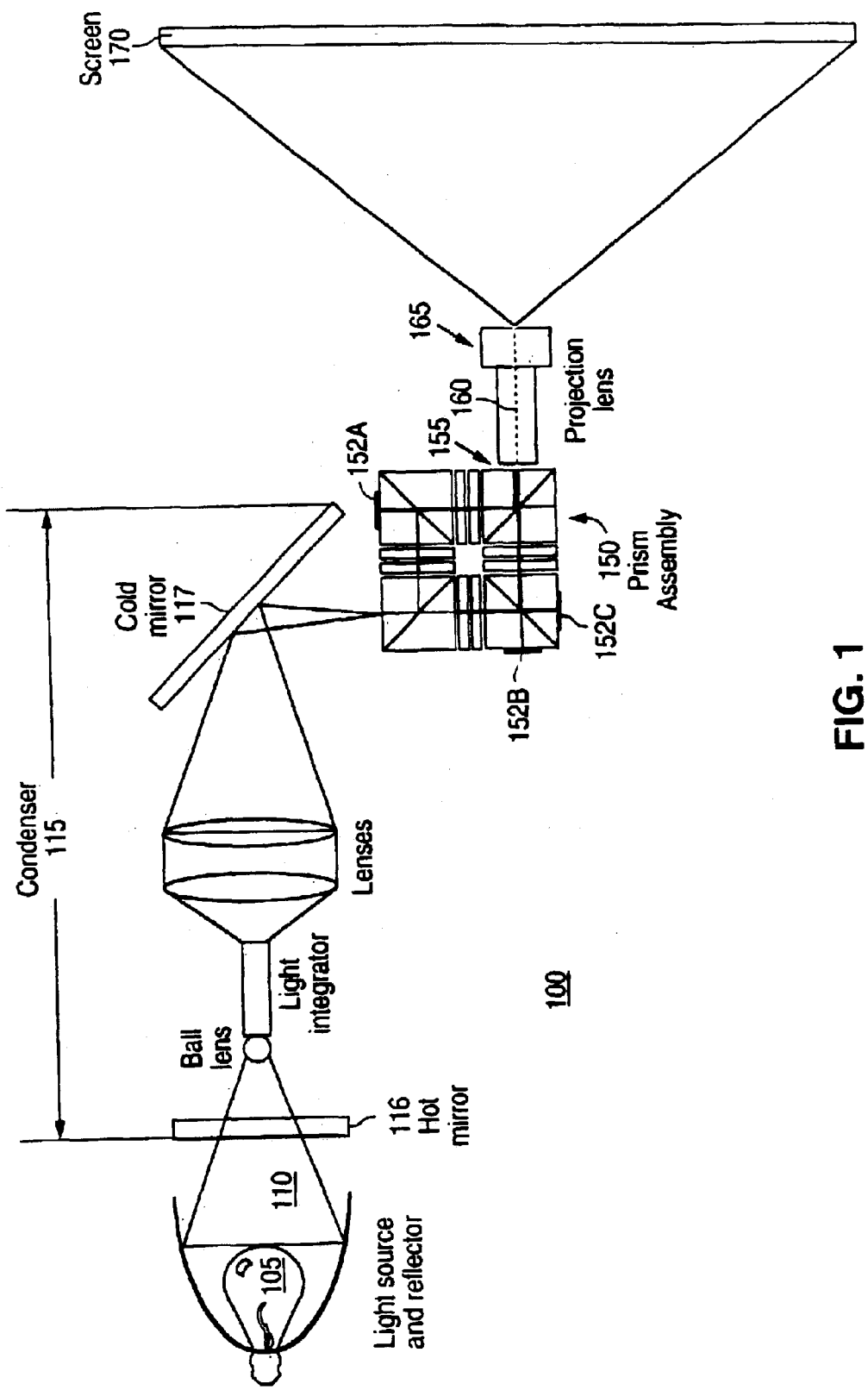
FIG. 1 is a drawing of a Light Management System (LMS) video projector.
Figure 2:
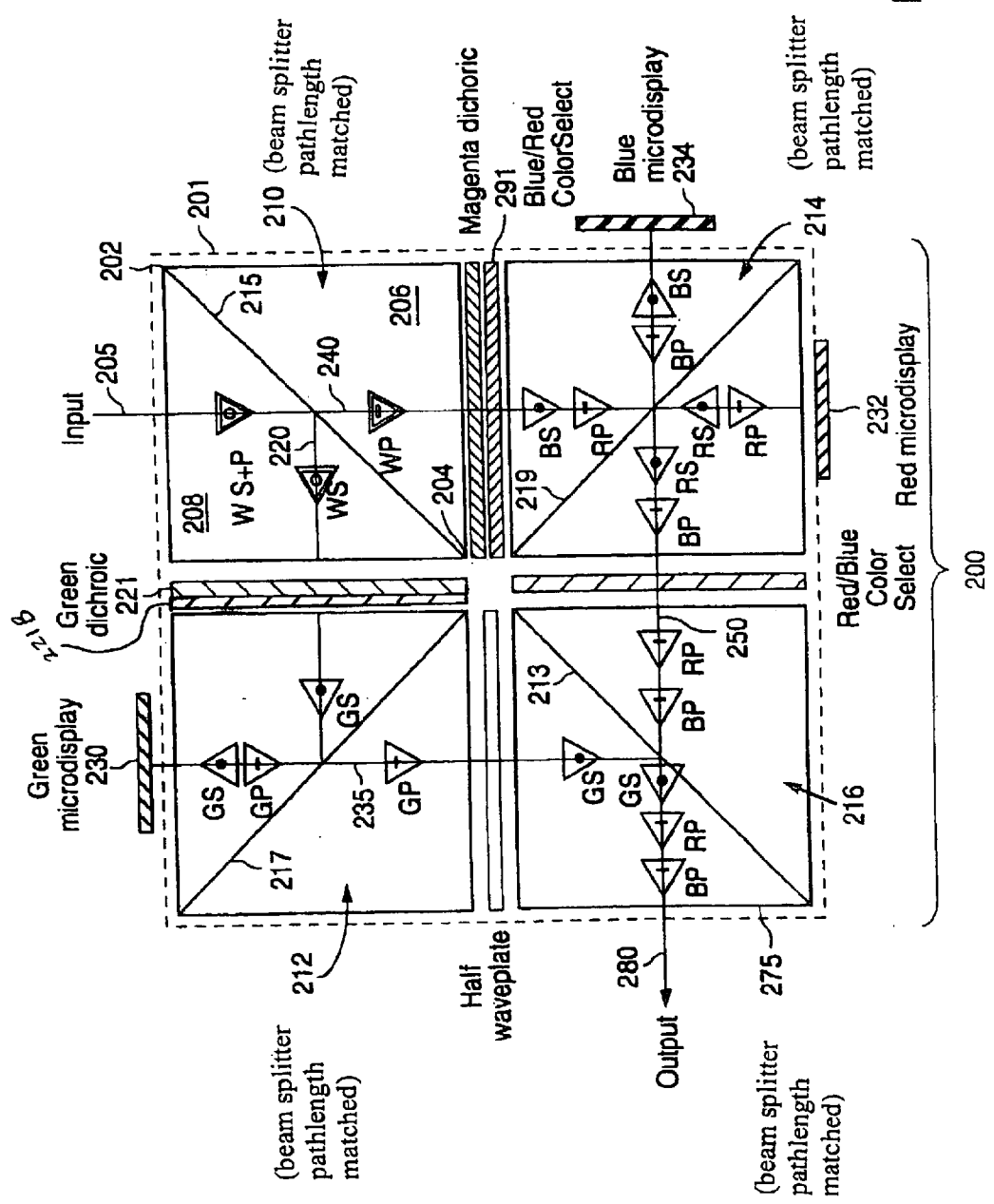
FIG. 2 is a drawing of a simplified example kernel illustrating lightpaths and components of one possible configuration of a prism assembly in which the present invention is applied.

Referring again to the drawings, wherein like reference numerals designate identical or corresponding parts, and more particularly to FIG. 2 thereof, there is illustrated a Light Management System (LMS) kernel 200 illustrating lightpaths and components of one possible configuration of a prism assembly in which the present invention is applied. Path length matching and other features are provided based on the present invention. The kernel 200 includes a prism assembly 201, attached microdisplays ("Green" microdisplay 230, "Red" microdisplay 232, and "Blue" microdisplay 234—the colors are in quotations because the color identifies the content of an image to be displayed, or the light being manipulated, by the individual microdisplay). The kernel is a fundamental component of a video projection system.

The prism assembly 201 comprises a set of optical components, films, and matching elements making a single prism assembly unit. A white light 205 is directed at a Polarizing Beam Splitter (PBS) 210. A polarizing beam splitter thin film 215 perpendicularly polarizes and splits the white light into two beams of polarized light 220 and 240. The lightpaths through the prism assembly are each labeled to indicate the color and polarization of each light path. For example, incoming white light 205 is labeled W S+P (meaning White S and P polarized); light beam 220 is initially labeled WS (meaning white, s-polarized). The s-polarized white light 220 passes through a green dichroic filter 221 and a clean-up polarizer 221B (e.g., Mostek polarizer) that removes any unwanted p-polarized light reflected from the thin film 215 (dichroic 221 and clean-up polarizer 221B pass green light, making beam 220 a green s-polarized beam (and labeled GS)). The green s-polarized beam enters a second Beam Splitter 212. A polarizing beam splitter thin film 217 reflects the s-polarized green light to "green" microdisplay 230.

The light paths are illustrated W for white, R for Red, B for Blue, and R for Red. Polarization is indicated using S for S polarized light, and P for P polarized light. In addition, Y is used for Yellow, and C for Cyan.

The green microdisplay 230 manipulates the polarized green light according to green content of an image to be displayed. The "green" microdisplay modulates the polarization of the green light on a pixel-by-pixel basis. For example, a no green content pixel of the image to be displayed will be left unaltered, a strong green content pixel of the image to be displayed will have its polarization rotated 90°, and other pixels having varying levels of green content will have their polarization rotated in varying amounts in proportion to the amount of green content. The microdisplay also reflects (reflection or other polarization effects on the light are accounted for by the polarization manipulation of the microdisplay) the green light (now modulated) back toward the polarizing beam splitter thin film 217.

The polarizing beam splitter thin film 217 then reflects some portions and passes other portions of the green light.

The amount of light reflected versus passing is based on the amount of modulation performed on the reflected green light. Light with the same polarization as was reflected into the green microdisplay is again reflected. Light that is oppositely polarized (or at least different from a polarization sensitivity of the polarizing beam splitter thin film 217) is passed. Amounts of green light less than the full amount of original green light and more than 0 depend on the amount of modulation.

Beam 235 represents the modulated green light that passes back through the polarizing beam splitter thin film 217 (e.g. green light sufficiently modulated to pass through the polarizing beam splitter thin film 217). Beam 235 enters final Beam Splitter 216 and is reflected off polarizing beam splitter thin film 213. Each of the red and blue components are similarly modulated and passed or reflected from corresponding polarization sensitive materials, to produce beam 250. After reflecting off polarizing beam splitter thin film 213, the modulated green light beam 235 is combined with the red and blue components of beam 250 and then exits the prism assembly through output face 275 as white light 280 containing the image to be displayed.

PBSs 210, 212, 214, and 216 are constructed similarly (e.g., Constructed similarly using beam splitter pathlength matching as illustrated in any of FIGS. 15–17, where corresponding pathlengths through each beam splitter are matched. For example, within PBS 210, pathlengths W S+P and WS equal pathlengths W S+P and WP). In this configuration, each PBS contains 2 optical components (e.g., prisms 208 and 206) and a polarizing beam splitter thin film (e.g. 215). The polarizing beam splitter thin film is, for example, a coating that reflects s-polarized light and passes p-polarized light. Optical elements (e.g., retarders, rotators, etc) are utilized to change the polarization so that desired light beams are either reflected or passed by the polarizing beam splitter thin film so that subsequent polarizing beam splitter thin films may pass or reflect the desired light beams depending on the configuration of optical components and the desired path of each light beam (FIG. 2 is one example configuration and desired paths). For example, when PBS 210 splits the incoming white light into 2 beams, the second beam 240 passes through a wavelength specific retarder (Blue/Red ColorSelect 291) so that PBS 214 can also split beam 240 into component beams directed to each of the red microdisplay 232 and blue microdisplay 234 (without the retarder, the blue component of the white light in beam 240 would remain p-polarized and PBS 214 would then pass the blue light to the red microdisplay 232 instead of reflecting it to the blue microdisplay 234).

The configuration of FIG. 2 illustrates a prism assembly made from 4 similarly constructed PBSs, an advantage over systems utilizing optical components performing a variety of functions (and hence, a variety of differently configured optical components) because the similarly constructed PBSs reduce the number of parts and different functionality of components in a particular optical design. Hence, a corresponding production line benefits from economies of scale, reduced inventory, etc. However, it can also be seen that many different combinations of optical elements can be utilized to make the various beams properly reflect or pass and then re-combine into final light beam 280. Furthermore, the prism assemblies using optical components having a variety of different functions can be constructed. And, as noted above, prism assemblies of all these varieties (different sizes, different shapes, different configurations, etc.) may be constructed using the techniques and processes discussed herein.

Optical components are combined to create the beam splitters. For example, individual prisms 206 and 208 are optical components that are combined to produce the Polarizing Beam Splitter (PBS) 210. Before manufacture of the prism assembly, the beam splitting optical components are built. Prism assembly 201 illustrates four beam splitting optical components, polarizing beam splitters (PBSs) 210, 212, 214, and 216. Each of the polarizing beam splitters (hereinafter referred to as PBSs) contains a polarizing beam splitter thin film (e.g., 215, 217, 219, and 213). Preferably, the polarizing beam splitter thin films are at the diagonal of the beam splitters and extend through the corner as defined by the outside surfaces of the PBS. For example, the polarizing beam splitter thin film 215 extends along the diagonal of 206 and 208 through corners 202 and 204 of the PBS 210. The PBSs may be constructed so that the polarizing beam splitter thin film is on a plane of the diagonal and need not extend through the corners, particularly if light does not pass through the entire range of the diagonal.

The assembly of such PBS is accomplished by the use of optical pathlength matching. Referring to PBS 210, it can be noted that the two optical components (prisms) 206 and 208 need not be exactly the same size (and, consequently, the outside dimensions of the PBS need not meet any specific dimensional requirement). Since there are no specific dimensional requirements for the PBS, optical components with a "loose" mechanical tolerance may be utilized. Such optical components (and prisms used to construct those components) can be produced at modest cost and in high volume by existing vendors of optical components.

Figure 3:
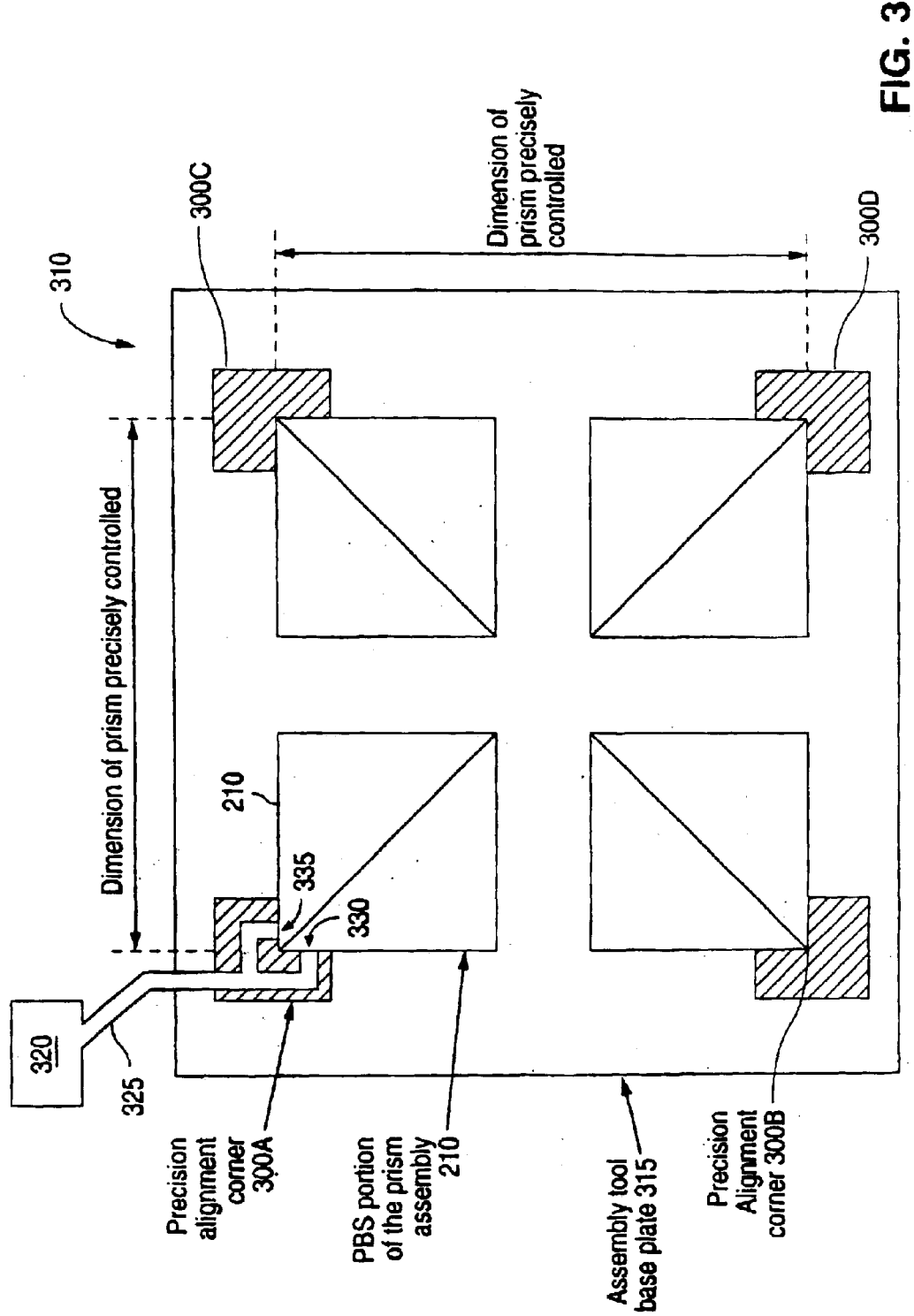
FIG. 3 is drawing illustrating a construction technique of an LMS prism assembly according to an embodiment of the present invention.

The optical components are assembled from the "outside in". As shown in FIG. 3, the two outside surfaces of each of the four PBSs in the prism assembly 201 are accurately held in position by precision alignment corners 300A, 300B, 300C, and 300D of an assembly tool 310. For example, outside surfaces of PBS 210 are held in a fixed position determined by alignment corner 300A.

Assembly tool includes an assembly tool base plate 315 to which the precision alignment corners 300 are fixed. Construction of the alignment corners 300A, 300B, 300C, and 300D can be performed using mechanical tooling. The alignment corners are constructed to a tolerance and positioned on the assembly tool base plate such that they precisely fix the outside dimensions of each PBS. Each alignment corner includes a device for securing the PBS in position during assembly. For example, PBS 210 is held tight in alignment corner 300A via vacuum holders 330 and 335. The vacuum holders are connected to vacuum pump 320 via vacuum tube 325. In one embodiment, there is a single vacuum holder in the corner of the alignment corner.

The alignment corners provide the precise dimensional accuracy required to achieve pathlength matching and is accomplished by mechanical tooling rather than expensive tightly toleranced optical components. However, pathlength matching alone does not produce an acceptable prism assembly. Although pathlength matched, because the optical components are of varying non-precise tolerances (different sizes), the PBS do not fit precisely together (e.g., intersection of PBS 210 and 214, and any dichroics or filters placed therebetween, do not fit exactly) and an air gap is introduced between the internal optical surfaces of the PBSs. The air gap itself introduces other problems including refraction and other optical variations that need to be reduced or eliminated.

Figure 4:
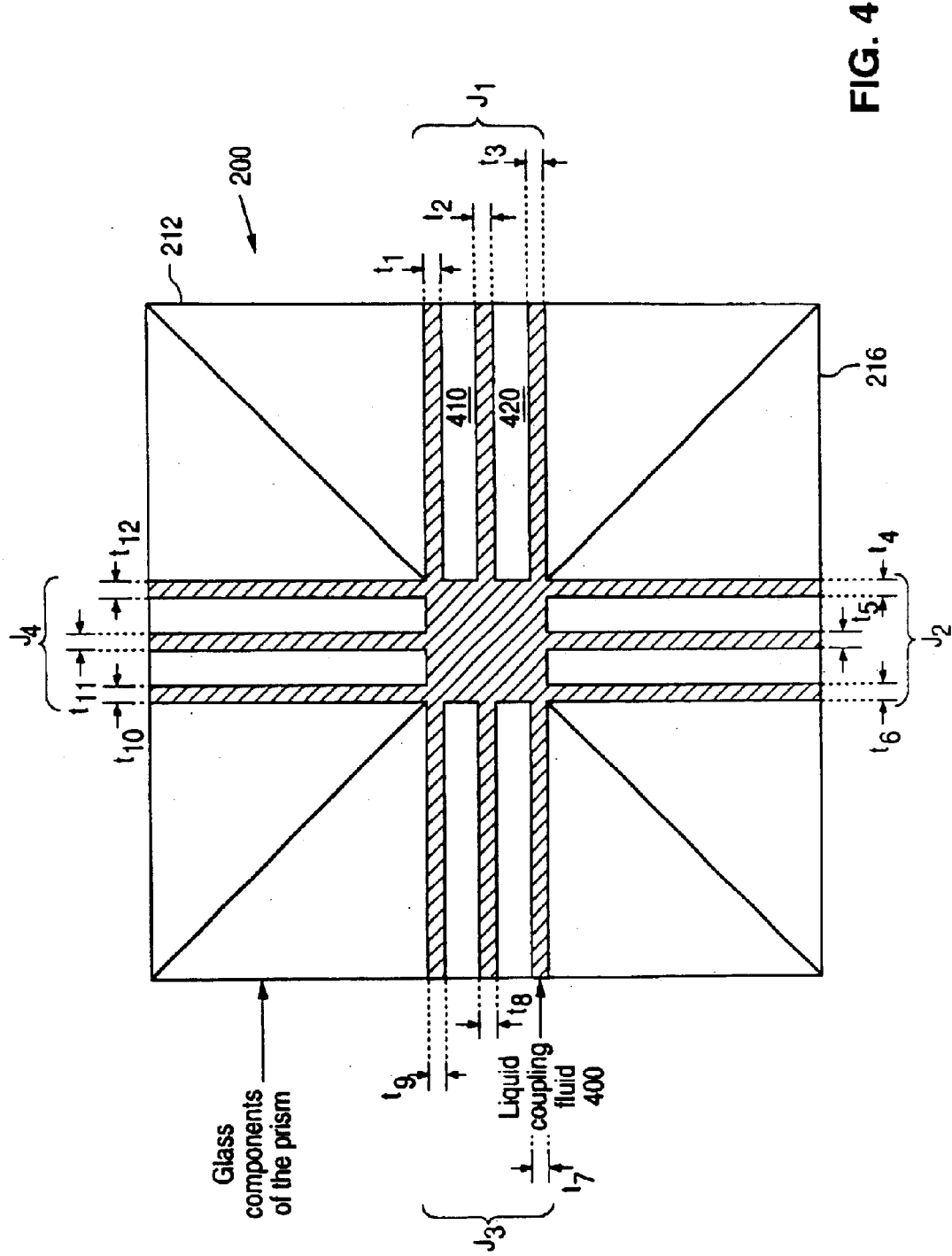
FIG. 4 is a drawing of liquid coupling of components in an LMS prism assembly according to an embodiment of the present invention.

The present invention reduces the undesirable effects from the imprecisely fit PBSs by coupling the PBSs with a liquid. In one embodiment, all internal optical surfaces of the prism assembly are coupled using a liquid. FIG. 4 is a drawing of liquid coupling of components of an optical assembly according to an embodiment of the present invention. Between adjacent PBSs is a joint that is filled with liquid. The thickness of the liquid filled joints is varied based on variations in size of the individual PBSs (or other optical components utilized in other prism assembly configurations) to maintain the desired exterior dimensions of the prism assembly (e.g., to maintain desired matched pathlengths within the prism assembly). For example, Liquid filled joint J1, the joint between PBS 212 and PBS 216 comprises liquid between the PBSs, the entire joint comprising the liquid coupling fluid 400 in spaces t1, t2, and t3, and dichroics and other optical elements placed between the PBS (e.g., optical element 410 and 420 placed between the PBS). The other optical elements may be, for example, any combination of dichroics or other filters. Accommodation in the liquid coupling fluid will prevent stress from building up in the components.

Figure 5:
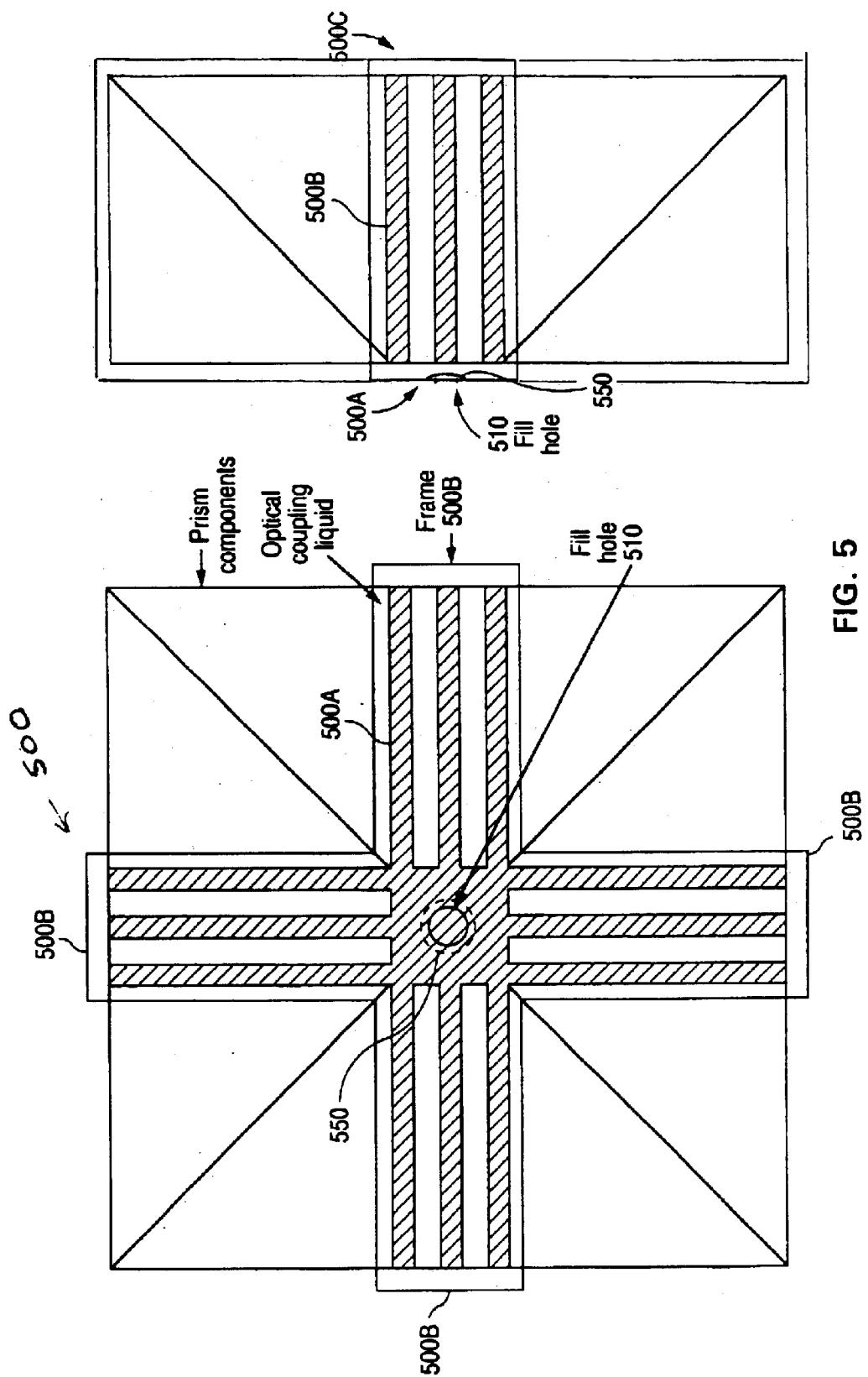
FIG. 5 is a drawing of top and side views of a frame that holds components of an LMS prism assembly according to an embodiment of the present invention.

In one embodiment, a frame, glued to the external surfaces of the prism assembly, is used to contain the liquid and hold the components in place. FIG. 5 is a drawing of top and side views of a frame 500 that holds components of an LMS prism assembly according to an embodiment of the present invention. The frame 500, which can be made of one or several pieces (note that there are not any optical requirements on the frame material), is placed over each of the joints between the PBSs. In this embodiment, the frame 500 comprises 2 side components 500A and 500 C, and 4 edge components 500B. Each side component is a plus sign (+) shaped glass, plastic, acrylic, etc., or other material, each appendage of the plus sign covering a joint, and the middle of the plus sign covering a conjunction of all 4 joints. The edge components 500B cover the edge of each of one of the joints. The top side component 500A includes a fill hole 510 to which fluid may be applied and/or added as needed. A cap (not shown) is used to cap off the fill hole to prevent spillage of the fluid. An air bubble 550 is provided to compensate for liquid expansion/contraction and prevent stress build up on the optical components. The frame 500 is illustrated as a plus sign shape, but may be completely rectangular or any other shape, so long as it covers each joint sufficiently. Glue or other adhesive applied to the frame creates a seal between the frame and the PBSs so as to fully contain the coupling fluid. The glue or other adhesive also fixes the position of the PBSs to the frame to assure non-movement of the PBSs with respect to each other (maintaining the monolithic nature of the LMS).

Using the adhesive between the frame and PBSs to fix the matched pathlengths is performed by determining the matched pathlength positions of the prism assembly components (e.g., using a tool having corner pieces or other positioning devices to assure the correct optical pathlengths), and then gluing the components (e.g., PBSs) to one or more parts of the frame at those matched pathlength positions. Additional optical elements are then positioned in the joints (e.g., optical elements 410 and 420), the joints are then at least partly filled with optical coupling fluid (liquid coupling fluid), the joints are then capped with a top frame piece, and then the coupling fluid is topped off (except for the air bubble or other expansion air space), and then the fill hole is capped.

Figure 7:
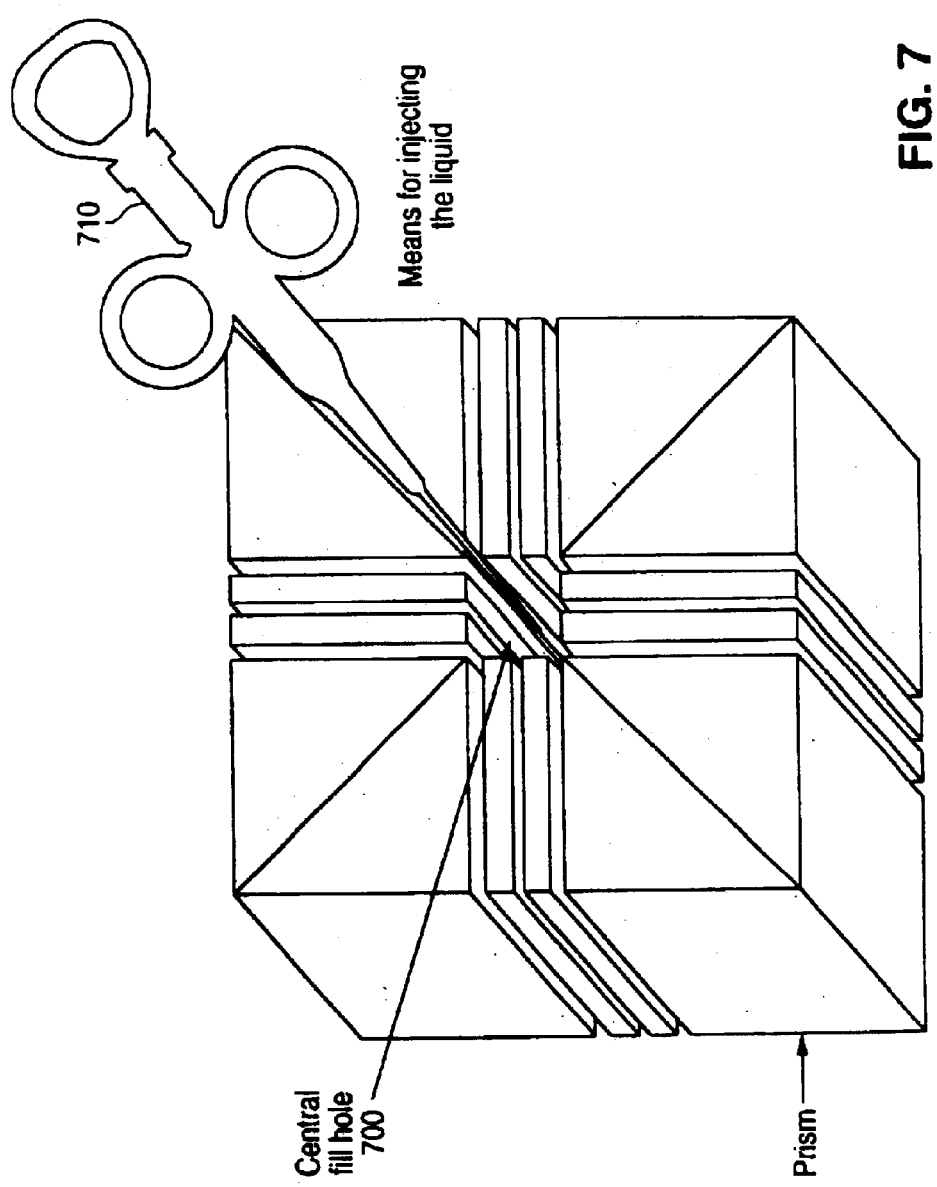
FIG. 7 is a drawing illustrating a coupling fluid filling method according to an embodiment of the present invention.

The present invention includes various methods and devices to fill the prism assembly with the coupling liquid. For example, FIG. 7 is a drawing illustrating a coupling fluid filling device and method according to an embodiment of the present invention. The coupling liquid is injected into a central fill hole 700 utilizing a syringe filled with coupling fluid. The central fill hole 700 is a center area of the prism assembly, and generally has no optical components therein. However, it is possible that one or more of the optical components may be positioned at least part way into the central fill hole. In one embodiment, the prism assembly is at least partly filled prior to affixing a top portion of the frame onto the prism assembly. If the top portion of the frame is not attached, the coupling fluid may also be applied in an area other than the central fill hole, but filling at the central fill hole is preferred. Also preferable, is injecting the coupling fluid at the bottom of the central fill hole. Capillary action between the optical elements and PBSs in both vertical and horizontal directions will assist the filling process. In other embodiments, the same process occurs with the top portion of the frame in place, in which case the syringe is inserted through the fill hole 510 (cap removed) to the bottom of the central fill hole 700, and the prism assembly is filled with coupling fluid. Other devices including tubes, pumps, or other pouring mechanisms may be used to place the fluid in the central fill hole.

Figure 6:
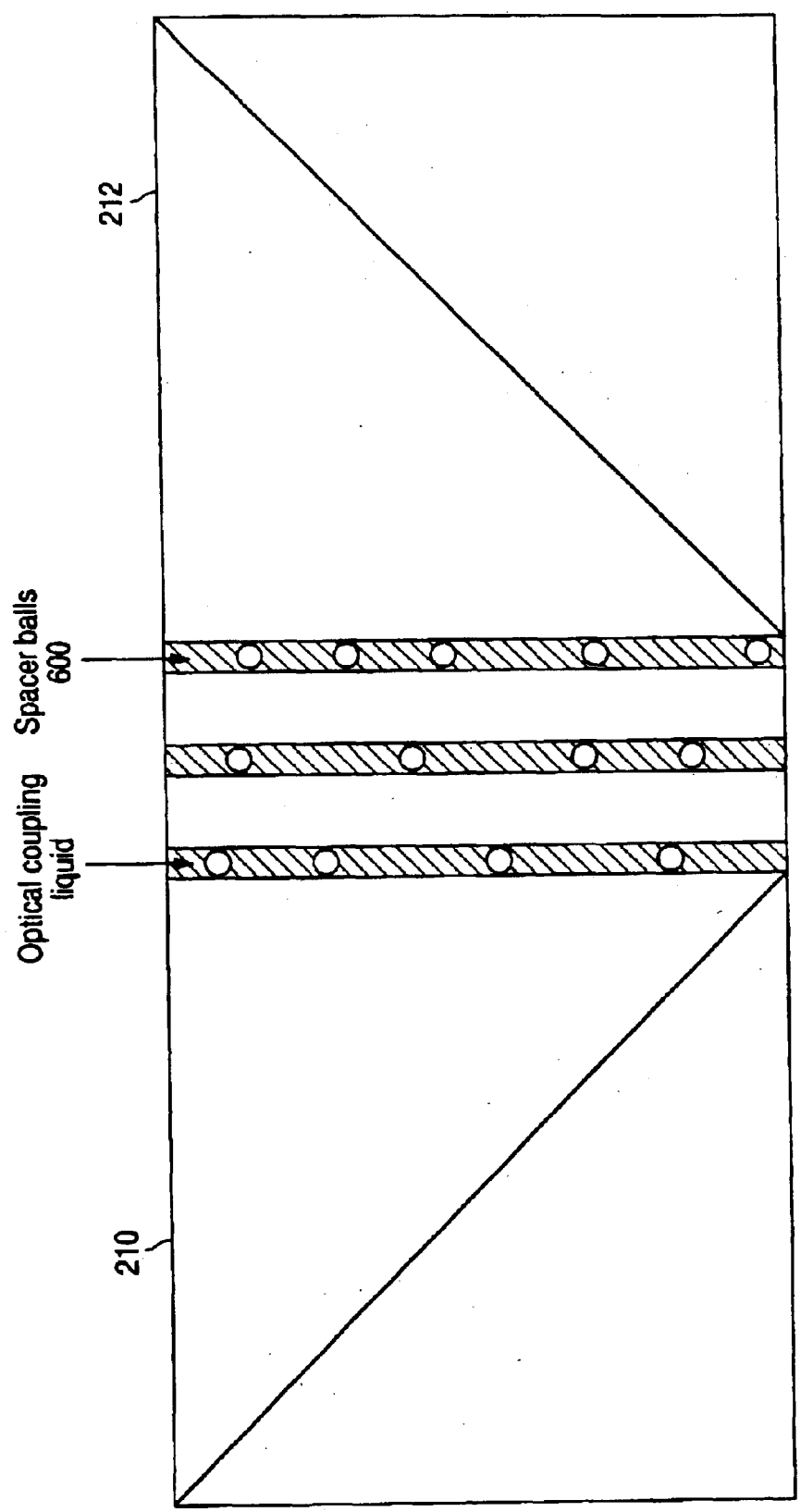
FIG. 6 is a drawing of spacers and liquid coupling of components of an LMS prism assembly according to an embodiment of the present invention.

Recognize that, if the components within the prism assembly were to directly touch (e.g., optical element 410 directly touching either optical element 420 or PBS 212), the result could be a visible artifact in an image projected by the prism assembly. The solution to this problem is to assure that a thin layer of liquid exists between the components and or elements of the optical assembly. Many different methods and/or devices may be implemented to assure that a layer of liquid exists between components. For example, the optical elements may be physically separated during filling of the coupling fluid, spacers may be affixed to portions of the frame to separate the elements and PBSs. In one embodiment, spacers are applied between the optical surfaces. FIG. 6 is a drawing of spacers (spacer balls 600) and liquid coupling of components of an LMS prism assembly according to an embodiment of the present invention. The spacers can be glass rods or balls with diameter on the order of thousandths of an inch. The index of refraction of the liquid coupling fluid is chosen to match that of the spacers thus rendering them invisible.

The present invention includes various methods and devices for application of the spacers. In one set of embodiments, the spacers are applied directly to the optical surfaces of the PBSs and/or optical elements. In one embodiment, the spacers are sprayed onto the optical surfaces. Spraying spacers onto optical surfaces may be performed using liquid crystal display manufacturing techniques and machinery. Either wet or dry spacer application may be utilized. In other embodiments, the spacers are suspended in the liquid coupling fluid at least during manufacture. After manufacture of the prism assembly, suspended spaces remain lodged between the optical surfaces and/or settle to a bottom portion of the prism assembly out of the viewing area.

The liquid coupling fluid is an optical coupling fluid selected to have an index of refraction that matches (or closely matches) the index of refraction of the PBSs and any optical elements spaced within the fluid. The index of refraction changes depending on wavelength, and is different for each of the components and elements in the prism assembly. Typical values are 1.52 for plastic elements, and 1.71 for glass components. The optical coupling fluid generally preferred to have an index of refraction in the 1.50–1.85 range. A 1.6 index of refraction optical coupling fluid has worked well in experiments carried out by the inventors. Similarly, in the embodiments using spacers, the optical coupling fluid is chosen to have an index of refraction preferably matching each of the PBSs, optical elements, and spacers as closely as possible. Matching the index of refraction can be done by splitting the difference between the index of refraction of the optical components and elements. Another method would be to perform an impedance matching type of arithmetic (e.g., taking the square root of the sum of the squares of the index of refraction of each optical component/element). However, the present inventors note that selection of any index of refraction between the high and low index of refraction of the optical components and elements provides better matching than any other embodiments of the pathlength matched prism assembly, including the gel, cured epoxy, and air filled embodiments discussed elsewhere herein. The chosen index of refraction of the coupling fluid may also be weighted toward matching component interfaces that occur more frequently in the prism assembly. In one embodiment, the index of refraction of the coupling fluid matches the index of refraction of the spacers.

Important properties for the coupling fluid are toxicity, flammability, yellowing propensity, chemical properties, and cost. Toxicity and flammability are safety considerations, the product is preferably non-toxic and non-flammable. Also, the optical coupling fluid, to be practical, needs to be resistant to yellowing, particularly under intense light and heat conditions. The optical coupling fluid has to have chemical properties that do not react with other optical elements, components, and parts of the prism assembly. And, to be commercially practical, the optical coupling fluid needs to be relatively inexpensive and readily available. In one embodiment, the optical coupling fluid is, for example, mineral oil. Many different types and properties of optical coupling fluid are commercially available (e.g., Cargille Corp makes many different types of index matching fluid).

In one embodiment, the optical coupling fluid is a UV curing adhesive, which, when cured, makes a solid prism assembly, the cured adhesive coupling the optical elements/ components without fluids. However, the liquid filled embodiments have better index of refraction matching than commercially practical UV curing adhesive, so the liquid filled embodiments are preferred. In another embodiment, optical coupling is performed by inserting an optical coupling gel between the various components/elements of the prism assembly. NYE corporation makes suitable gel (matching gel). In yet another embodiment, the coupling material is air, or another gas is utilized as a coupler between the optical components and elements. In the air-filled embodiment, anti-reflection coating are placed on the surfaces of the optical elements and components to eliminate or reduce reflections.

Note that variations of the assembly techniques described herein can be applied to any of the prism assembly configurations discussed in this document.

There are several other advantages offered by the configuration and manufacturing method described above. These include the following:

Several prism assembly configurations include polarization-rotating component(s) (rotators) (e.g., rotating beam 235 after being passed by polarizing beam splitter thin film 217 so it is then reflected by polarizing beam splitter thin film 213). Rotators are generally constructed of layers of polycarbonate plastic bonded together. In prior systems, the adhesive needs to be able to bond the polycarbonate plastic of the rotator to the glass of the prism assembly components. The common solution to this problem is to purchase the polarizing rotator from the vendor in the form of a "sandwich". In "sandwich" form, the rotator has been bonded between two cover glasses. The cover glasses make it easier for the prism assembly manufacturer to bond the rotator into the prism assembly (e.g., bonding between surfaces of adjacent cover glasses). However, compared to the polycarbonate rotator itself, the sandwich may be available only in limited supply and is more expensive. In contrast, in the present invention, The liquid coupling method allows the direct use of the inexpensive, readily available polycarbonate component. Since with liquid coupling the polycarbonate is not bonded with adhesive, this class of problems is eliminated.

The precise outside dimensions of the prism assembly obtained using the new manufacturing method not only allow direct mounting of the microdisplays onto the prism assembly, but also allows for the use of precision (or fixed) mounting points for mounting the completed kernel (prism assembly with microdisplays attached) into the device in which it is to be used (e.g., light engine). The use of precision or fixed mounting points reduces or eliminates the need for a physical adjustment mechanism and procedure when mounting the kernel into the light engine.

Conventional prism assemblies generally utilize a series of glue cure steps. As the prism assembly grows in size and complexity, it becomes progressively more difficult to cure the adhesives due to the absorption of light by the glass and/or the optical properties of the components. Liquid coupling as provided by the present invention eliminates this problem and can greatly reduce the time required for prism assembly.

The present invention includes a device and method to hold the optical elements (e.g., optical elements 410 and 420) in place. The optical elements are also generally referred to as flat components because they are generally rectangular in shape and flat (having a thin width). However, the present invention may be practiced using different shapes and widths of the optical components.

Figure 8:
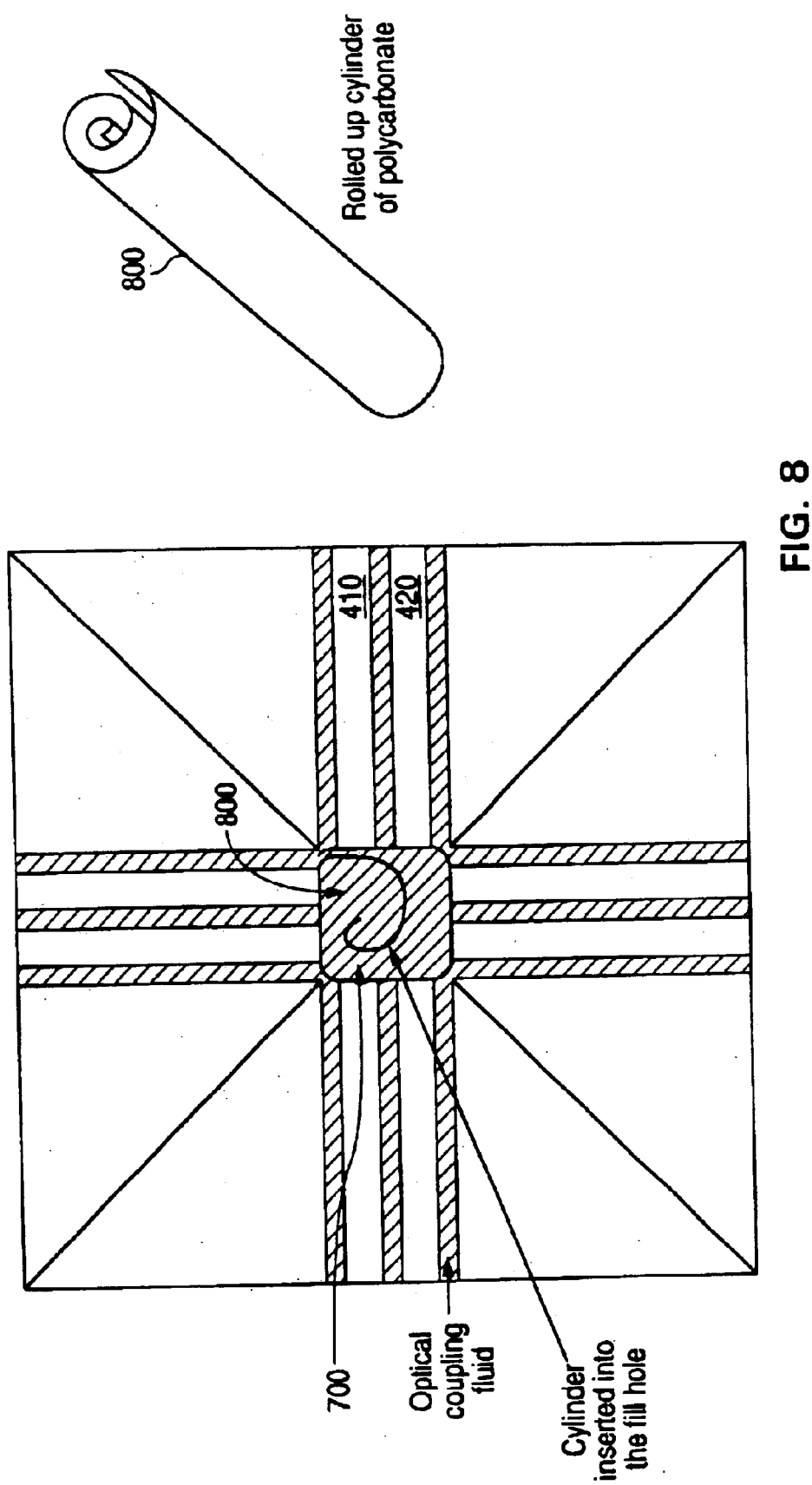
FIG. 8 is a drawing of an example mechanism utilized to hold prism assembly components according to an embodiment of the present invention.

One concern at any time, including manufacture, shipping, storage, and/or during actual use is the potential movement of optical components in the coupling fluid. Movement towards the central fill hole 700 could potentially leave the moved component (or parts of the moved component) out of the optical path. The present invention provides for placing a spacer device in the central fill hole 700 to hold the flat components in a stable general location. FIG. 8 is a drawing of an example spacer device 800 utilized to hold optical components according to an embodiment of the present invention. In the illustrated embodiment, the spacer device 800 is a sheet of polycarbonate rolled into a tight cylinder. The spacer device 800 is inserted into the central fill hole 700. Once in place, the cylinder will "unroll" and press on the components so as to keep them out of the central hole.

As previously discussed an air bubble may be left inside the prism assembly to account for expansion of the various components. One problem with expansion of the components is that the components expand at different rates. As the optical coupling fluid expands, so does the optical components of the prism assembly. However, the expansion of the liquid and optical components is at different rates (differential expansion). In most cases, the optical coupling fluid expands at a higher rate than the optical components. Without the air bubble, an amount of stress is applied against the optical components by the expanding fluid. Without the air bubble, this stress can cause an undesirable amount of stress induced birefringence effecting the various light beams passing through the optical components of the prism assembly as the liquid coupling fluid expand.

Referring back to FIG. 5, an air bubble 550 is illustrated. The air bubble 550 is permanently maintained within the prism assembly once the fill hole 510 is capped. In FIG. 5, the "frame" elements (500A, 500B, and 500C) on the outside of the prism assembly serve both to contain the liquid and to hold the prism assembly components rigidly in space.

In the example embodiment of FIG. 5, the volume within the prism assembly surrounded by frame 500 is occupied by glass of the prism assembly components (e.g., PBSs), optical elements, and the optical coupling liquid. As the temperature of the prism assembly rises (as it will during operation) the linear and volume dimensions of all components increase. However, at least partly due to the fact that the coefficient of thermal volumetric expansion of the optical coupling liquid is considerably higher than that of the glass and other materials, when the temperature rises, the volume of the liquid expands faster that that of the glass "container" (optical components and frame bounding the liquid). In addition to the undesirable optical effects, excessive stress caused by this differential expansion could potentially cause the bonded components to separate. The air bubble 550 is one way to accommodate the effects of differential expansion and avoid the build up of stress.

Figure 9:
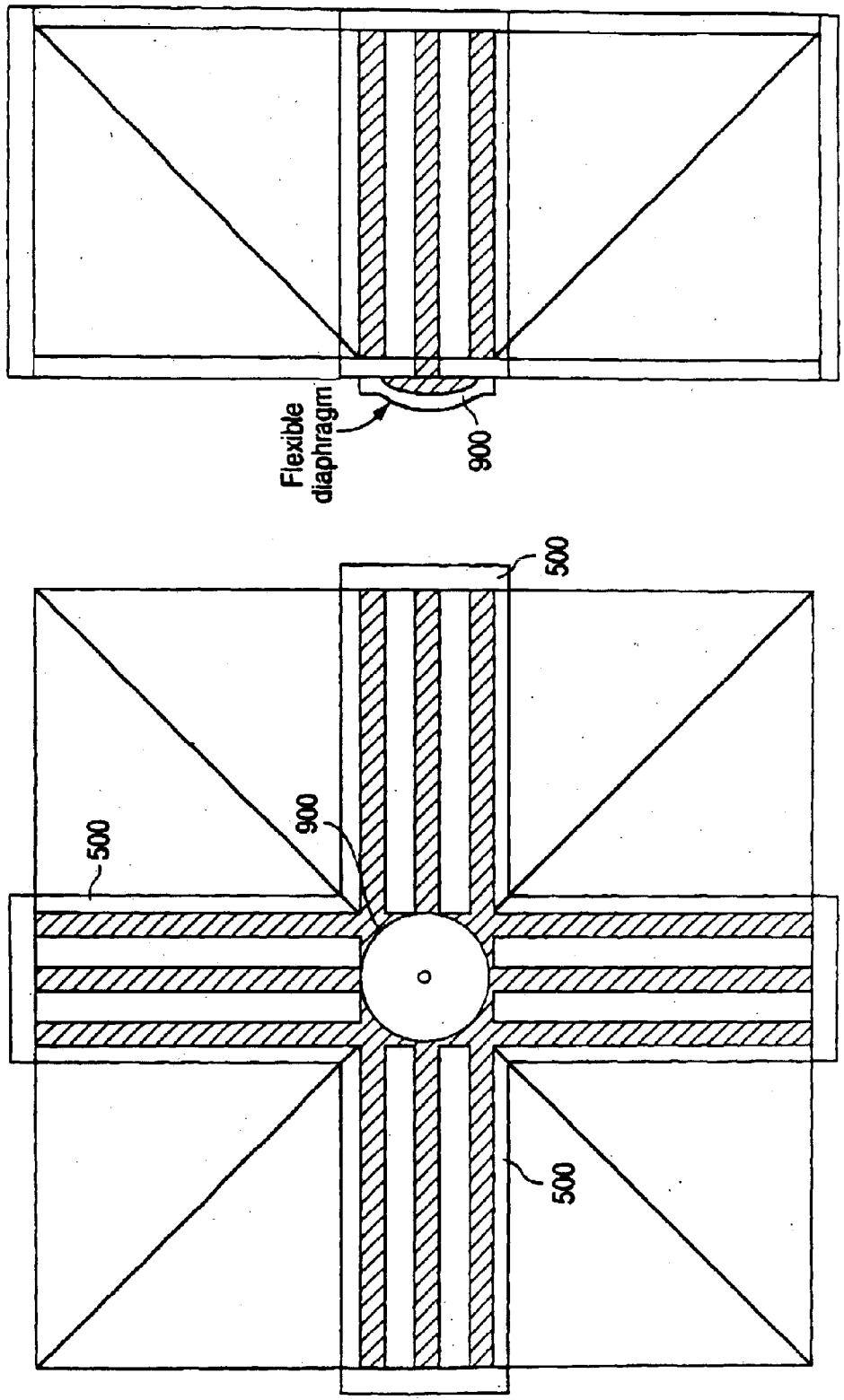
FIG. 9 is a drawing of a prism assembly equipped with a diaphragm 900 according to an embodiment of the present invention.

FIG. 9 is a drawing of a prism assembly equipped with a diaphragm 900 according to an embodiment of the present invention. The diaphragm 900 is constructed of a flexible material such as rubber, plastic, or another material with sufficient strength and flexibility to accommodate the expanding fluid and thereby relieve stress. The diaphragm 900 flexes as the volume of liquid increases or decreases. Preferably, the diaphragm 900 is circular and affixed over the fill hole 510 using an adhesive. However, other shapes and attachment mechanisms may be utilized (e.g., the flexible material fitted under a ring clipped to the frame around the fill hole).

FIG. 10 is a drawing of an air bladder 1000 equipped prism assembly according to an embodiment of the present invention. In one embodiment, the frame 500 is capped (e.g., cap 1010), and a bladder is inserted inside the optical assembly. The bladder expands and contracts as the volume of liquid decreases and increases.

The air filled bladder 1000 is inserted into the fill channel (central fill hole 700). The volume of the bladder can increase or decrease to accommodate volumetric changes in the coupling liquid. In alternative embodiments, the bladder may be filled with any suitably compressible material (e.g., gas, liquid, solid, or combination thereof). The bladder 1000 can also serve to assist in holding those components in place that are not glued to the frame (e.g., the "flat" components (e.g., 410, 420) located between the polarized beamsplitting cubes). When configured to assist in holding the "flat" components in place, spacers such as polycarbonate roll 800 are not needed.

Figure 11:
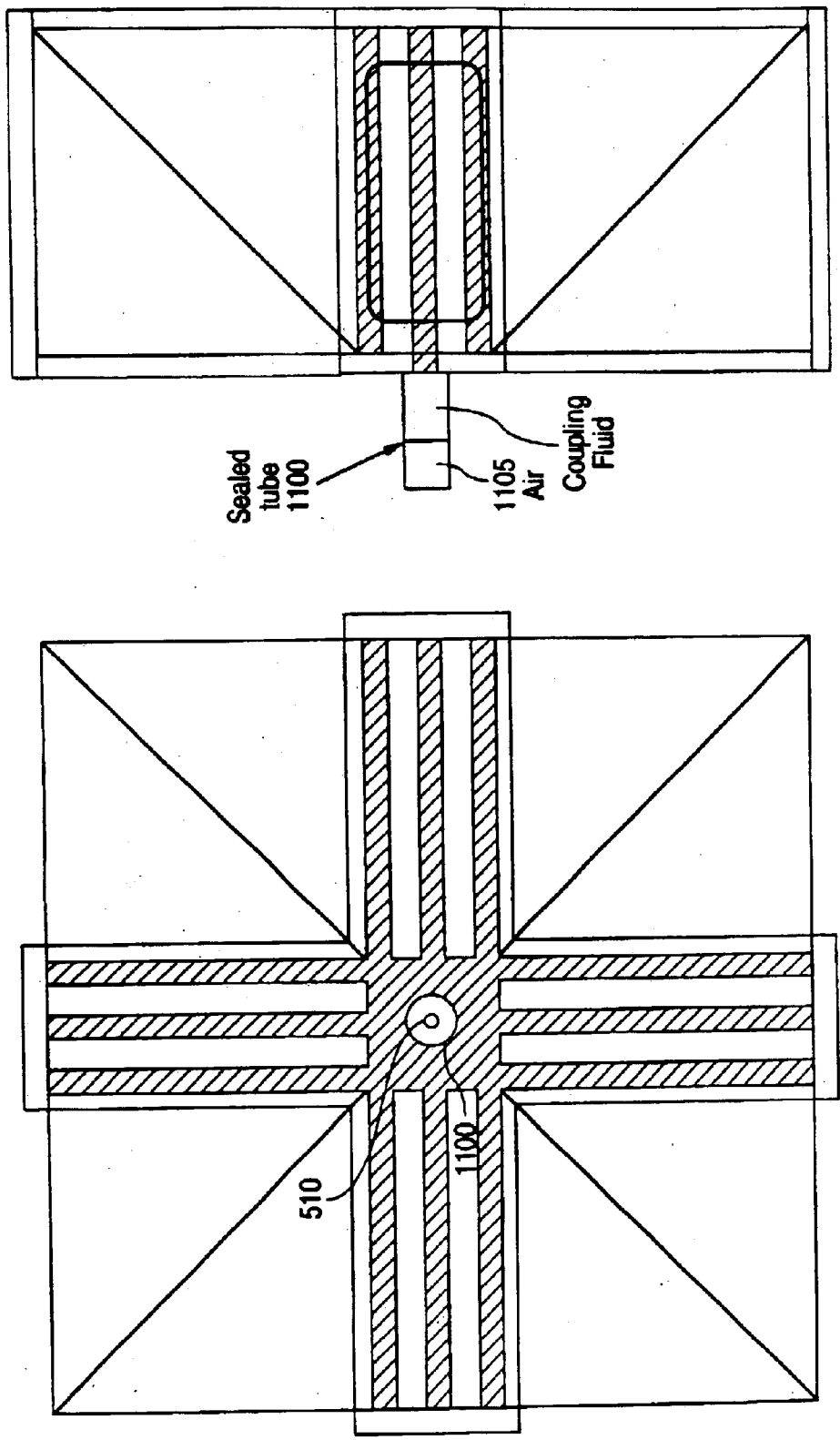
FIG. 11 is a drawing of an embodiment of a sealed tube assembly according to an embodiment of the present invention.

FIG. 11 is a drawing of an embodiment of a sealed tube 1100 assembly according to an embodiment of the present invention. A sealed tube 1100 is attached to the fill hole 510. A portion of the sealed tube 1100 contains an air bubble 1105. The air bubble 1105 will enlarge or shrink to accommodate expansion or contraction of the liquid within the prism assembly. In this approach, similar to the air bubble only approach discussed above, it is important to understand the orientation of the prism assembly in the light engine application. The reason being that the air bubble 1100 will migrate to the highest point within the prism assembly. It is therefore necessary to design the system such that the end of the tube is a high point. The tube may be configured with an elbow or other structure to direct the air bubble to an appropriate location. In the case of the air bubble only approach, it is therefore important that the high point of the prism assembly (high point of fluid in the prism assembly) is not at a point in of the optical paths of the prism assembly.

Figure 12:
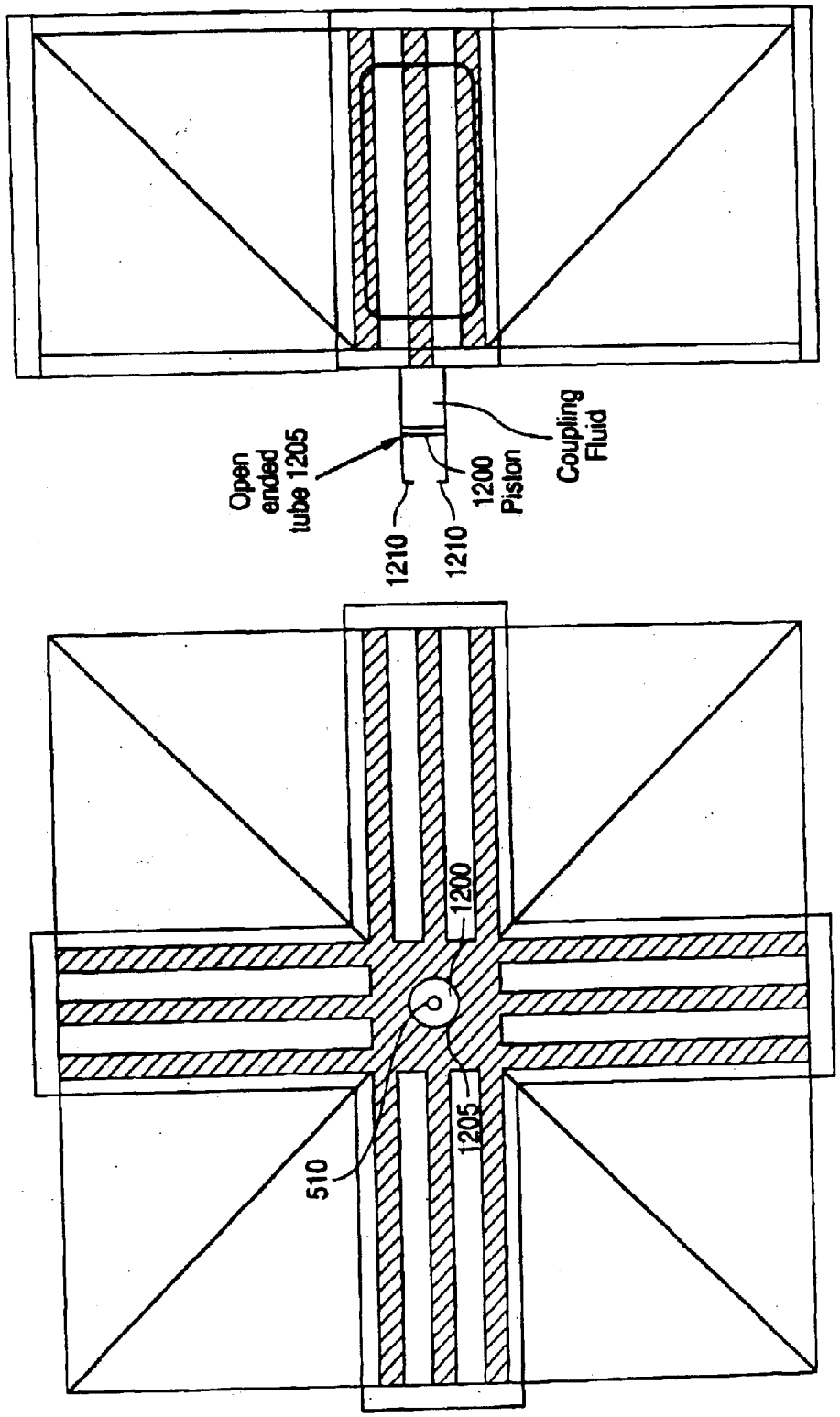
FIG. 12 is a drawing of an open air piston arrangement according to an embodiment of the present invention.

FIG. 12 is a drawing of an open air piston 1200 arrangement according to an embodiment of the present invention. An open ended tube 1205 is attached to the fill hole 510. A sliding piston 1200 fits snugly inside the open ended tube. As the optical coupling liquid expands with increasing temperature, the piston 1200 slides outward within the open ended tube. As the optical coupling liquid shrinks with decreasing temperature, surface tension (and/or pressure variance between the inside and the outside of the prism assembly) causes the piston to slide inward within the open ended tube 1205. In one embodiment, the open ended tube is longer than a predicted maximum expansion of the optical coupling fluid. In one alternative, stops 1210 are positioned inside the open ended tube to prevent the piston from reaching the open end of the tube 1205. In another alternative, the stops 1210 are electrodes connected to an emergency shut-off circuit, and the piston 1200 has a conductive material on its outer surface. When the piston contacts stops 1210, the light engine to which the prism assembly is installed is shut down at least until the prism assembly is sufficiently cooled to disengage piston 1200 from the stops 1210. As with all the embodiments listed herein, the open ended tube may be combined with one or more other embodiments (e.g., air bladder) to provide stress relief to compensate for the expanding and contracting optical coupling fluid.

Each of the above embodiments have an external frame (e.g., frame 500—external to the optical components of the prism assembly) that seals the prism assembly and contains the optical coupling fluid (and include any necessary attachments for any of the stress relief features discussed above). The frame also provides structural strength to the prism assembly. However, the present inventors have also realized the need for a compact arrangement for sealing the optical coupling fluid. The compact arrange then allows for the prism assembly to be utilized in a wider variety of optical applications, including different LCoS based video projection systems.

Furthermore, any newly designed and/or previously existing light engine systems can be fitted with a fluid coupled prism assembly. In new designs, fitting the liquid coupled prism assembly may be performed by fitting mounts within the projection system to accommodate one or more liquid coupled prism assembly sizes. However, in the case of retrofit systems (fitting liquid filled prism assemblies to previously sold projection systems and/or fitting liquid coupled prism assemblies to new projection system of a previous design), physical accommodation of the liquid coupled prism assemblies may not be so easily accomplished. That is, the physical size and shape of a fluid coupled prism assembly may not allow it to directly fit into the position provided for a conventional prism assembly within an existing light engine. The modifications of the light engine required to accommodate a fluid coupled prism assembly may be difficult, expensive or, in an extreme case, not possible. Therefore, by providing a fluid coupled prism assembly that is sealed and provides structural strength and has external dimensions that are similar to that of an equivalent conventional prism assembly, that prism assembly could be used as a drop in replacement for a conventional prism assembly in any light engine design. The invention disclosed in this document is such a means.

For these reasons, the present inventors have also developed an internally sealed prism assembly that seals and provides structural integrity to a liquid filled prism assembly.

Figure 13:
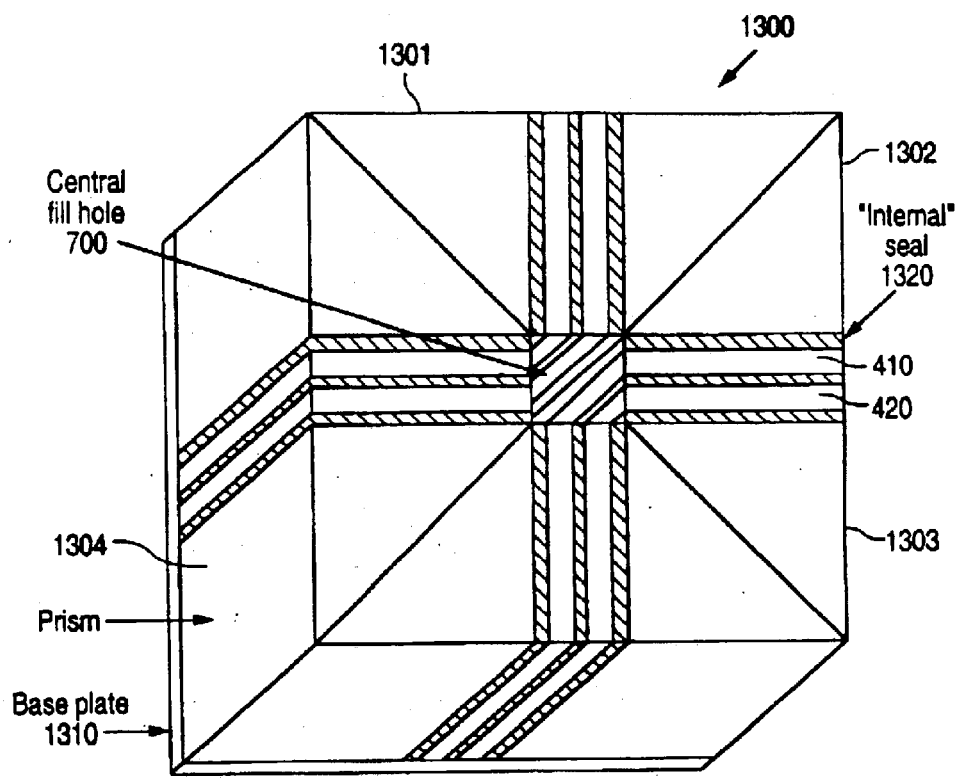
FIG. 13 is a drawing of an internally sealed prism assembly according to an embodiment of the present invention.

FIG. 13 is a drawing of an internally sealed prism assembly 1300 according to an embodiment of the present invention. The internally sealed prism assembly 1300 includes a baseplate 1310 and at least one internal seal 1320 between optical components of the prism assembly. Comparing this embodiment to the previous configurations, most features of the external frame are absent except the base plate 1310 (the base plate being a feature common to both the conventional and fluid coupled prism assembly configurations). The base plate 1310 provides a secure, firm surface for attaching the PBSs 1301–1304. As illustrated in FIG. 13, the internal seal is fitted between optical elements 410 and 420, between optical element 410 and PBS 1302, and between optical element 420 and PBS 1303. The internal seal extends downward from the top of the optical elements/PBSs a short distance (e.g., 1 mm) to produce a seal that maintains the optical coupling fluid installed into the prism assembly. In one embodiment, the internal seal also overlaps the tops of the optical elements 410 and 420, such that the seal covers the exposed surfaces of the optical elements, but preferably does not extend beyond the outer surface of the PBSs. In depth, the seals seeps between the optical elements/PBSs to a prescribed sealing depth (e.g., 1 mm).

Figure 14:
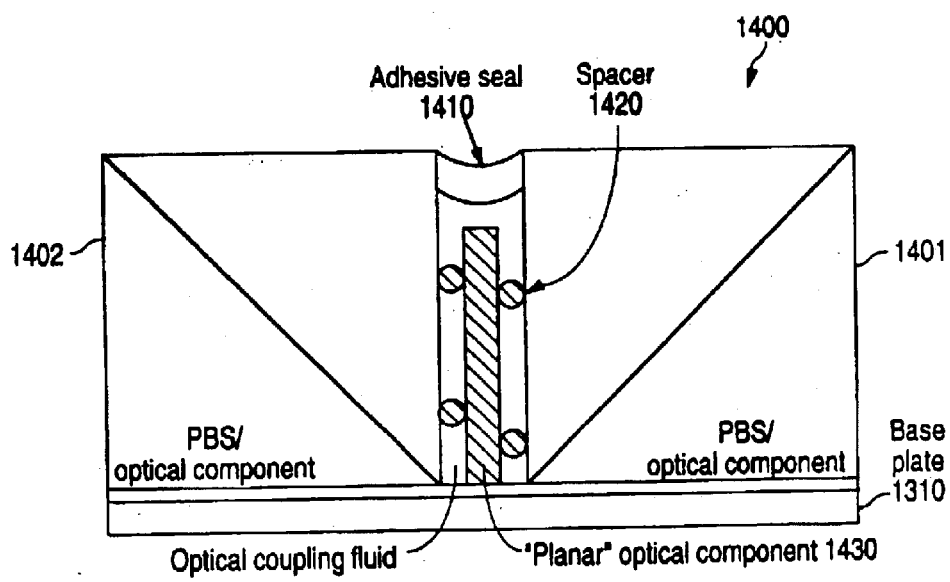
FIG. 14 is a close-up, of an internal seal of an internally sealed prism assembly according to an embodiment of the present invention.

FIG. 14 is a close-up of an internal seal of an internally sealed prism assembly 1400 (part view) according to an embodiment of the present invention. In FIG. 14, 2 PBSs 4101 and 1402 have an internal seal 1410 between them. The internal seal may be described as a "picture frame" between the PBS elements. The adhesive does not extend beyond the outer surface of the prism assembly. Preferably, the internal seal is an adhesive agent that not only seals the prism assembly, preventing leakage of the optical coupling fluid, but may also provide additional rigidity to the entire structure. The adhesive may be, for example a 1 or 2 part epoxy or a UV cured adhesive that both hardens and seals.

Alternatively, the adhesive seal may be a pliant adhesive such as silicone based adhesives. However, flexing of the prism assembly can become an issue if non-hardened sealant is utilized. While the bottom plate of the frame provides enough rigidity that pliant adhesives may be acceptable in some applications, a top plate (on the side of the prism assembly opposite the base plate) in addition to the base plate adds enough rigidity that pliant adhesives are fully acceptable in most all applications.

FIG. 14 also illustrates an optical element ("Planar" optical component 1430) separated by spacers 1420. The optical element is shorter than a bottom height of the adhesive sealant. The optical element is representative and may in fact be several optical elements also separated from the PBSs and each other via additional spacers. The "planar" optical components 1410 are items such as dichroics, reflective polarizers and wavelength specific retarders contained between the PBSs and suspended in the optical coupling liquid. The planar components are spaced from the glass surfaces by use of spacer elements as discussed previously. Penetration (the prescribed sealing depth) of the adhesive 1410 is confined to a region out of the optical path. The base plate 1310 provides the required rigidity to the prism assembly.

As explained above, the principle advantages of the disclosed liquid coupled prism assembly techniques and configurations include the ability to use less expensive, low tolerance glass components, and the ability to fabricate a prism assembly with "perfect" outside dimensions and in so doing, enabling the attachment of microdisplays directly to the prism assembly. In turn, the latter provides several advantages the foremost being that the resulting monolithic assembly will remain in a alignment under a wide range of conditions.

An alternative means by which these advantages can be obtained is to utilize the "build from the outside in" procedure described previously but, rather than filling the prism assembly with an optical coupling liquid, leaving the assembly empty therefore "filling" with air. However, in this approach, it will be necessary to coat all surfaces now exposed with an anti-reflection thin film (AR coatings) to suppress reflections. The expansion port is not required in this configuration. In some applications it may be possible to also omit the side rails of the frame (e.g., 500B) and possibly the top (500C).

In yet another alternative, the prism assembly is filled with an epoxy that cures. Preferably the cured epoxy has an index of refraction that closely matches the index of refraction of the PBSs and optical elements utilized. In still yet another embodiment, a gel substance may also be used to fill the joints between adjacent PBSs. Again, preferably, the gel has an index of refraction that approximates that of the other parts of the prism assembly. An example gel that could be utilized is manufactured by NYE Corporation.

FIG. 15 is an illustration of a pathlength matched Polarizing Beam Splitter (PBS) cube. FIG. 16A illustrates a pathlength matching device 1600 used to produce a pathlength matched PBS or beam splitting cube. A production process of a pathlength matched PBS cube is now described.

The pathlength matching device 1600 is configured to hold two prisms (e.g., prism 1610 and 1620) and provide a fine adjustment (e.g. micrometer adjustment 1630) for aligning or matching selected pathlengths through the two prisms. The two prisms (1610 and 1620) that will compose a PBS upon completion of the production process are positioned onto precision "stops" (1640, 1650) of the pathlength matching device 1600. Using the terminology defined in FIG. 15, Face 1 (on the top prism 1610) is attached to the adjustable stop 1640 along side 1642, and Face 2 (on the side of prism 1620) is attached to the fixed stop 1620 along side 1652.

One method to achieve a firm but temporary attachment of the prisms to the stops is to use a vacuum hold down. For example, a vacuum chuck (not shown) is placed in at least one location on each stop and a vacuum line attached to the chucks provides suction that holds the prisms in place. However, other devices such as a clamp may be utilized. Thus the prisms are placed in position in corresponding stops of the pathlength matching device.

An adhesive (e.g., a UV curable adhesive) is dispensed to fill the gap between the top and bottom prism. On the face of each stop is a precisely located alignment target. The alignment target is a fine line (on the order of 10 microns). Stop 1640 includes alignment target 1644 and stop 1650 includes alignment target 1654. A high-resolution video camera "looks into" the as yet unassembled PBS through a Reference Face 1612 of prism 1610. Both alignment lines are observed through the video camera. Pathlength matching is achieved when the two alignment lines coincide. The lines can be made coincident by "sliding" the top prism along diagonal 1660 between the top prism 1610 and the bottom prism 1620.

The amount of adjustment is performed by visually viewing and adjusting the prism assembly. With experience, an assembler will be able too estimate an amount of adjustment and dial that amount into the micrometer, and then perhaps make one or two smaller adjustments to position the prisms in a pathlength matched position. However, knowledge of a precise number to dial into the micrometer is not essential, and the pathlength matched positions can be reached simply by viewing and adjusting. Therefore, the micrometer 1630 may be replaced by a fine adjustment screw or any device that can be configured to move the relative positions of the two prisms along their diagonals.

Also, note that the pathlength adjustment is fine tuned by sliding the prisms along their diagonals, and since the prisms are generally not of precisely the same dimensions, the prism corners will not perfectly align (note overhand at each end of the diagonals). In the finished pathlength matched beamsplitter (e.g., PBS), the amount of overhang is proportional to an amount of non-uniformity, or non-equality, in the dimensions of the prisms. With uniform prisms having equal dimensions, the prisms would mate together evenly, however, as noted above, such precision in prism construction is very costly. Thus, the present invention allows pathlength matched construction without the need for precisely sized prisms.

In the embodiment of FIG. 16A, a micrometer 1630 is utilized to adjust the position of the top prism and make the alignment lines coincide. In one embodiment, an operator watches an output of the video camera on a display screen and manually turns the micrometer adjustment until the alignment targets coincide. In another embodiment, the video camera feeds a computing device having vision system software that recognizes when the alignment targets are aligned. Computer generated signals inform an operator how much to adjust the micrometer, or the micrometer is adjusted by a stepping motor (or other control motor) as commanded by the vision system. In another embodiment, the video camera is replaced with an eyepiece in which the operator directly observes the alignment targets and then manually adjusts the micrometer 1630.

Figure 16B:
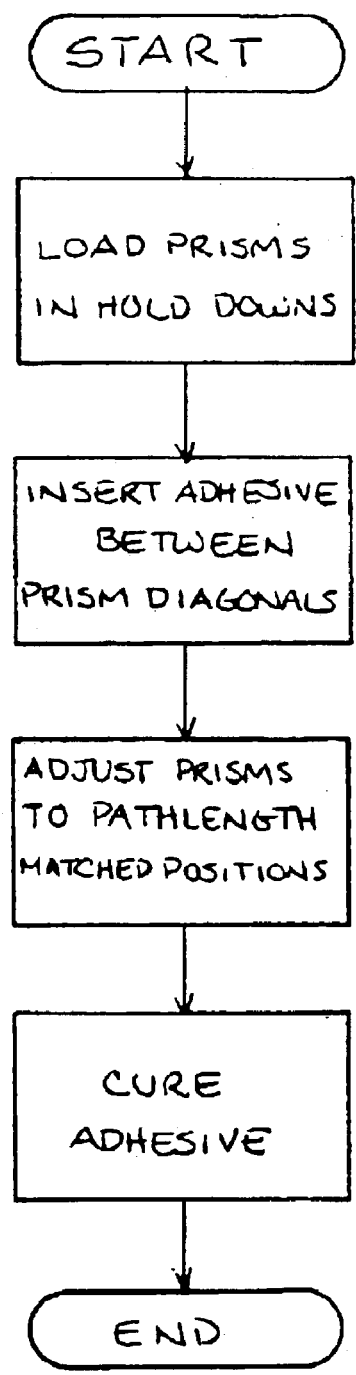
FIG. 16B is a flow chart of a process for producing a pathlength matched beamsplitter according to an embodiment of the present invention.

Finally, once alignment is satisfactory, a UV lamp is used to illuminate the PBS curing the adhesive and locking the components into place. An entire process for producing a pathlength matched beam splitting cube, using the device shown in FIG. 16A, is illustrated in FIG. 16B. To produce a Polarizing Beam Splitter (PBS) an additional step of applying a polarizing layer, thin film, to a diagonal, of one of the prisms or between each of the diagonals of the prisms is added. Other types of beam splitters may be constructed by adding or substituting a different thin film (e.g., colorized beam splitter with the addition of a color layer).

A second method of production of a pathlength matched PBS cube is now described. FIG. 17 is an illustration of a device used to produce a pathlength matched PBS cube according to another embodiment of the present invention. Several features of the device in FIG. 17 are the same as the device in FIG. 16A. The two prisms that will compose the PBS are held onto precision stops 1640 and 1650. Face 1 (on the top prism 1610) is attached to the adjustable stop 1640 and Face 2 (on the bottom prism 1620) is attached to the fixed stop 1650. Again, a vacuum hold down is used to achieve a firm but temporary attachment of the prisms to the stops. As before, an adhesive (probably an UV adhesive) is dispensed to fill a gap between the top and bottom prism along diagonal 1660.

An alignment target is located on the face of each stop. In this embodiment, the location of the alignment target need not be precise. A high-resolution video camera "looks into" the as yet unassembled PBS through the Reference Face 1612 (of the top prism 1610). In this embodiment, the depth of field (DOF) of the video camera (as determine by the lens) is chosen to be very limited. The position of the top prism is adjusted by micrometer 1630 until the video camera has both alignment targets simultaneously in focus. An equal distance (matched pathlength) from both alignment targets to the reference face (and video camera focal plane) is achieved when both alignment targets are in focus. DOF of the video camera is limited such that the alignment targets can only be simultaneously in focus when the prisms are arranged in a pathlength matched position within a tolerance needed for a product in which the PBS is to be used. As before, when alignment is satisfactory, the final step is to use a UV lamp to illuminate the PBS and cure the adhesive.

The present invention includes a number of configurations of kernels that may be constructed using any one or more of the parts, features, or techniques described above. A particular configuration may be advantageous over other configurations based on availability and cost of certain components (e.g., costs/availability of needed dichroics, filters, etc), and based on physical design parameters such as the size and shape of an enclosure used to house a finished product using the kernel. A number of example enclosure designs for televisions and video projection are described in Berman et al., Provisional Application Ser.1 No. 60/433,125, entitled "Designs of Display Appliances," filed Dec. 13, 2002, the contents of which are incorporated herein by reference in their entirety. Other example design packages are readily available in Television related literature and promotional materials available from manufacturers.

FIG. 18 is a block diagram of a layout of optical components applicable to a number of different kernel configurations. Table 1 provides a listing of several kernel configurations provided by the present invention:

TABLE 1

| FIGURE NUMBER | INPUT ORIENTATION | FACE 1 | FACE 2 | FACE 3 | FACE 4 |
|---|---|---|---|---|---|
| 19 | Right angle | Blue | Red | Green | — |
| 20 | Right angle | Blue | Red | — | Green |
| 21 | Right angle | Blue | Green | Red | — |
| 22 | Right angle | Blue | Green | — | Red |
| 23 | Right angle | Blue | — | Red | Green |
| 24 | Right angle | Blue | — | Green | Red |
| 25 | Right angle | Red | Blue | Green | — |
| 26 | Right angle | Red | Blue | — | Green |
| 27 | Right angle | Red | Green | Blue | — |
| 28 | Right angle | Red | Green | — | Blue |
| 29 | Right angle | Red | — | Green | Blue |
| 30 | Right angle | Red | — | Blue | Green |
| 31 | Right angle | Green | Red | Blue | — |
| 32 | Right angle | Green | Red | — | Blue |
| 33 | Right angle | Green | Blue | Red | — |
| 34 | Right angle | Green | Blue | — | Red |
| 35 | Right angle | Green | — | Red | Blue |
| 36 | Right angle | Green | — | Blue | Red |
| 37 | Right angle | — | Blue | Red | Green |
| 38 | Right angle | — | Blue | Green | Red |
| 39 | Right angle | — | Red | Blue | Green |
| 40 | Right angle | — | Red | Green | Blue |
| 41 | Right angle | — | Green | Blue | Red |
| 42 | Right angle | — | Green | Red | Blue |
| 43 | Straight through | Blue | Red | Green | — |
| 44 | Straight through | Blue | Red | — | Green |
| 45 | Straight through | Blue | Green | Red | — |
| 46 | Straight through | Blue | Green | — | Red |
| 47 | Straight through | Blue | — | Red | Green |
| 48 | Straight through | Blue | — | Green | Red |

TABLE 1-continued

| FIGURE NUMBER | INPUT ORIENTATION | FACE 1 | FACE 2 | FACE 3 | FACE 4 |
|---|---|---|---|---|---|
| 49 | Straight through | Red | Blue | Green | — |
| 50 | Straight through | Red | Blue | — | Green |
| 51 | Straight through | Red | Green | Blue | — |
| 52 | Straight through | Red | Green | — | Blue |
| 53 | Straight through | Red | — | Green | Blue |
| 54 | Straight through | Red | — | Blue | Green |
| 55 | Straight through | Green | Red | Blue | — |
| 56 | Straight through | Green | Red | — | Blue |
| 57 | Straight through | Green | Blue | Red | — |
| 58 | Straight through | Green | Blue | — | Red |
| 59 | Straight through | Green | — | Red | Blue |
| 60 | Straight through | Green | — | Blue | Red |
| 61 | Straight through | — | Blue | Red | Green |
| 62 | Straight through | — | Blue | Green | Red |
| 63 | Straight through | — | Red | Blue | Green |
| 64 | Straight through | — | Red | Green | Blue |
| 65 | Straight through | — | Green | Blue | Red |
| 66 | Straight through | — | Green | Red | Blue |

The terminology used in Table 1 is defined in FIG. 18. A basic kernel configuration is listed in FIG. 20 which shares several similarities to that disclosed in FIG. 2.

Note that some features have been left out of the Kernel Configuration drawings (not shown) in order to simplify the illustrations, including:

Glass spacers or other adjustments to the gaps between the PBSs or other optical components to equalize the optical path lengths.

Dump light paths.

Antireflection coatings on certain prism faces.

ColorSelect material at the input to the kernel that allows the input of polarized light.

ColorSelect material at the output of the kernel to rotate all linear output polarizations into one plane.

Compensating waveplate, cover glass or black mask on the microdisplays.

Features associated with the assembly of the kernel such as adhesive layers or optical coupling fluid.

Structural features (the frame) external to the optical components in a fluid coupled kernel.

Spacing elements between the PBS and "flat" components to assure that they do not touch thus allowing the inclusion of the optical coupling fluid.

Any of the above listed or other features not shown in the figures can be applied to modify any of the kernel configurations described herein.

Figure 67:
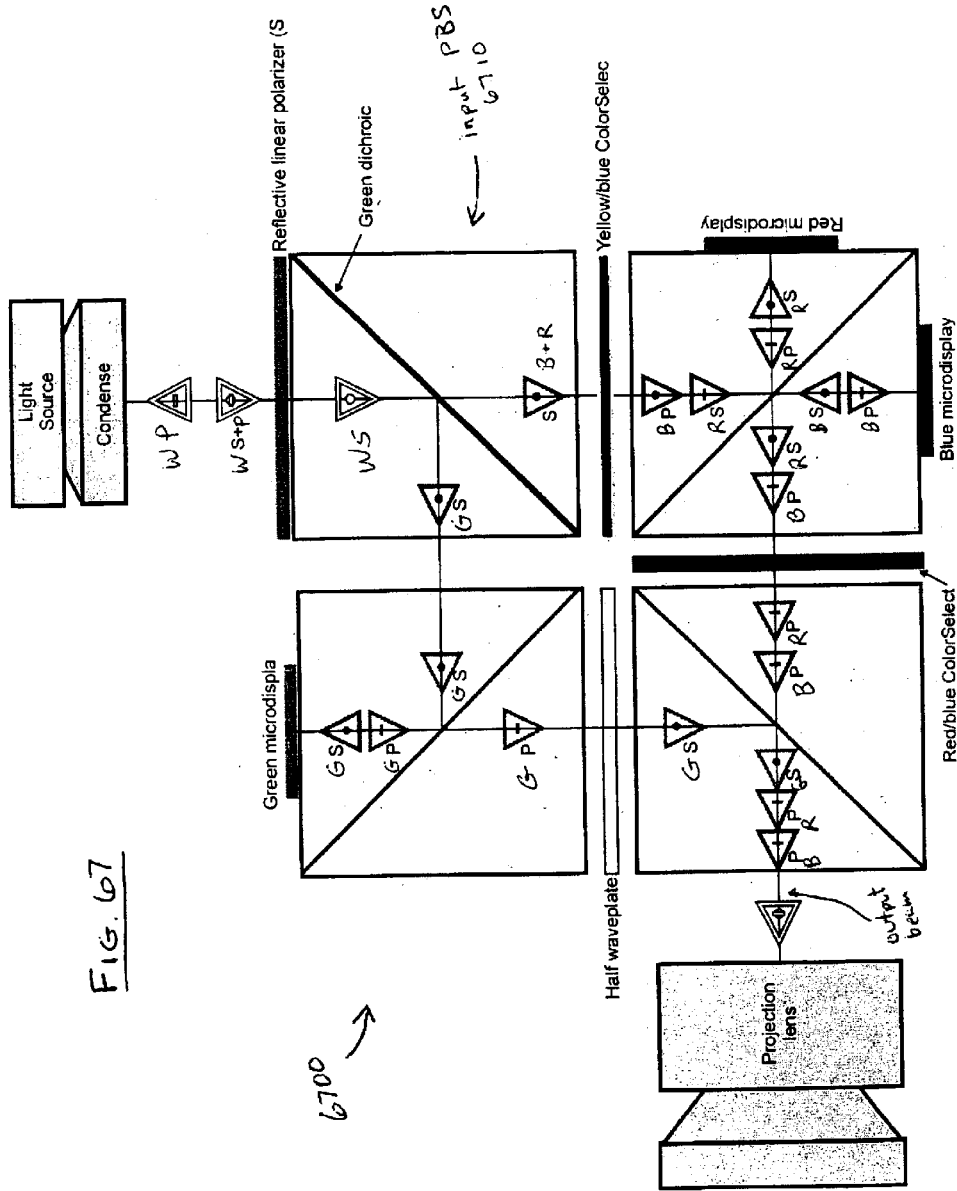
FIG. 67 is yet another kernel configuration according to an embodiment of the present invention.
Figure 68:
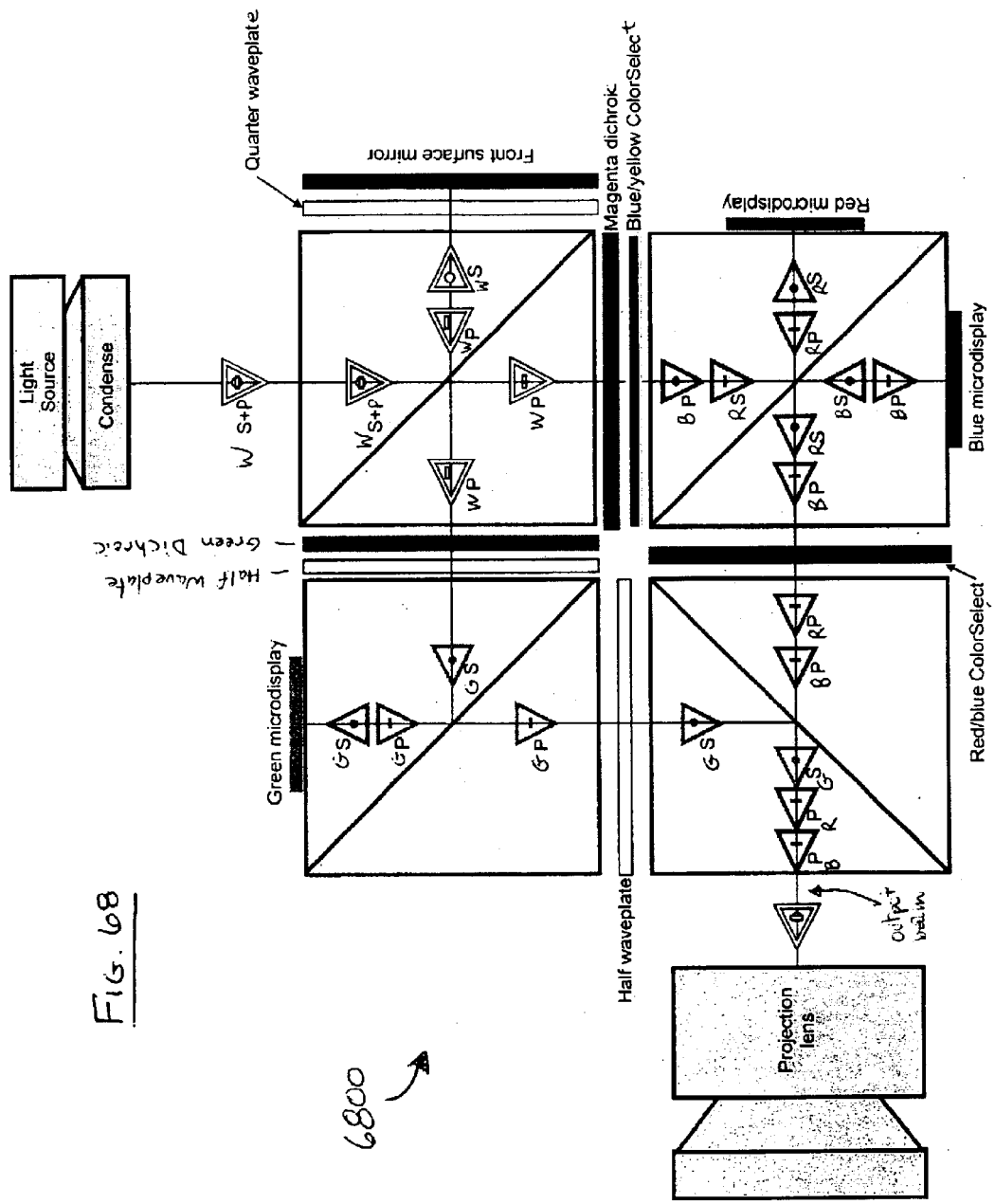
FIG. 68 is yet another kernel configuration according to an embodiment of the present invention.

FIG. 67 illustrates a prism and kernel configuration 6700 where each of the optical components is named and the path and polarization of the light at each point within the prism is indicated (as in previous diagrams, S and P indicate polarization, and W (White), G (Green), R (Red), and B (Blue) indicate color). Other components of a light management system utilized with the kernel configuration are also shown (Light Source, Condenser, and projection lens). FIG. 68 illustrates yet another prism and kernel configuration 6800.

Again, note that the illustrations indicate only the optics of the configuration. The actual prism may require additional components. For example, a "clean-up" polarizer can be inserted to the left and/or below the input PBS 6710 to improve the contrast ratio. Preferably, this would be a reflective polarizer. In addition, "spacer glasses" can be inserted between any of the PBSs to equalize the optical pathlengths from the reflective surfaces of the microdisplays to the output face of the output PBS. As with any of the kernel configurations described herein, liquid coupling and/or precision alignment corners may be utilized (e.g., see FIGS. 3 and 5), and, the PBSs can be pathlength matched PBS devices (e.g., similar to that illustrated in FIG. 15, and constructed according any of FIGS. 16A, 16B, and 17).

One advantage of utilizing liquid joints is that the coupling is much more efficient (e.g., less reflections). Another advantage is the possibility of reducing component count by eliminating the spacer glasses and adjusting the thickness of the liquid joints. Alternatively, the "joints" between the components in the optical path can be conventional, that is, a rigid adhesive.

An additional configuration alternative available to both prism and kernel configurations is to replace one or more of the PBSs with a reflective polarizer oriented at 45 degrees. (At this time, such reflective polarizers are produced by Moxtek, Inc.).

In both FIG. 67 and FIG. 68, the light output from the prism is linearly polarized but the green polarization direction is orthogonal to that of the red and the blue. In some video projector applications, such as those in which the screen contains a linear polarizer, it is desirable that all the light output by the prism be linearly polarized in one direction. This can be accomplished by placing a Magenta/green ColorSelect in optical series with the output beam.

Figure 69:
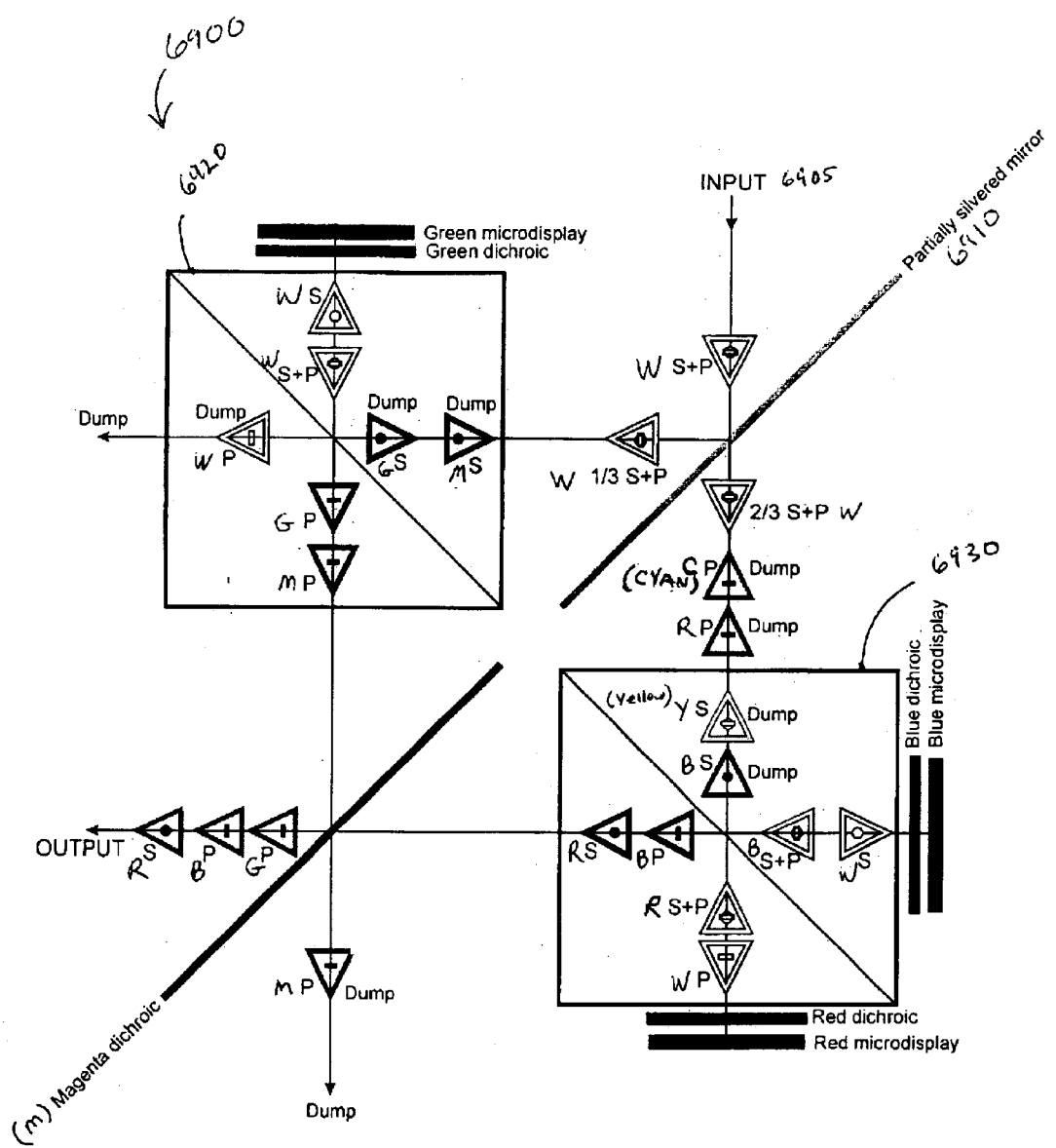
FIG. 69 is yet another kernel configuration according to an embodiment of the present invention.

FIG. 69 illustrates a prism assembly and kernel configuration 6900 according to an embodiment of the present invention. Components of the kernel configuration are named and the path and polarization of the light at each point within the prism assembly is indicated. Note that the division of the input unpolarized light (input 6905) by the partially silvered mirror 6910 can be adjusted to match that output by the light source and the properties of the prism (and/or other components in an entire light management system) and the eye response of the viewer. Only for the purposes of an example has the value been chosen to be ⅓ and ⅔. Note also that to simplify the drawing, the intensity of the light beams has been left off at all other points within the figure.

Note that FIG. 69 indicates only the optics of the configuration. The actual prism assembly may require additional components. More specifically, for example, a quarter waveplate can be inserted after either or both PBS for skew ray compensation. In addition, "spacer glasses" can be inserted as needed to equalize the optical pathlengths from the reflective surfaces of the microdisplays to the output of the prism assembly. Again, either liquid coupling ("liquid joints") between components in the optical paths can be utilized, or a conventional rigid adhesive. One further advantage of utilizing liquid joints is the possibility of reducing component count by eliminating the spacer glasses and adjusting the thickness of the liquid joints.

As with most of the embodiments discussed herein, an additional configuration alternative available to the configuration of the prism assembly is to replace one or both (all) of the PBSs with a reflective polarizer oriented at an degree (e.g., 45 degrees) (At this time, such reflective polarizers are produced by Moxtek, Inc.). With regard to mounting of the microdisplays, direct mounting may be utilized, such as applying the microdisplay to one or more faces of PBSs of a prism assembly with an adhesive, or by utilizing other attachment techniques (e.g., see Berman et al., U.S. patent application Ser. No. 10/251,104, entitled "Method and Apparatus for Mounting Liquid Crystal on Silicon (LCoS) and Other Sensitive Devices," filed Sep. 20, 2002).

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a spacer device constructed of rolled polycarbonate, any other equivalent device, such as a geometrically shaped (square, triangle, pentagon, hexagon, etc) or other shape roll of polycarbonate or any other material or any other device having an equivalent function or capability, whether or not listed herein, may be substituted therewith. Descriptions of polarizers, waveplates, beamsplitters, filters, and other optical components may be substituted with other components having similar functionality. Placement and/or angular relationships of the components may also be changed or rearranged and still have optical properties consistent with the present invention. Furthermore, the inventors recognize that newly developed technologies not now known may also be substituted for the described parts and still not depart from the scope of the present invention.

The present invention is mainly described in conjunction with a LMS that utilizes a kernel with a microdisplay that operates by rotating polarization of individual pixels. However, based on the description provided herein, it should be understood that the present invention may be practiced in devices with other types of microdisplays (e.g., scattering, absorption, diffraction based microdisplays), or in optical devices constructed without microdisplays.

Obviously, numerous modifications and variations of the present invention are possible in light of the above teachings. It is therefore to be understood that within the scope of the appended claims, the invention may be practiced otherwise than as specifically described herein.

What is claimed is:

1. A kernel, comprising:

a prism assembly arranged in four quadrants, comprising,
an input face on the first quadrant,
a first face and a second face on the second quadrant,
an output face on the third quadrant, and
a third and a fourth face on a fourth of the four quadrants;
wherein:
one of the four faces has an attached red microdisplay;
one of the four faces has an attached green microdisplay;
one of the four faces has an attached blue microdisplay;
the prism assembly includes optical components that facilitate the division of light entering the prism assembly through the input face into component red, green and blue light beams that are individually directed to a corresponding one of the red, green, and blue microdisplays where the light beams are reflected and then directed to the output face;
each quadrant comprises a pathlength matched beamsplitter arranged in a pathlength matched position in the prism assembly; and
at least one of the pathlength matched bearnsplitters comprises two prisms mated together with over lapping corners, wherein an amount of overlap in the overlapping corners is directly proportional to pathlength differences through each of the prisms.

2. The kernel according to claim 1, wherein said microdisplays are attached their corresponding quadrant face via a direct mounting technique.

3. A kernel, comprising:

a prism assembly arranged in four quadrants, comprising,
an input face on the first quadrant,
a first face and a second face on the second quadrant,
an output face on the third quadrant, and
a third and a fourth face on a fourth of the four quadrants;
wherein:
one of the four faces has an attached red microdisplay;
one of the four faces has an attached green microdisplay;
one of the four faces has an attached blue microdisplay;
the prism assembly includes optical components that facilitate the division of light entering the prism assembly through the input face into component red, green and blue light beams that are individually directed to a corresponding one of the red, green, and blue microdisplays where the light beams are reflected and then directed to the output face;
each quadrant comprises a path length matched beam splitter; and
each beam splitter comprises two prisms mated together with over lapping corners, wherein an amount of overlap in the overlapping corners is directly proportional to pathlength differences through each of the prisms.

4. The kernel according to claim 3, wherein the beam splitters are arranged in pathlength matched positions.

5. A kernel, comprising:

a prism assembly arranged in four quadrants, comprising,
an input face on the first quadrant,
a first face and a second face on the second quadrant,
an output face on the third quadrant, and
a third and a fourth face on a fourth of the four quadrants;
wherein:
one of the four faces has an attached red microdisplay;
one of the four faces has an attached green microdisplay;
one of the four faces has an attached blue microdisplay;
the prism assembly includes optical components that facilitate the division of light entering the prism assembly through the input face into component red, green and blue light beams that are individually directed to a corresponding one of the red, green, and blue microdisplays where the light beams are reflected and then directed to the output face;
the second quadrant is cater-cornered with respect to the fourth quadrant, the input face is adjacent to the first face, and the output face is adjacent to the third face;
the green microdisplay is attached to the fourth face;
the red microdisplay is attached to the third face;
the blue microdisplay is attached to the first face; and
each beam splitter comprises two prisms mated together with over lapping corners, wherein an amount of overlap in the overlapping corners is directly proportional to pathlength differences through each of the prisms.

6. The kernel according to claim 5, wherein each quadrant comprises a pathlength matched beamsplitter.

7. The kernel according to claim 5, wherein each quadrant comprises a beamsplitter set in a pathlength matched position in the prism assembly.

8. The kernel according to claim 5, wherein each quadrant comprises a pathlength matched beamsplitter positioned in a pathlength matched position in the prism assembly.

9. The kernel according to claim 5, wherein the blue microdisplay is the only microdisplay attached to the fourth quadrant.

10. The kernel according to claim 5, wherein the microdisplays are attached to the faces using a direct mounting technique.

11. The kernel according to claim 10, wherein the microdisplays are attached to the beamsplitters using a direct mounting technique.

12. The kernel according to claim 5, wherein the kernel and microdisplays comprise a monolithic assembly.

13. A kernel, comprising:
a prism assembly comprising,
a first beamsplitter having an input face;
a second beamsplitter;
a third beamsplitter having an output face; and
a fourth beamsplitter;
a red microdisplay attached to the second beamsplitter;
a green microdisplay attached to the second beamsplitter; and
a blue microdisplay attached to the fourth beamsplitter;
wherein:
the prism assembly is arranged in four quadrants, each quadrant comprising one of the first, second, third, and fourth beamsplitters,
the second beam splitter is cater-corner to the fourth beamsplitter;
the beamsplitters are configured to facilitate,
division of light entering the prism assembly through the input face into component red, green and blue light beams,
individual direction of the component red, green, and blue light beams to a corresponding one of the red, green, and blue microdisplays for modulation,
recombination of the modulated red, green, and blue light beams, and
direction of the recombined modulated light beams to the output face; and
each beam splitter comprises two prisms mated together with over lapping corners, wherein an amount of overlap in the overlapping corners is directly proportional to pathlength differences through each of the prisms.

14. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the input face is adjacent to first face of the second beamsplitter.

15. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the input face is adjacent to second face of the second beamsplitter.

16. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the input face is adjacent to third face of the fourth beamsplitter.

17. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the input face is adjacent to the fourth beamsplitter, but not adjacent to the third face of the fourth beamsplitter.

18. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the output face is adjacent to the first face of the second beamsplitter.

19. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the output face is adjacent to second face of the second beamsplitter.

20. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the output face is adjacent to the third face of the fourth beamsplitter.

21. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the output face is not adjacent to third face of the second beamsplitter.

22. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the input face is adjacent to the first face and the output face is adjacent to the second face.

23. The kernel according to claim 22, wherein the third face is adjacent to the third beamsplitter.

24. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the input face is not adjacent to either the first face or the second face, and the output face is not adjacent to the fourth beamsplitter.

25. The kernel according to claim 13, wherein:
the second beamsplitter comprises,
a first face to which the red microdisplay is attached, and
a second face to which the green microdisplay is attached;
the fourth beamsplitter comprises a third face to which the blue microdisplay is attached; and
the input face is adjacent to the second beamsplitter and the output face is not adjacent to the second beamsplitter.

26. The kernel according to claim 13, wherein each beamsplitter comprises a pathlength matched beamsplitter.

27. The kernel according to claim 13, wherein each beamsplitter comprises a pathlength matched beamsplitter each set in pathlength matched positions in the prism assembly.

28. The kernel according to claim 13, wherein the second, third, and fourth beamsplitters comprise pathlength matched beamsplitters.

29. A kernel, comprising:
a prism assembly arranged in four quadrants, comprising and input quadrant, an output quadrant, a first modulating quadrant, a second modulating quadrant positioned opposite to the first modulating quadrant; and
a first microdisplay configured to modulate a first color light and mounted on a first outside face on the first modulating quadrant;
a second microdisplay configured to modulate a second color light and mounted on a second outside face of the first modulating quadrant; and
a third microdisplay configured to modulate a third color light mounted on an outside face of the second modulating quadrant;
wherein:
the first modulating quadrant comprises a polarizing beamsplitter;
the second modulating quadrant comprises a polarizing beamsplitter;
the first color light and the second color light are not at opposite ends of the visible color spectrum; and
each polarizing beamsplitter comprises two prisms mated together with over lapping corners, wherein an amount of overlap in the overlapping corners is directly proportional to pathlength differences through each of the prisms.

30. The kernel according to claim 29, wherein the third color light is a blue light.

31. The kernel according to claim 29, wherein the first color light and the second color light comprise adjacent bands of light.

32. The kernel according to claim 29, wherein the third color light is a red light.

33. The kernel according to claim 29, wherein each quadrant comprises a beamsplitter.

34. The kernel according to claim 29, wherein each quadrant comprises a pathlength matched beamsplitter.

35. The kernel according to claim 29, wherein each quadrant comprises a beamsplitter set in a pathlength matched position in the prism assembly.

36. The kernel according to claim 29, wherein each microdisplay is mounted via a direct mounting technique such that the kernel comprises a monolithic assembly.

37. The kernel according to claim 29, wherein the quadrants are configured to facilitate,
division of light entering the prism assembly through an input face of the input quadrant into component light beams comprising the first color light, the second color light, and the third color light,
individual direction of the first, second, and third colored lights to a corresponding one of the first, second, and third microdisplays for modulation,
recombination of the modulated first, second, and third colored lights, and
direction of the recombined modulated lights to an output face of the output quadrant.

38. The kernel according to claim 37, wherein distances of lightpaths between each face having a microdisplay mounted thereon and the output face are pathlength matched.

39. The kernel according to claim 29, wherein the input quadrant comprises an input face adjacent to one of the first face and the second face.

40. The kernel according to claim 29, wherein the input quadrant comprises an input face adjacent to the third face.

41. The kernel according to claim 29, wherein the input quadrant comprises an input face not adjacent to any of the first face, the second face, and the third face.

42. The kernel according to claim 29, wherein the output quadrant comprises an output face adjacent to the third face.

43. The kernel according to claim 29, wherein the output quadrant comprises an output face adjacent to one of the first face and the second face.

44. The kernel according to claim 29, wherein the output quadrant comprises an output face that is not adjacent to any of the first face, the second face, and the third face.

45. The kernel according to claim 29, wherein the kernel is part of a light management system in a projection device.

46. The kernel according to claim 29, wherein the kernel is part of a light management system in a projection television.

47. A kernel, comprising:
a polarizing beam splitter;
a first microdisplay coupled to the polarizing beamsplitter; and
a second microdisplay coupled to the polarizing beamsplitter;
wherein:
the polarizing beamsplitter is configured to,
split an incoming light into a first light and a second light,
direct the first light to the first microdisplay,
direct the second light to the second microdisplay, and
recombine at least part of the first light and second light after reflection from the microdisplays;
the first light comprises a first band of visible light;
the second light comprises a second band of visible light adjacent to the first band; and
the polarizing beamsplitter comprises two prisms mated together with over lapping corners, wherein an amount of overlap in the overlapping corners is directly proportional to pathlength differences through each of the prisms.

48. The kernel according to claim 47, wherein the first light comprises a red light, and the second light comprises a green light.

49. The kernel according to claim 48, wherein the kernel is a quad style kernel comprising 4 beamsplitters of identical construction.

50. The kernel according to claim 47, wherein the kernel comprises a second beamsplitter having a third microdisplay attached and configured to modulate a third light.

51. The kernel according to claim 50 wherein the beamsplitters comprise pathlength matched beamsplitters.

52. The kernel according to claim 51, wherein the kernel comprises a monolithic assembly.

53. The kernel according to claim 50, wherein the third light is a blue light.

54. The kernel according to claim 53, wherein the kernel comprises part of a light management system for an image projector.

55. The kernel according to claim 50, wherein the kernel comprises part of a light management system of a projection television.

56. The kernel according to claim 47, wherein the microdisplays are directly mounted to the beamsplitters to produce a kernel comprising a monolithic assembly.

* * * * *